(12) United States Patent
Smith et al.

(10) Patent No.: US 9,796,466 B2
(45) Date of Patent: Oct. 24, 2017

(54) VARIABLE COUPLER DRIVE

(71) Applicant: Airgenesis LLC, Wheatland, WY (US)

(72) Inventors: Danny J. Smith, Wheatland, WY (US); Jerry D. Casteel, Loveland, CO (US)

(73) Assignee: Airgenesis, LLC, Wheatland, WY (US)

(*) Notice: Subject to any disclaimer, the term of this patent is extended or adjusted under 35 U.S.C. 154(b) by 176 days.

(21) Appl. No.: 14/770,433

(22) PCT Filed: Mar. 14, 2013

(86) PCT No.: PCT/US2013/031701
§ 371 (c)(1),
(2) Date: Aug. 25, 2015

(87) PCT Pub. No.: WO2014/130067
PCT Pub. Date: Aug. 28, 2014

(65) Prior Publication Data
US 2016/0016650 A1    Jan. 21, 2016

Related U.S. Application Data

(60) Provisional application No. 61/769,125, filed on Feb. 25, 2013.

(51) Int. Cl.
| | |
|---|---|
| *B63H 23/06* | (2006.01) |
| *B63H 5/125* | (2006.01) |
| *F16H 15/10* | (2006.01) |
| *B63H 23/02* | (2006.01) |

(52) U.S. Cl.
CPC .............. *B63H 23/06* (2013.01); *B63H 5/125* (2013.01); *B63H 23/02* (2013.01); *F16H 15/10* (2013.01); *B63H 2023/0258* (2013.01)

(58) Field of Classification Search
CPC .......... B63H 5/125; B63H 23/06; F16H 15/10
USPC ....................................................... 440/53, 54
See application file for complete search history.

(56) References Cited

U.S. PATENT DOCUMENTS

| | | |
|---|---|---|
| 1,251,784 A | 1/1918 | Joslin |
| 3,446,099 A | 5/1969 | Lesher et al. |
| 3,944,840 A | 3/1976 | Troll |
| 4,171,491 A | 10/1979 | Theyse |
| 4,220,870 A | 9/1980 | Kelly |
| 4,285,481 A | 8/1981 | Biscomb |

(Continued)

OTHER PUBLICATIONS

Service Manual for Snapper Walk Behind Mowers; #0-7001 (rev. 2, 3/92), Snapper Power Equipment, McDonough, GA 80253, 1992. 3 pages.

*Primary Examiner* — Lars A Olson
(74) *Attorney, Agent, or Firm* — Santangelo Law Offices, PC

(57) ABSTRACT

The inventive technology described herein generally relates to the field of power transmission, more particularly power transmission through a mechanical drive system. More specifically, in certain embodiments the inventive technology includes methods and apparatus for a variable coupler drive utilizing, in one embodiment a dynamic drive-ratio gearing system to transmit a drive input for application with a variety of output uses. In a preferred embodiment, such a variable coupler drive may be used to transmit a rotational drive input to a drive shaft to power, for example, a variety of commercial and industrial applications, and may be particularity suited to power rotational propeller based propulsion systems.

21 Claims, 44 Drawing Sheets

(56) References Cited

U.S. PATENT DOCUMENTS

| | | | |
|---|---|---|---|
| 4,303,835 A | 12/1981 | Bair | |
| 4,435,990 A | 3/1984 | Chalmer | |
| 4,457,666 A | 7/1984 | Selman, Jr. | |
| 4,573,929 A * | 3/1986 | Savikurki | B63H 5/125 440/54 |
| 4,585,950 A | 4/1986 | Lund | |
| 5,051,018 A | 9/1991 | Appell et al. | |
| 5,182,458 A | 1/1993 | McConachy | |
| 5,394,016 A | 2/1995 | Hickey | |
| 5,680,032 A | 10/1997 | Pena | |
| 5,798,632 A | 8/1998 | Muljadi | |
| 5,876,181 A | 3/1999 | Shin | |
| 6,191,496 B1 | 2/2001 | Elder | |
| 6,585,553 B1 | 7/2003 | Fetridge et al. | |
| 6,726,439 B2 | 4/2004 | Mikhail et al. | |
| 6,951,443 B1 | 10/2005 | Blakemore | |
| 6,984,899 B1 | 1/2006 | Rice | |
| 7,095,129 B2 | 8/2006 | Moroz | |
| 7,098,553 B2 | 8/2006 | Wiegel et al. | |
| 7,215,037 B2 | 5/2007 | Scalzi | |
| 7,215,039 B2 | 5/2007 | Zambrano et al. | |
| 7,298,059 B2 | 11/2007 | Delmerico et al. | |
| 7,375,436 B1 | 5/2008 | Goldin | |
| 7,425,776 B2 | 9/2008 | Ketcham | |
| 7,432,608 B2 | 10/2008 | Okubo et al. | |
| 7,487,954 B2 | 2/2009 | Copp et al. | |
| 7,804,186 B2 | 9/2010 | Freda | |
| 7,851,933 B2 | 12/2010 | Duffey et al. | |
| 8,178,991 B2 | 5/2012 | Smith | |
| 8,247,918 B2 | 8/2012 | Smith | |
| 8,253,268 B1 | 8/2012 | Smith | |
| 2002/0070558 A1 | 6/2002 | Johann | |
| 2003/0057703 A1 | 3/2003 | Howes et al. | |
| 2004/0086373 A1 | 5/2004 | Page, Jr. | |
| 2004/0096327 A1 | 5/2004 | Appa et al. | |
| 2005/0084373 A1 | 4/2005 | Suzuki | |
| 2005/0280264 A1 | 12/2005 | Nagy | |
| 2006/0055175 A1 | 3/2006 | Grinblat | |
| 2006/0108809 A1 | 5/2006 | Scalzi | |
| 2006/0188364 A1 | 8/2006 | Fritz | |
| 2006/0278445 A1 | 12/2006 | Chang | |
| 2007/0067067 A1 | 3/2007 | Stommel | |
| 2007/0245728 A1 | 10/2007 | Duong | |
| 2008/0150294 A1 | 6/2008 | Jones | |
| 2008/0257614 A1 | 10/2008 | Tabe | |
| 2008/0263731 A1 | 10/2008 | Tabe | |
| 2009/0146423 A1 | 6/2009 | Arinaga | |
| 2009/0167028 A1 | 7/2009 | Akamine | |
| 2011/0133483 A1 | 6/2011 | Yoneda et al. | |
| 2011/0135470 A1 | 6/2011 | Merkel | |
| 2011/0135471 A1 | 6/2011 | Wangford | |
| 2011/0135493 A1 | 6/2011 | Nies et al. | |
| 2011/0137586 A1 | 6/2011 | Jiang et al. | |
| 2011/0223017 A1 | 9/2011 | Smith | |
| 2012/0190497 A1 | 7/2012 | Smith | |

* cited by examiner

VARIABLE COUPLER DRIVE

This application is the United States National Phase of International Patent Application Number PCT/US2013/031701, filed Mar. 14, 2013 which claims the benefit of U.S. provisional application No. 61/769,125, filed Feb. 25, 2013. The entire specification and figures of the above-mentioned applications are hereby incorporated herein in their entirety by reference.

TECHNICAL FIELD

The inventive technology described herein generally relates to the field of power transmission, more particularly power transmission through a mechanical drive system. More specifically, in certain embodiments the inventive technology includes methods and apparatus for a variable coupler drive utilizing, in one embodiment a dynamic drive-ratio gearing system to transmit a drive input for application with a variety of output uses. In a preferred embodiment, such a variable coupler drive may be used to transmit a rotational drive input to a drive shaft to power, for example, a variety of commercial and industrial applications.

The inventive technology may be particularly suited for propeller propulsion based systems, such as ships, for example through an external propeller drive responsive to one or a plurality of variable coupler drive(s) devices. Moreover, such an external propeller drive may further be independently rotatable in 360° degrees while continuously receiving power from a variable coupler drive. Such rotational capabilities under powered conditions may allow a ship to execute a plurality of propeller power movements, such as lateral and/or angled propulsion as well as rotational movement along a central, and/or terminal axis. Finally, the inventive technology may also have applications for power generation through, for example, the capture of various types of power inputs, which can be transmitted through a dynamic drive-ratio gearing system allowing dynamic control of a generator output.

BACKGROUND

Traditional drive systems are known in the art and are ubiquitous across multiple commercial industries. However, such traditional drive systems are limited by several physical as well as design aspects reducing their effectiveness. Principally, traditional mechanical drive systems rely on a variety of gearing mechanisms to achieve power output and/or torque efficiencies in relation to their initial power inputs. While a variety of gearing types and configurations have been used throughout the years, all of these are susceptible to normal wear and tear, not to mention catastrophic failure. Both instances require significant amounts of maintenance and lubrication as well as the additional cost of eventual replacement. In many systems this is complicated by the drive system's limited physical access, often requiring and extended period of inactivity. Apart from these physical limitations, traditional drive systems are also limited in their ability to regulate not only their power inputs but outputs as well. Traditional drive systems are static and/or step-wise, in that they are generally regulated by varying their power inputs or outputs through specific step-wise gearing mechanisms. In addition, the conventional gearing systems of such traditional drive systems cannot accommodate rapid or extreme changes in a power input, nor can they efficiently operate at high power input ranges without the risk of mechanical failure. This regulation choke-point does not allow traditional drive systems to achieve more precise power and torque regulation necessary for many industrial applications.

The inventive technology disclosed herein, through its various embodiments overcomes many of these limitations. Specifically, the inventive technology in one embodiment may include apparatus and methods for a variable coupler drive that may achieve dynamic coupler-level regulation to generate the power output. Additional embodiments may include apparatus and methods for a variable couple drive lift to couple and de-couple the aforementioned variable coupler drive, perhaps through action of an actuator. In additional embodiments, the inventive technology may include apparatus and methods for an external propeller drive which may be powered by a variable coupler drive. In this embodiment, such a system may allow lateral and/or angled ship movements, as well as rotational propulsion along a central and/or proximal axis. In this embodiment, a single or plurality of variable coupler drive(s) may power, again, a single or plurality of rotational external propeller drive(s) allowing not only coupler-level torque control over the rotational output—and eventual propeller rotation, but variable direction propulsion. Such an embodiment may also be adapted, and/or retrofitted to existing fixed-propeller ships.

The foregoing technological and economic limitations associated with traditional drive systems as well as drive transmission techniques associated with said systems may represent a long-felt need for a comprehensive, economical and effective solution to the same. While implementing elements may have been available, actual attempts to meet this need may have been lacking to some degree. This may have been due to a failure of those having ordinary skill in the art to fully appreciate or understand the nature of the problems and challenges involved. As a result of this lack of understanding, attempts to meet these long-felt needs may have failed to effectively solve one or more of the problems or challenges identified herein. These attempts may even have led away from the technical directions taken by the present inventive technology and may even result in the achievements of the present inventive technology being considered to some degree an unexpected result of the approach taken by some in the field. Accordingly, there is a need within the field for an efficient and economically viable system that addresses each of the technological and economic limitations outlined above. The inventive technology disclosed in this application represents a significant leap forward in the field of drives and drive coupler systems.

DISCLOSURE OF INVENTION(S)

As seen in the various figures, in a basic embodiment the inventive technology includes a variable coupler drive (1a) utilizing perhaps a rotating or rotatable cylinder (1), driven for example by a motor, which may generate a rotational drive input (2) at a desired speed. This rotating cylinder (1) may be dynamically coupled, for example in a slidable manner, with a spinner (5) element secured perhaps within an adaptable support bracket (6). Such adaptable support bracket (6) may be a non-rotational support joined with a spinner (5) through a rotational joint (4), such as a bearing joint allowing a spinner (5) to freely rotate within a bracket. This rotating spinner may be in contact, or brought into contact with a drive table (7) causing a controlled rotation. As detailed in the various figures disclosed herein, this drive table (7) may be supported by one or more rotational support system(s), such as a rotational support base (20) and may be further coupled to a rotatable drive shaft (8) which may be utilized to transmit the systems power output. Again, as shown in the figures, this adaptable support bracket (6) may be joined with a variable position driver (10), through for example a variable position track (9) which may allow it—and the coupled spinner (5)—to move across the circumference of the drive table. In this manner, the position of the rotating spinner (5) may establish the system's drive ratio output based on the position of the spinner (5) in relation to the drive table's central axis. Such drive-ratio may be continuously and dynamically altered based on the position of the spinner in relation to the drive table's central axis. As such, the inventive technology may achieve a desired drive-ratio without, perhaps, the need to neither alter the system's power input nor use traditional gearing "teeth" and/or a gear train, or other traditional step-wise gear mechanisms.

Moreover, the inventive technology in some embodiments may allow for dynamic control of the drive system's output by adjusting the spinner's (5) position along the drive table (7). Naturally, this dynamic control capability may allow the system's power output to not only remain constant, even during fluctuations of any power inputs, but also may allow for rapid increases and/or decreases in power output, perhaps in response to an external demand or load resistance by dynamically adjusting the spinner (5) to a new drive ratio position along the drive table (7). Another additional embodiment of such a variable coupler drive (1*a*) may allow for a rapid change in the direction of the drive's output without any traditional gearing or other switching mechanisms requiring the input to be turned off. In one embodiment, for example to reverse the rotational power output of the drive system, the variable coupler drive may adjust the spinner element from one side of the drive table to the opposite side or alternate variable drive ratio directional region (43), reversing the table's direction, and thus reversing the drive output as well without interruption of the systems drive input.

Additional embodiments include method and apparatus to engage as well as disengage the drive table (7) from the spinner (5). In one such embodiment a drive table lift may allow a centrally positioned drive table (7) to be raised and lowered to contact a rotating spinner (5). In this manner a drive input, in this case a rotational drive input (2) provided by a motor may be dynamically coupled and/or de-coupled from the drive table further transmitting and/or stopping transmission of such input. Such a variable drive coupler switch may allow greater control of the system's output as well as a coupling and/or de-coupling switch modifying the systems power output.

Moreover, various positions along the drive table (7) may include spaced positions where the rotating spinner (5) may not be in contact with the drive table's surface generating, for example, a neutral "de-coupled" position. Finally, in some embodiments, this variable drive coupler may be easily accessible for repairs or replacement. For example, as discussed below, a centrally positioned translatable drive table support mount (25) may be detachable from the other supports through translatable interfaces (50) or connections and may slide, for example, on a slide bearing (29). This modular design may be adapted and allow for the quick removal and replacement of any of the various elements listed.

Additional embodiments make such a variable coupler drive easily adaptable to a variety of industrial applications. In one such embodiment, a variable coupler drive may be used to power a fully-rotational propeller drive forming a rotational propeller drive system (1*b*). As will be discussed below, such a rotational propeller drive system (1*b*) may include methods and apparatus for placement of a variable coupler drive (1*a*) perhaps internally along the hull of a ship to variably power a drive shaft (8) which may in turn be coupled to an external propeller drive (24), perhaps through a directional gear transmission (23*a*) and (23*b*). In some embodiments this external propeller drive may be part of a "pod" system placed at various points along the hull of a ship. Again, as will be discussed in more detail below, this rotating drive shaft (8) may pass through a sealed rotational propeller drive housing (21) supported by a drive band rotational mount (18) and responsive to a propeller shaft (24). In a preferred embodiment, because of this ability to de-couple rotation of a drive shaft (8) and the drive housing (21) so that they may act independently, as well as innervate the propeller shaft (24) in a plurality of directions through a directional gear transmission (23*a*) and (23*b*) system, the drive housing (21) may be responsive to a rotational drive gear (16) coupled with perhaps a rotational drive band (17) so as to be independently rotatable, for example in 360° degrees while receiving and/or dynamically maintaining power from a variable coupler drive (1*a*). In this manner, the power level output, as well as, in this case the output's rotational direction, ultimately transmitted to a propeller shaft (24)—or any other appropriate element—may be dynamically regulated through the action of the variable coupler drive (1*a*), while its direction may be separately and independently manipulated by the rotational propeller drive housing (21).

Accordingly, the present invention includes a variety of aspects, which may be combined in different ways. The following descriptions are provided to list elements and describe some of the embodiments of the present invention. These elements are listed with initial, and in some cases secondary or multiple embodiments, however it should be understood that they may be combined in any manner and in any number to create additional embodiments. The variously described examples and preferred embodiments should not be construed to limit the present invention to only the explicitly described systems, techniques, and applications. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

One of the many objectives of the current inventive technology is to provide methods and apparatus for a variable drive coupler that may achieve dynamic drive ratio control and/or torque efficiencies. Another objective of the current inventive technology may be to provide methods and apparatus for a variable drive coupler that may achieve dynamic drive ratio control and/or torque efficiencies while maintaining an approximately constant power input and/or output.

Another objective of the current inventive technology may be to provide methods and apparatus for a variable coupler drive; a variable coupler drive switch; a variably coupled rotational propeller drive system; a rotational drive system; and a rotational propeller drive housing system, and various combinations thereof.

Another objective of the current inventive technology may be to provide methods and apparatus for a variable drive coupler that may be quickly coupled and/or de-coupled through a coupler lift system. Another objective of the current inventive technology may be to provide methods and apparatus for a variable drive coupler that may be modular and/or easily accessible for replacement of parts, maintenance and/or repairs. Another objective of the current inventive technology may be to provide methods and apparatus for a rotational propeller drive system that may allow rotational movement of a propeller drive as well as independent rotational movement of a rotational propeller drive housing.

Another objective of the current inventive technology may be to provide methods and apparatus for a rotational propeller drive system that allows independent and/or multi-directional propulsion. Another objective of the current inventive technology may be to provide methods and apparatus for a rotational propeller drive system that may be retrofitted to an existing fixed-propeller ship. Another objective of the current inventive technology may be to provide methods and apparatus for a rotational propeller drive system that may be retrofitted to power an existing fixed-propeller ship.

Another objective of the current inventive technology may be to provide methods and apparatus for a rotational propeller drive housing that may be fully rotated 360°. Another objective of the current inventive technology may be to provide methods and apparatus for a rotational propeller drive housing that may be retracted into the body of a ship and/or an external enclosed "pod". Another objective of the current inventive technology may be to provide methods and apparatus for power generation through the capture and transmission of a power input through a variable coupler drive apparatus that may be responsive to power generator.

Accordingly, the objects of the methods and apparatus for a variable drive coupler system described herein address each of the foregoing in a practical manner. Naturally, further objects of the inventive technology will become apparent from the description and drawings below.

MODE(S) FOR CARRYING OUT THE INVENTION(S)

Figure 1:
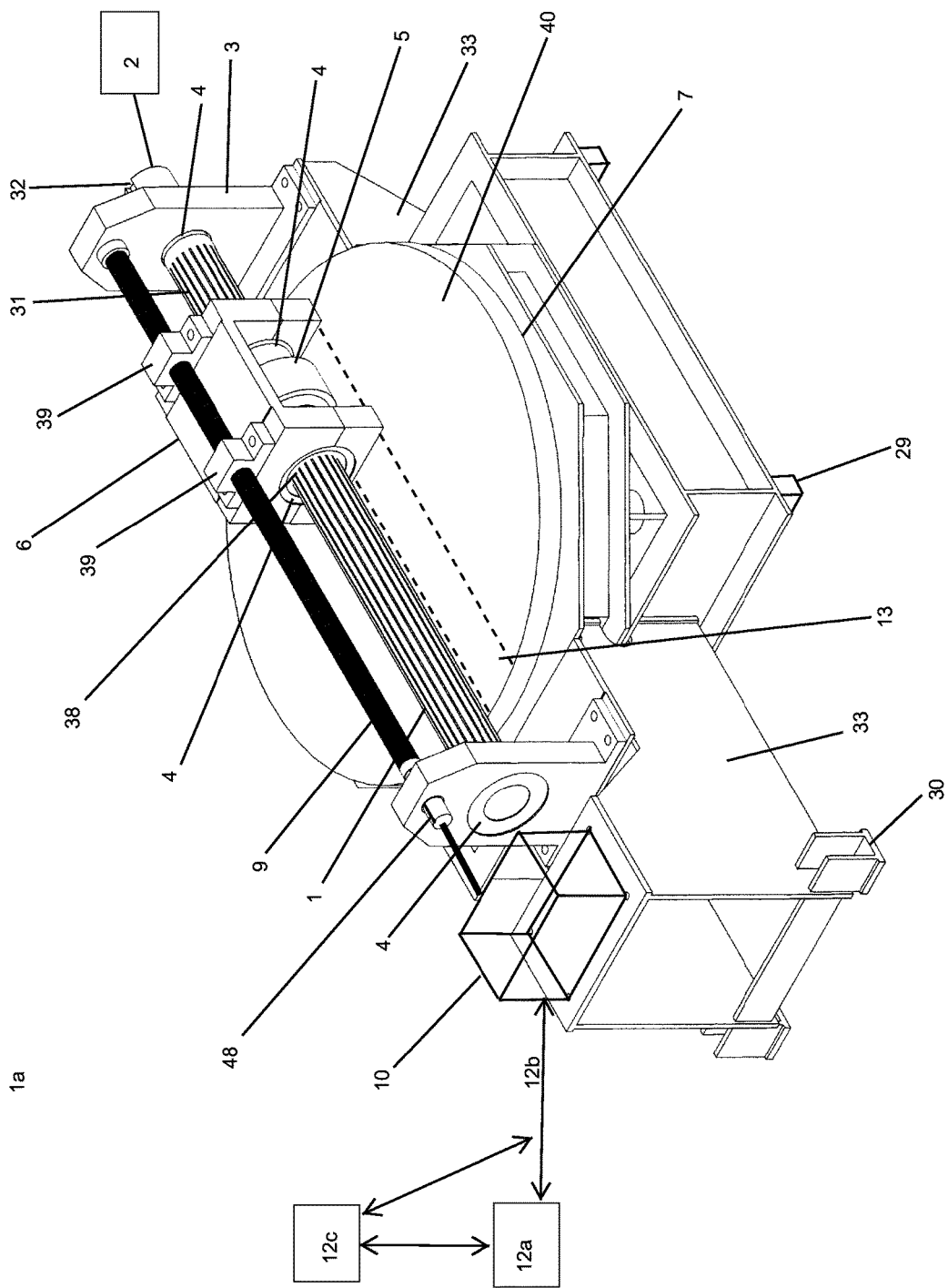
FIG. 1: is a perspective view of a variable coupler drive in one embodiment thereof.
Figure 2:
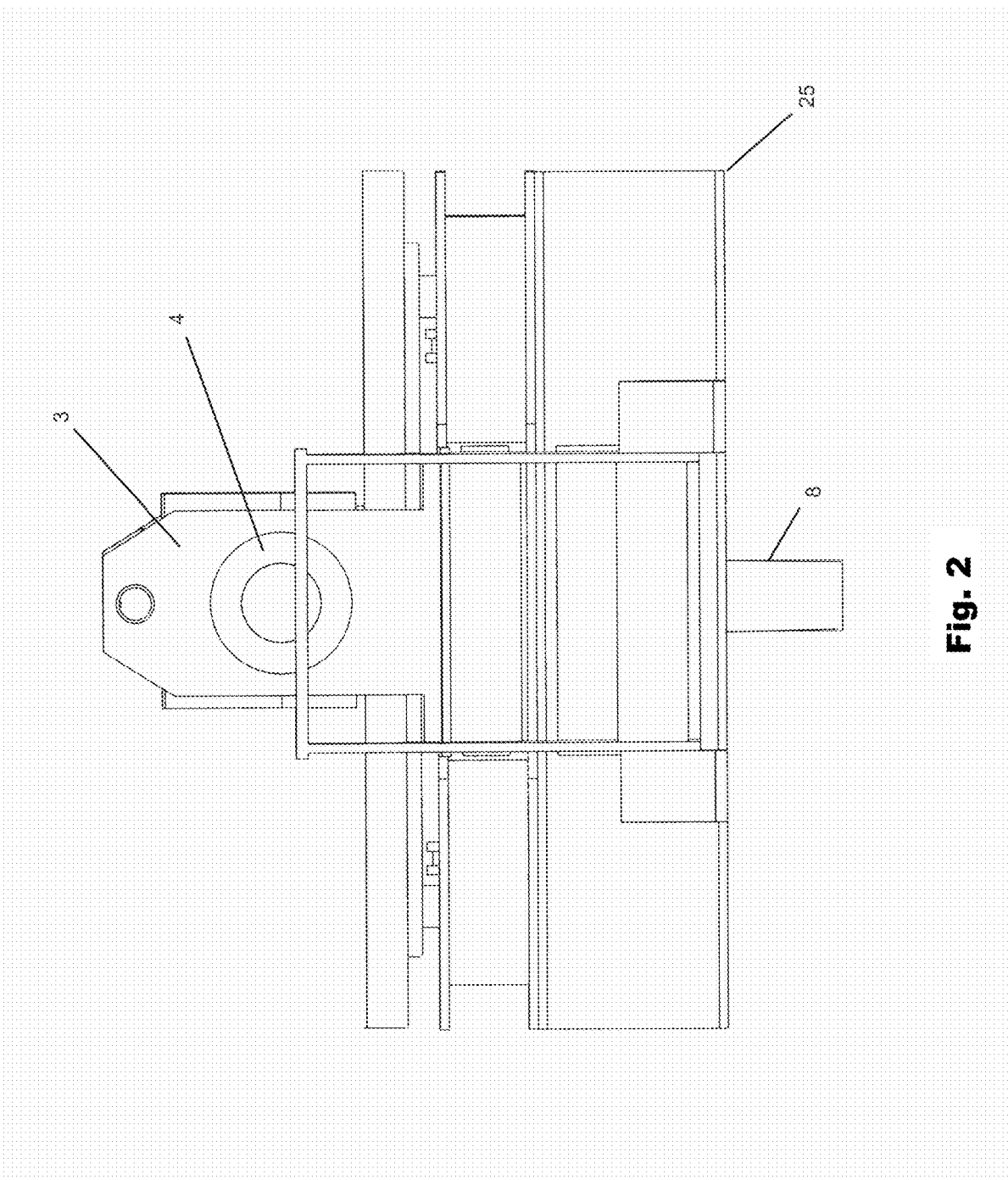
FIG. 2: is a left side view of a variable coupler drive in one embodiment thereof.
Figure 3:
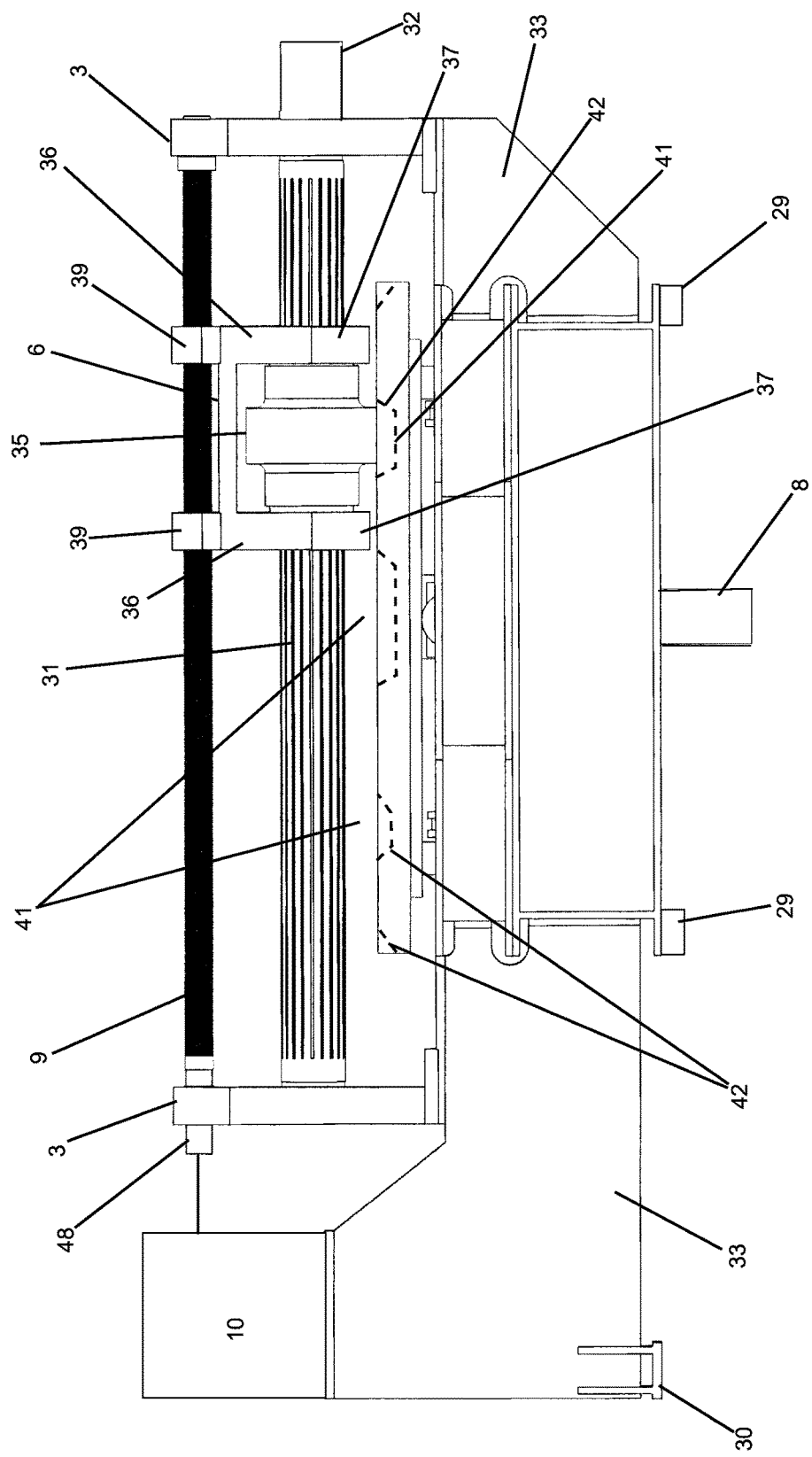
FIG. 3: is a front view of a variable coupler drive in one embodiment thereof.
Figure 4:
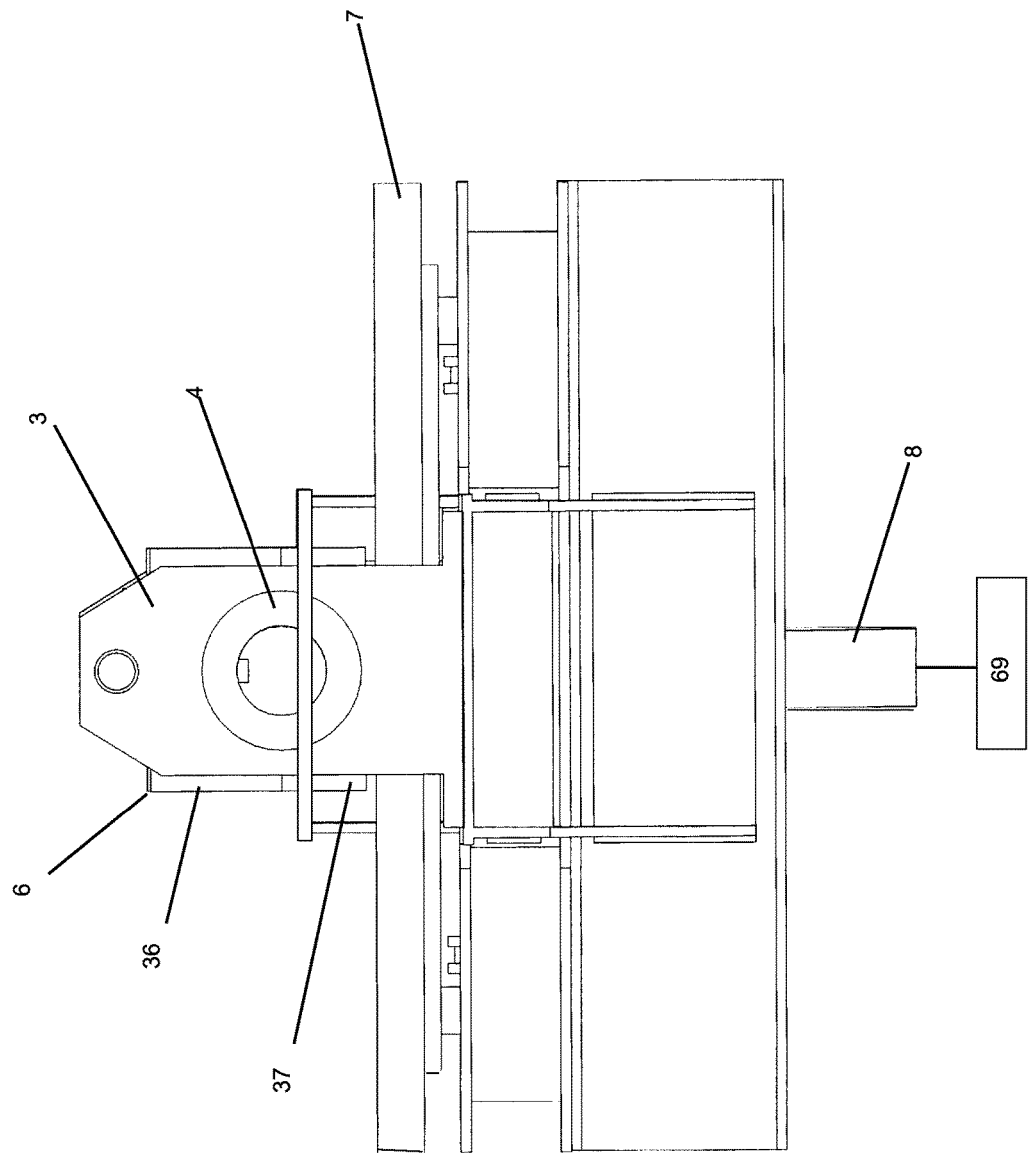
FIG. 4: is a right side view of a variable coupler drive in one embodiment thereof.

As mentioned earlier, the present invention includes a variety of aspects, which may be combined in different ways. The following descriptions are provided to list elements and describe some of the embodiments of the present invention. These elements are listed with initial embodiments, however it should be understood that they may be combined in any manner and in any number to create additional embodiments. The variously described examples and preferred embodiments should not be construed to limit the present invention to only the explicitly described systems, techniques, and applications. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application. The term responsive, and/or responsive to may indicate that two elements may be coupled in a manner so as to be directly or indirectly connected. In further embodiments, this may indicate that one element may respond with a discrete or non discrete action in response to the action or stimulus of a separate element.

As can be seen from the figures, the inventive technology consists of generic elements that may be embodied in many different forms. In one preferred embodiment, the inventive technology may include a variably coupled rotational propeller drive system having: at least one rotatable cylinder (1) that may be responsive to a rotational drive input (2) where a rotatable cylinder may be supported by at least one coupler support mount (3) through perhaps at least one rotational joint (4); at least one spinner (5) slidably coupled to a rotatable cylinder (1) so as to be rotationally responsive to the cylinder (1); at least one adaptable support bracket (6) coupled to a spinner (5) by, again perhaps at least one rotational joint (4); at least one drive table (7) mechanically coupled with at least one drive shaft (8) and perhaps rotationally responsive to a spinner (5); at least one variable position track (9) adjustably coupled to at least one variable position driver (10) and an adaptable support bracket (6), where the variable position driver (10), in response to perhaps a control signal (12b), may adjustably position a spinner (5) along a variable drive ratio pathway (13); as well as perhaps at least one directional drive shaft (14) responsive to a drive input (15) and joined with at least one rotational drive gear (16); at least one rotational drive band (17) coupled with a rotational drive gear (16); at least one drive band rotational mount (18) joined to a rotational drive band (17) and a rotary bearing (19) and supported by a rotational support base (20); at least one rotational propeller drive housing (21) responsive to a drive band rotational mount (18); at least one seal component (22) joined with a rotational propeller drive housing (21); at least one directional gear transmission (23) responsive to a drive shaft (8); and at least one propeller shaft (24) responsive to a directional gear transmission (23).

In an additional embodiment, as generally shown in FIGS. 1-8, certain embodiments of the current inventive technology may include methods and apparatus for a variable coupler drive (1a) generally comprising: at least one rotatable cylinder (1) responsive to a rotational drive input (2). Such a rotatable cylinder (1) may be supported by at least one coupler support mount (3) through, for example, a rotational joint (4) allowing it to freely rotate in response to, in this embodiment, the rotational drive input (2). In this embodiment, a spinner (5) element may be slidably coupled to a rotatable cylinder (1). As noted in FIG. 1, for example in this embodiment, the spinner (5) may be slidably coupled with a rotatable cylinder (1) such that the spinner may rotate in response to a rotatable cylinder (1), while also being able to slide laterally along the length of the cylinder (1). This slidable coupling may be accomplished in some embodiments through the action of a non-rotational adaptable support bracket (6) coupled to a spinner (5) by, for example a rotational joint (4).

Generally referring to FIGS. 1-8, certain embodiments of the inventive technology may include the steps of: slidably securing at least one spinner (5) to a rotatable cylinder (1) wherein the cylinder is supported by at least one coupler support mount (3) through at least one rotational joint (4); adaptably securing a spinner (5) to at least one adaptable support bracket (6) through at least one rotational joint (4); adjustably coupling a variable position track (9) to at least one variable position driver (10) and an adaptable support bracket (6); generating a rotational drive input (2); transferring the rotational drive input (2) causing rotation of a rotatable cylinder (1); rotating the spinner (5) slidably secured to a rotatable cylinder (1); rotating at least one drive table (7) rotationally responsive to the spinner (5); rotating at least one drive shaft (8) mechanically coupled with a drive table (7); and adjustably positioning a spinner (5) along a variable drive ratio pathway (13) through activation of at least one variable position driver (10) comprising the steps of: activating a variable position driver (10) to which a variable position track (9) is responsive to a control signal (12b); and adjustably positioning an adaptable support bracket (6) to which a spinner (5) is adaptably coupled on the drive table (7) along a variable drive ratio pathway (13).

Moreover an initial embodiment, as shown in FIG. 1, may include a drive table (7) element that may further be mechanically coupled with at least one drive shaft (8). It should be noted, however, that such a mechanical coupling is not limiting as such a term may include any direct as well as indirect connection as well as any connection, again whether direct or indirect such that the two elements are responsive with, or on one another. Returning to FIG. 1, this drive table (7) may be rotationally responsive to a spinner (5). Again, it should be noted at the outset that the term "responsive," or "responsive to" may encompass any direct and/or indirect coupling, connection or interaction of any two or more elements such that the element(s) may respond with a discrete or non-discrete action(s) in response to the action(s) or stimulus of any other separate element(s). In this case, the aforementioned drive table (7) may be placed into contact, or may be in existing contact with a spinner (5) such that, in one embodiment the rotational energy of a spinner (5) may be transmitted to the drive table (7) causing a controlled rotation.

In such an embodiment this rotating drive table (7) may be used to store and/or transmit, in this case, rotational energy generated from a rotational drive input (2). In any embodiment, energy may be transferred to a drive table (7) through application of any torque force, for example through contact with a rotating spinner (5) element, thereby increasing its rotational speed, and hence its stored energy. This rotating drive table (7) may transmit and/or release this stored energy by subsequently applying torque to a mechanical load, thereby decreasing its rotational speed. In one embodiment, as will be discussed in detail below, this torque force may be transmitted through a drive shaft (8) to, for example, power a propeller drive shaft (24). However, the rotational energy stored in such a drive table may be applied to any mechanical load in order to accomplish a desired mechanical work. Additional variables that may determine the amount of rotational energy stored and/or transmitted through a rotating drive table (7) may be varied through changes in the mass, resistance, as well as circumference of the drive table (7) and/or spinner (5) elements as well as the variations in the energy inputted into the system and/or resistance and/or magnitude of the corresponding mechanical load or work to be accomplished.

Moreover, as noted previously, the inventive technology, in one embodiment, may describe a variable coupler drive (1a) where, for example, a rotating spinner (5) element may move across the face of a rotating drive table (7). In this embodiment, the relative and/or absolute position of the spinner from the central rotational axis may establish a drive-ratio. Such a drive ratio may be defined as the ratio of the angular velocities or frequencies of rotation of the components. This usually refers to the ratio of the angular velocity of the driving component, for example, in some embodiments a spinner (5) to the angular velocity of the driven component, again in this embodiment a drive table (7). (As will be noted below, such positions may be reversed in certain embodiments). In this embodiment, the rotations per minute (RPM) of the various elements may be dynamically adjusted based in part on their drive-ratio position along a rotating drive table (7).

The availability of different drive-ratios may be determined through varying the circumference of the drive table (7) as well as spinner (5). In addition, the rotation of a spinner (5) on either side of the central rotational axis along the circumference of a drive table may alter the direction of the drive table (7) and thus the direction of any transmitted rotational energy. As can naturally be appreciated, such an embodiment may allow for a rotational directional output control based on a spinner's placement on alternating sides of a rotating drive table (7). As will be discussed below, such rotational control may be particularly suited for the directional control of a propeller drive system allowing a user to change the direction of the rotational movement of a drive shaft merely by coupling, or moving a spinner (5) to the opposing side of a rotating drive table (7), without interruption of a drive input (2). In the context of a propeller drive system, such an embodiment may allow, for example, a propeller drive shaft (8) to easily reverse rotational direction generating an additional level of dynamic control.

As noted above, a spinner (5) may be dynamically adjusted across the circumference of a drive table causing it to rotate. This dynamic adjustment and/or movement across the face of the drive table (7) may be a result of the action of a variable position track (9) adjustably coupled to at least one variable position driver (10) and an adaptable support bracket (6), where the variable position driver (10), in response to a control signal (12b) may adjustably position a spinner (5) along a variable drive ratio pathway (13). Such a pathway, in this embodiment may describe an approximately linear pathway a spinner (5) may traverse across the circumference of a drive table having a plurality of driver-ratio positions based in part on their distance from the rotational axis of the drive table (7).

As noted above, various embodiments of the inventive technology may generally encompass a rotational drive input (2), as well as the steps of generating a rotational drive input (2). As shown in FIG. 1, such a rotational drive output may generally refer to any input that may, in this embodiment, generate and/or transmit either directly and/or indirectly a rotational force to a cylinder (1). This rotational drive input (2) may include, but is not limited to: a motorized power input; a steam power input, a hydro-power input, a kinetic power input; a magnetic power input; an electrical power input; a wind power input, a thermal power input; a levered drive input; a pulley-belted drive input or any combination of thereof.

Figure 6:
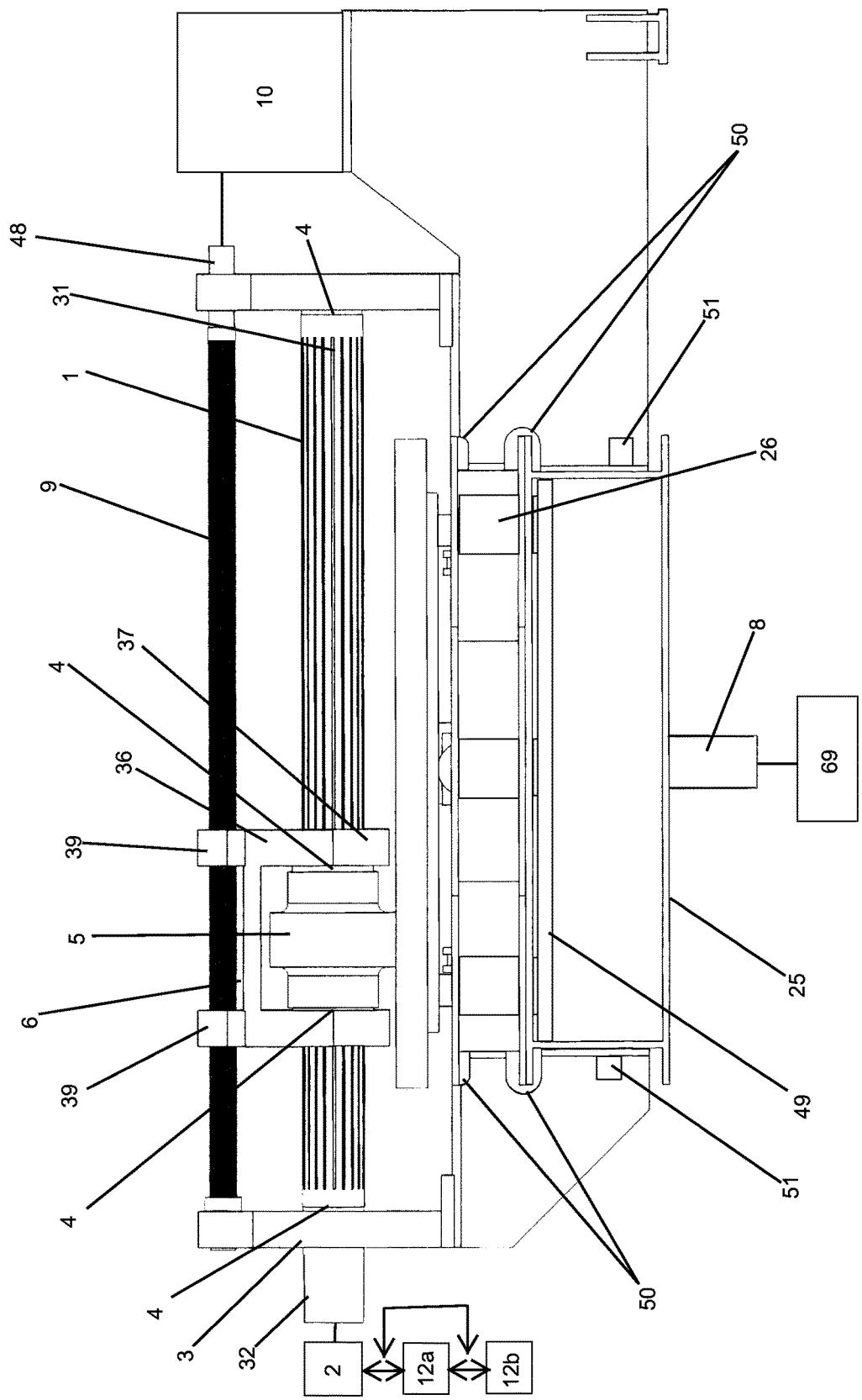
FIG. 6: is an alternative front view of a variable coupler drive in one embodiment thereof.

In a preferred embodiment shown in FIGS. 1 and 6, a motor may be coupled with a rotatable cylinder (1), through perhaps a rotational drive input coupler (32). Perhaps responsive to a controller (12), controller signal (12b) and/or sensor (12b), such a motor, for example a diesel motor, may generate a rotational drive input (2) at a desired level and be transmitted to a rotatable cylinder (1), again in this embodiment through a rotational drive input coupler (32) inducing rotation of a cylinder (1). It should be noted that this rotational drive input coupler (32) may encompass any mechanical or other coupling device or method that may transmit a rotational drive input (2) or other power input to the rotatable cylinder (1).

Referring again generally to FIGS. 1-8, certain embodiments may include a rotatable cylinder (1), which may be responsive to a rotational drive input (2). This rotatable cylinder (2) may be supported by at least one coupler support mount (3) through at least one rotational joint (4) such that, in one embodiment the cylinder (1) may independently rotate in response to a rotational drive input (2). However, it should be noted that the term "cylinder" may encompass any apparatus or device that may provide for the transmission of power, in this case a rotational force from one component to another. In certain embodiments such a rotatable cylinder (1) may include a pulley and belt drive, or even a clutch or clutching mechanism.

As noted above, in certain embodiments the spinner (5) may be slidably coupled to the rotatable cylinder (1). Moreover, as demonstrated in FIGS. 1 and 3, in certain embodiments the rotatable cylinder (1) may include one or perhaps a plurality of spline(s) (31). In this embodiment, a spinner (5) may be fitted, perhaps with slotted extensions over the spline element(s) providing a linear guide track for the slide movement of a spinner (5) along the length of the cylinder (1). In this manner, the cylinder (1) and spinner (5) may be slidably coupled, and rotationally responsive to one another, as in certain embodiments both elements are independently supported by one or more rotational joints (4). In other embodiments, this rotatable cylinder may include a mechanical stop element (31a) which may, for example, provide a physical barrier or stopping point for the movement of the spinner (5) along the length of the rotatable cylinder (1). As shown in FIG. 6, this mechanical stop may be, in certain embodiments the terminal ends of one or more cylinder spline elements (31a). Additional embodiments not specifically shown may include an end plate, perhaps positioned at a terminal position along the rotatable cylinder (1) providing an end position for movement of the spinner (5) along the length of the rotatable cylinder (1). In additional embodiments, a rotatable cylinder may include at least one rotational cylinder coupler (not shown). In this embodiment, for example, a rotating cylinder may be coupled with a rotational drive input (2) through a rotational cylinder coupler that may allow not only the transmission of, but the gearing up, and/or gearing down of the rotational drive input (2). In certain embodiments, rotational cylinder couplers may include an RPM/gear adjustor, and/or even a planetary or compound gear system coupler.

Furthermore, as will be discussed below, in certain embodiments multiple variable coupler drives (1a) may be coupled, for example, in series and/or in parallel. In such embodiments, these variable coupler drives (1a) may be coupled through a single rotatable cylinder, or perhaps through disparate rotatable cylinders linked in some instances through one or more rotational cylinder couplers. The rotation of such disparate rotatable cylinder elements may be coupled and act in a synchronized or asynchronous manner, and may be geared to independently rotate at a variable or desired RPM.

Figure 5:
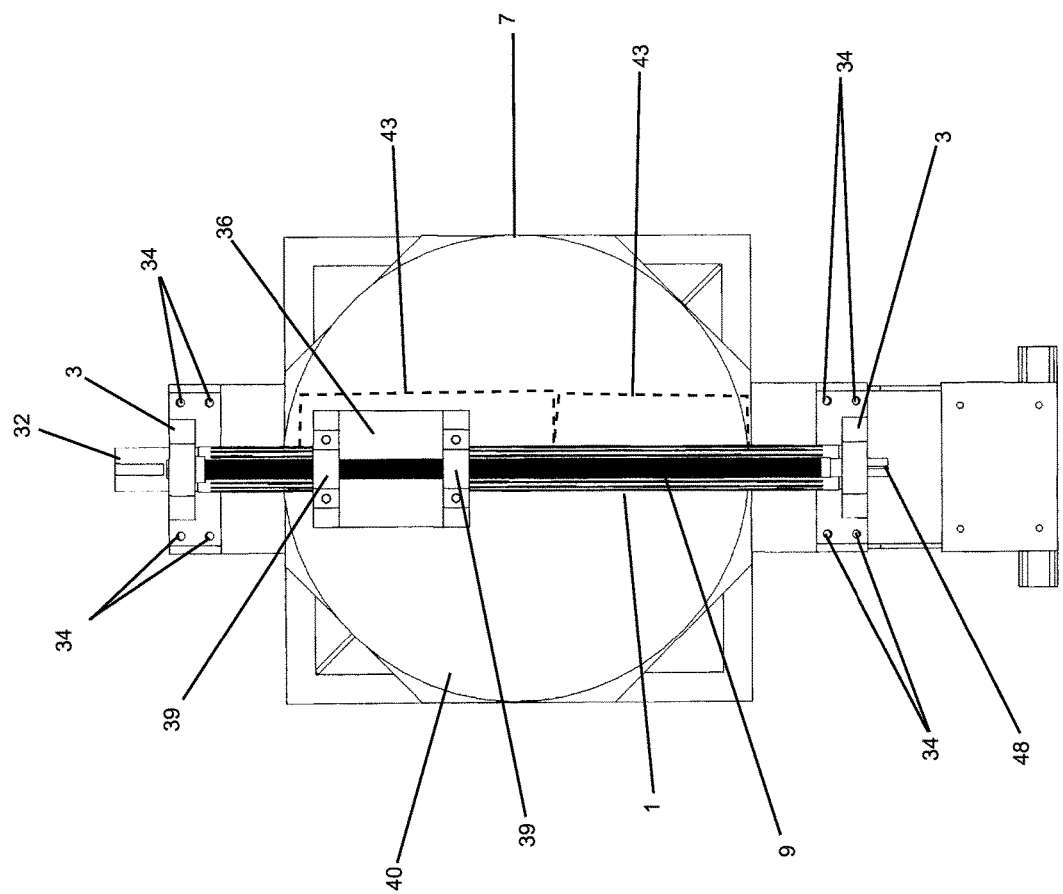
FIG. 5: is a top view of a variable coupler drive in one embodiment thereof.

Now referring to FIGS. 1-8 and 15, in some embodiments a rotatable cylinder (1) may be supported, for example, adjacent to a drive table (7) by at least one coupler support mount (3). In some embodiments this rotatable cylinder (1) may be rotationally supported through at least one rotational joint (4), for example a bearing joint. In a preferred embodiment, as demonstrated in FIGS. 1-8 as well as 10-11, a rotatable cylinder (1) may be supported by at least two coupler support mounts (3) at either terminal end. In this example, the terminally positioned coupler support mounts (3) may be supported by at least one drive base support (33). As noted above, such drive base support(s) (33) may be modular in design to accommodate a variety of coupler support mounts (3) and/or rotatable cylinders (1) and may be easily secured to, and/or removed from a desired location. As shown in FIG. 5, in some embodiments this coupler support mount (3) may have one, or even a plurality of anchor support positions (34). Such anchor support positions may allow for the use of detachable anchor supports such that one or more of the coupler support mounts (3) may be easily attached and/or detached from a drive base support (33) or other securing surface. Various detachable anchor supports may include, but not be limited to: a snap anchor support; a slide anchor support; a screw anchor support; a clamp anchor support; a ring anchor support; a hook anchor support; a quick release anchor support; a pressure anchor support and the like.

As previously noted, various elements of the inventive technology may be coupled with, and/or responsive to one or more rotational joints (4). Such rotational joints may generally describe any coupling that may provide support and/or rotational movement. In some embodiments a rotational joint may include a joint having one or more bearings, however additional examples may include, but not be limited to: a ball-bearing joint; a geared joint; a planetary geared joint; a pivot joint; a ball and socket joint; a pin bearing joint; a synthetic bearing joint; a babbit bearing joint; a universal bearing joint; a bushing and the like.

Referring generally to FIGS. 1-8, in certain embodiments a rotatable spinner (5) may be slidably secured to a rotatable cylinder (1). This spinner (5) may be positioned adjacent to a rotatable drive table (7). In some embodiments this spinner (5) may be placed in contact with the surface of a drive table (7), while in other embodiments it may be brought into contact with the drive table (7). Regardless, once in contact, the drive table (7) and spinner (5) may be rotationally responsive to one another. In some embodiments, it may be desired to increase the frictional force of the connection between the drive table (7) and spinner (5) elements. As such, in some embodiments, as shown in FIG. 1, this may be accomplished perhaps by the joining of a spinner frictional membrane (35) to the outer contact surface of a spinner (5).

Such a frictional membrane may be any appropriate or desired surface or surface treatment that may increase the frictional force of the connection between the drive table (7) and spinner (5) elements, and/or assist in the transfer of energy from, for example, a spinner (5) to a drive table (7). In some embodiments, such a frictional membrane may include, but not be limited to: a composite membrane; a plastic membrane; a resin membrane; a carbon-coated membrane; a rubber membrane; a vulcanized rubber membrane; an epoxy membrane; an oil membrane; a petroleum-based membrane and the like. Moreover, in some embodiments this frictional membrane may be detachable and/or replaceable. In still further embodiments, the inventive technology may include an integral frictional composite spinner. In this embodiment, a frictional membrane forming the contact portion of the spinner may be secured to a coupling element that may be further secured to a rotatable cylinder (5).

Figure 12:
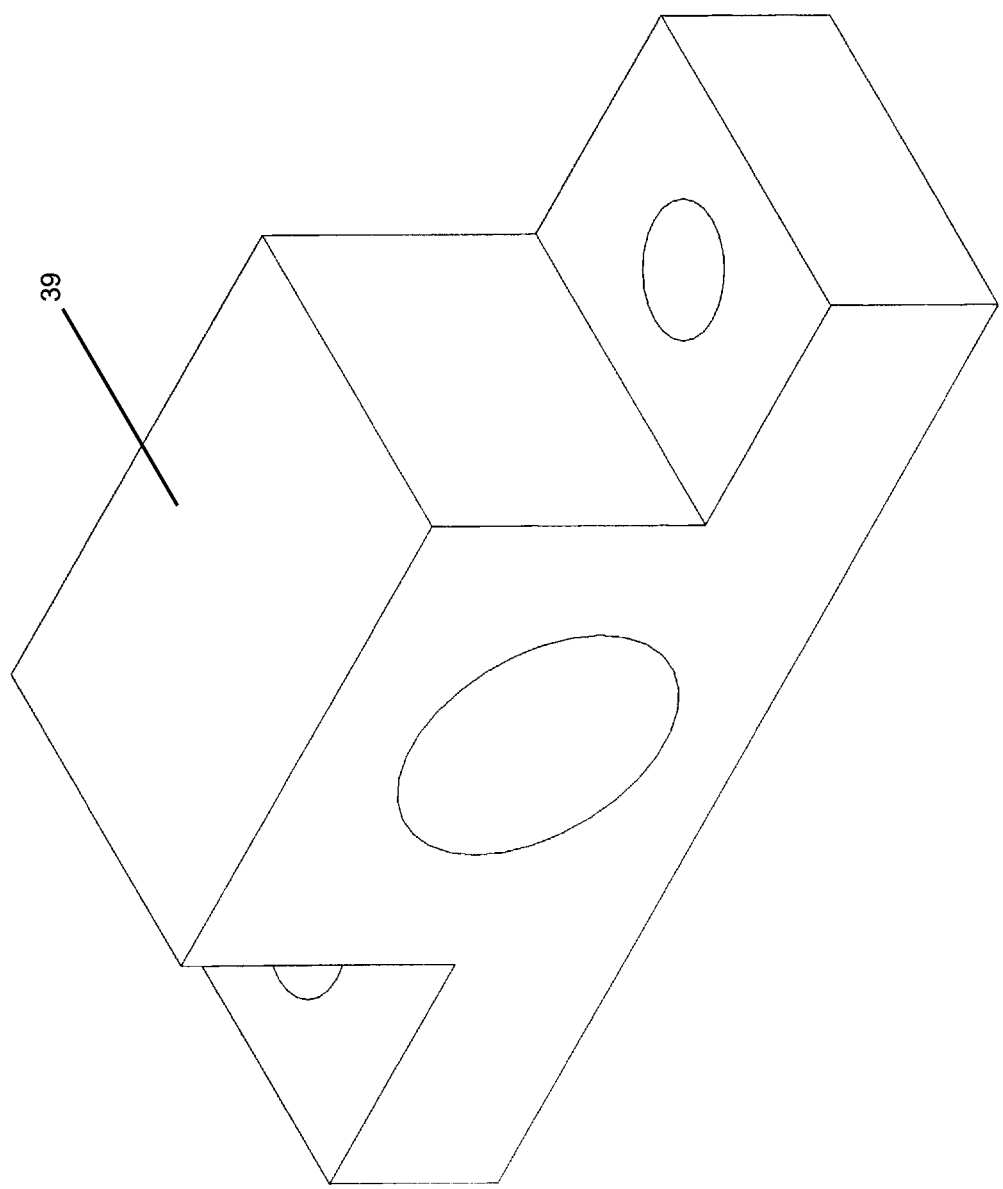
FIG. 12: is an individual variable position track mount in one embodiment thereof.
Figure 13:
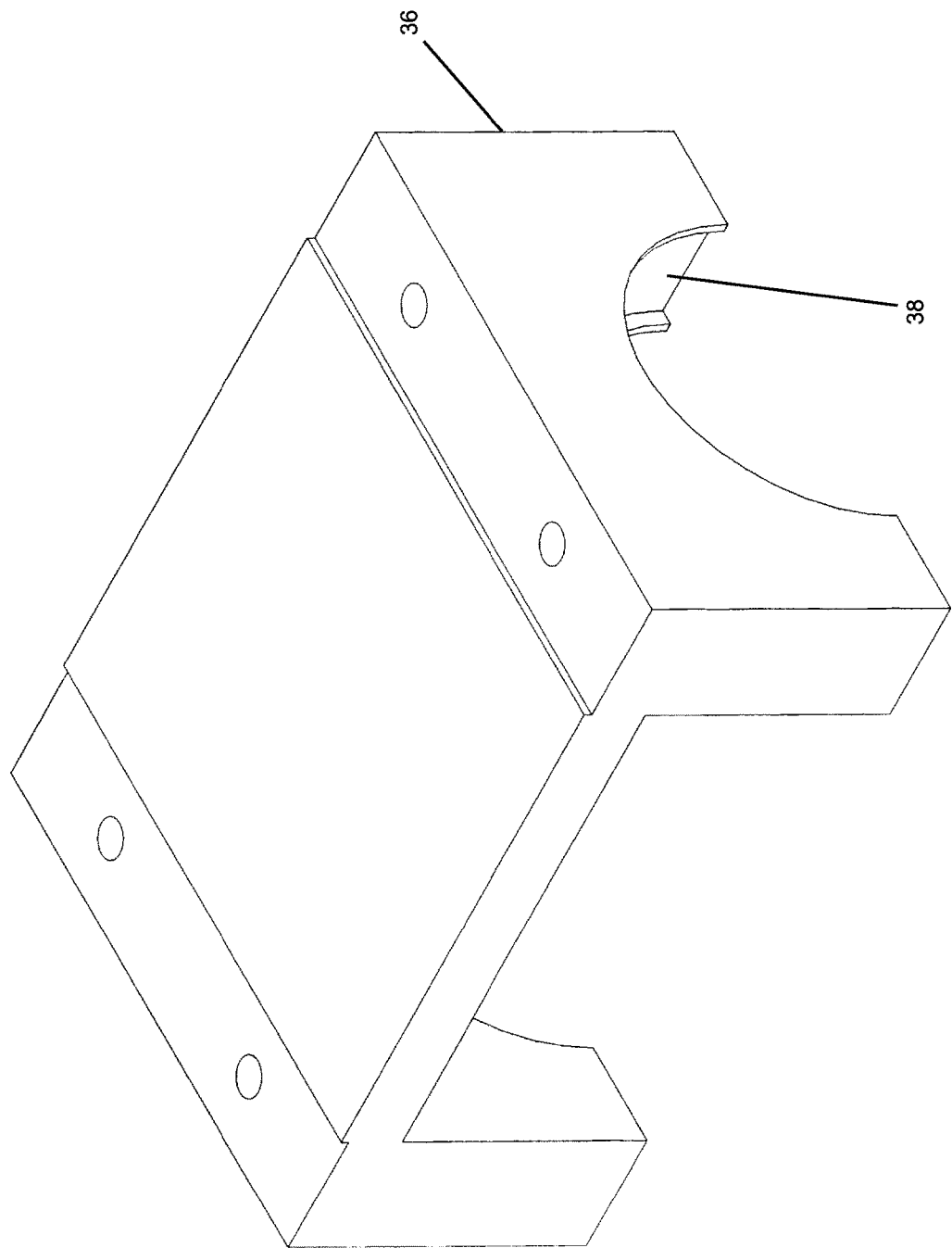
FIG. 13: is an individual upper bracket member in one embodiment thereof.
Figure 14:
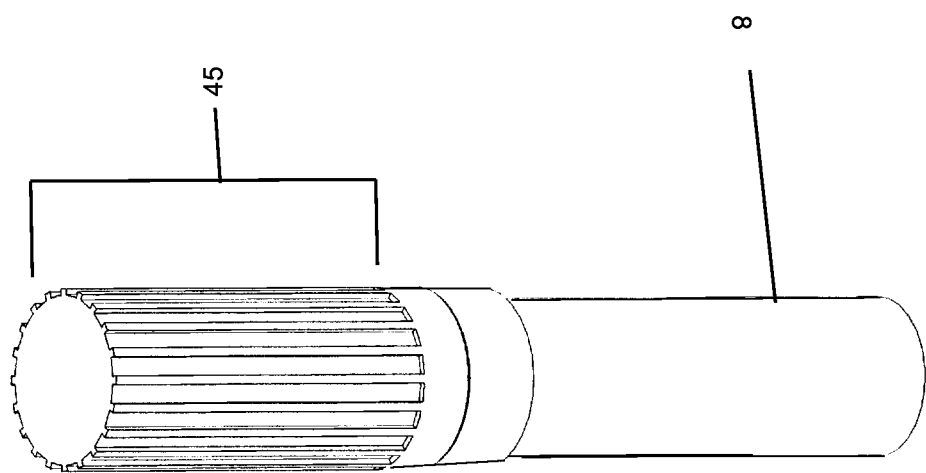
FIG. 14: is a drive shaft having a drive shaft coupler interface in one embodiment thereof.
Figure 15:
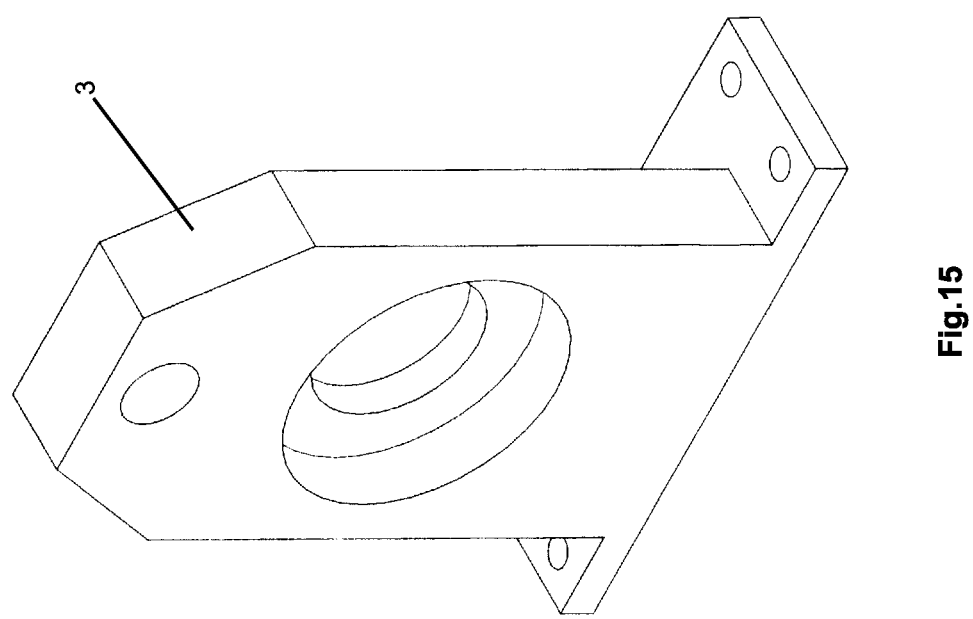
FIG. 15: is an individual coupler support mount in one embodiment thereof.
Figure 18:
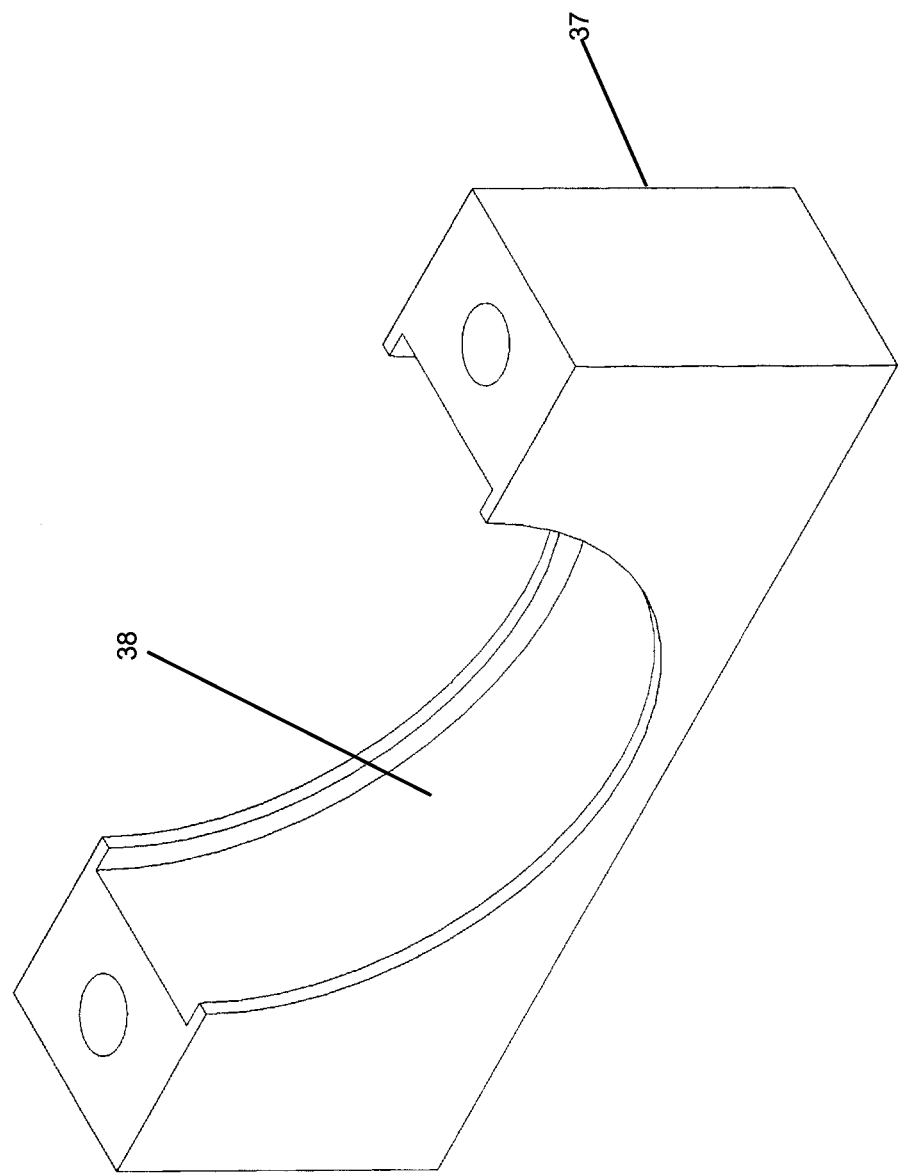
FIG. 18: is a lower bracket member in one embodiment thereof.
Figure 19:
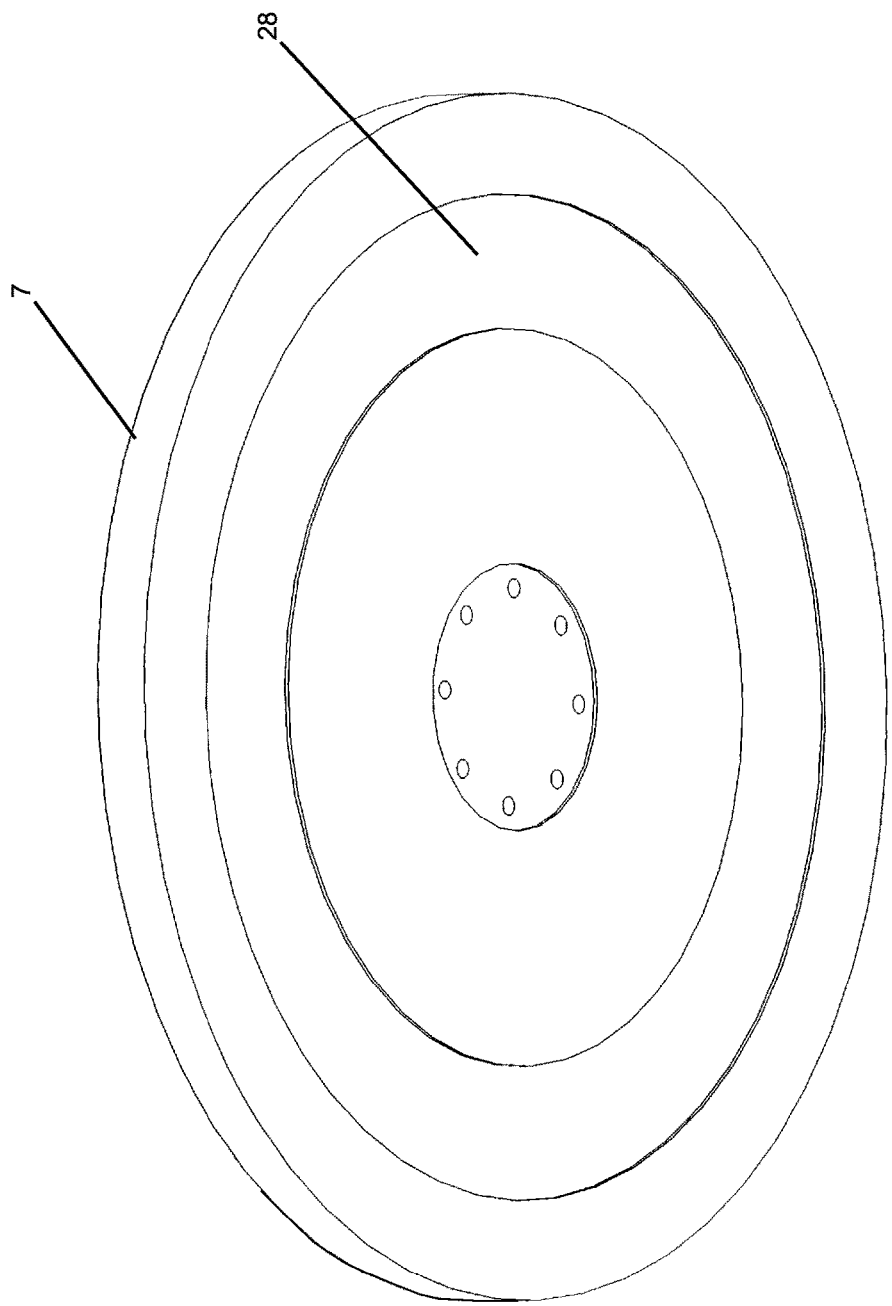
FIG. 19: is a drive table with a rotational interface surface in one embodiment thereof.
Figure 20:
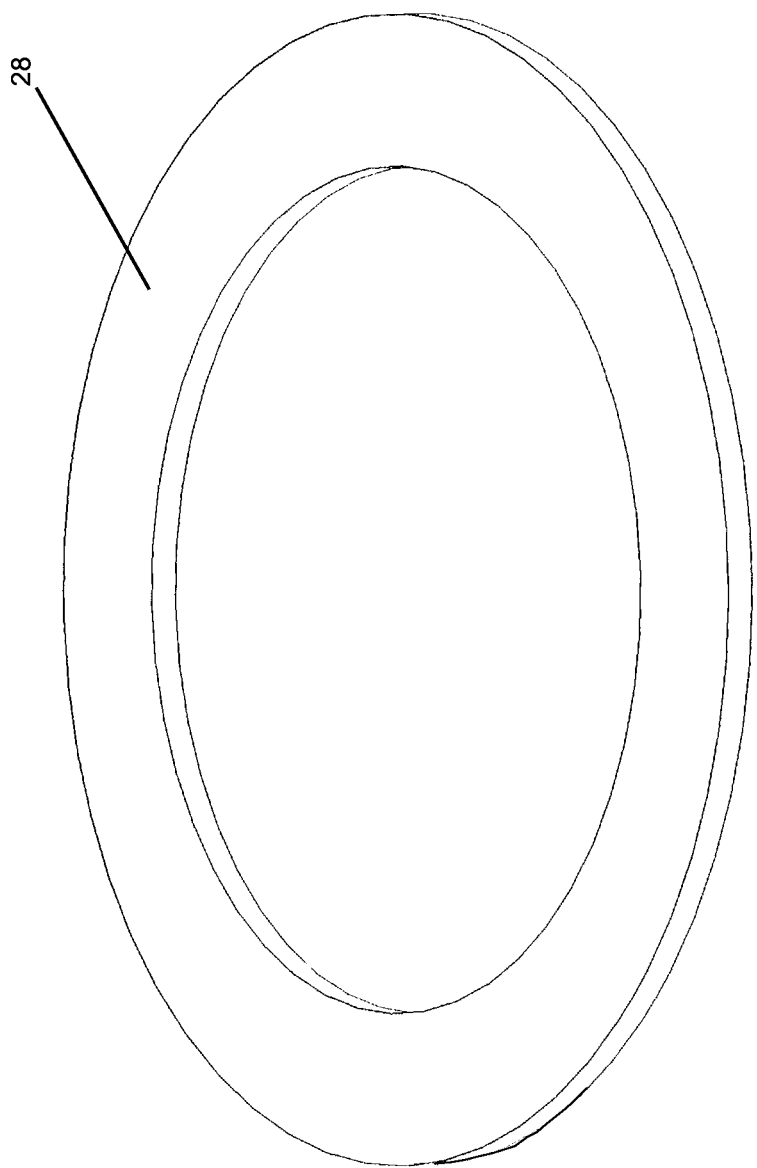
FIG. 20: is an isolated rotational interface surface in one embodiment thereof.
Figure 21:
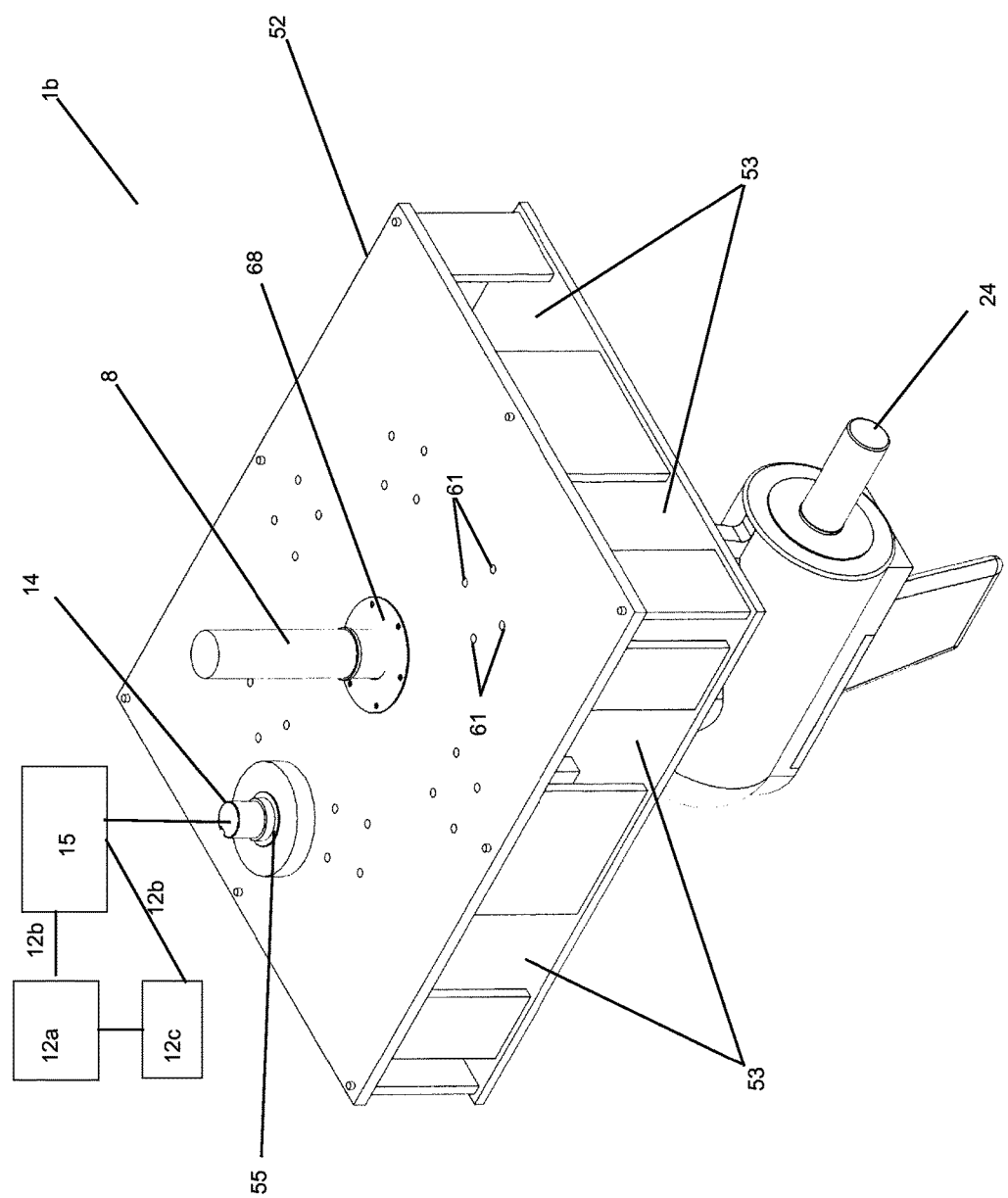
FIG. 21: is a perspective view of a rotational propeller drive system with a drive shaft that may be coupled with, and/or responsive to, and/or continuous with a drive shaft from a variable coupler drive in one embodiment thereof.

Referring now to FIGS. 1-8 as well as 12, 13 and 18, in some embodiments a spinner (5) may be adaptably secured, or coupled with at least one adaptable support bracket (7) through at least one rotational joint (4). In certain embodiments, this adaptable support bracket (7) may be stationary or non-rotational such that it may form an adaptable connection allowing, perhaps, the spinner (5), to laterally slide along the length of a rotatable cylinder (1) independently rotationally supported by one or more rotational joints (4). In a preferred embodiment, as shown in the above referenced figures, such an adaptable support bracket (7) may be comprised of at least one upper bracket member (36), secured with at least one lower bracket member (37). As can be seen in FIGS. 12 and 18, both the upper- and/or lower bracket members (36) and (37), when coupled may form an internal rotational joint aperture (38). In some embodiments a rotational joint (4) such as a bearing joint may be positioned within this internal rotational joint aperture (38) and further be coupled to, for example, a spinner (5). In this embodiment, the spinner (5) may independently rotate in response to the action of a rotatable cylinder (1) while the upper- and/or lower bracket members (36) and (37) remain stationary. As will be detailed below, the brackets ability to remain stationary may facilitate the adjustable slide movement of the spinner (5) element allowing it to be positioned at a desired position along a variable drive ratio pathway (13).

In certain embodiments the upper- and/or lower bracket members (36) and (37) may be secured by at least one lock including, but not limited to a: snap lock; fitted lock; pressure lock; quick release lock; slide lock and the like. In this manner, the bracket elements may be easily removed to facilitate repair and/or replacement of, for example, a spinner (5), rotational joint (4) or even a rotatable cylinder (1). Additional embodiments may include an adaptable support bracket buffer. In certain embodiments, this may provide a buffered connection between the drive table (7) and spinner (5). Such a buffer may also provide, for example a mechanism to bring into contact the spinner (5) and drive table (7) element, perhaps through a hydraulic actuator or clutch mechanism and the like.

As noted previously, certain embodiments of the inventive technology may include adjustably positioning a spinner (5) along a variable drive ratio pathway (13). Referring generally to FIGS. 1-8, this adjustable positioning of a spinner (5) may be achieved in some embodiments through activation of at least one variable position driver (10), perhaps in response to a control signal, which may further be coupled with a variable position track (9). In a preferred embodiment, as shown in FIG. 1, an adaptable support bracket (6) may be coupled with a variable position track (9), perhaps through a variable position track mount (39). Such a variable position track mount (39) may be integral with an adaptable support bracket (6), or may be a disparate, non-integral element, perhaps secured to an adaptable support bracket (6) through a plurality of anchor positions and/or detachable anchors. Moreover, in certain embodiments this variable position track mount (39) may include, but not be limited to: a rail variable position track mount; a threaded variable position track mount; a hydraulic responsive variable position track mount and the like.

Again referring to FIG. 1, in one embodiment a variable position driver (10) may be coupled with a variable position track (9), perhaps through a variable gear position coupler (48). In a preferred embodiment, an adaptable support bracket (6) may be responsive to the action of the variable position driver (10) such that it may adjustably position the adaptable support bracket (6)—as well as the coupled spinner (5)—to a position along a variable drive ratio pathway (13). In certain embodiments, such a variable position driver (10) may include, but is not limited to: a variable position slide driver; a variable position rail driver; a variable position magnet driver; a variable position motor driver; a variable position electro-driver; a variable position spring driver; a variable position servo-motor driver; a variable position pressure driver; a variable position pneumatic driver; a variable position manual driver; an automatic variable position driver; a variable position hydraulic driver and the like.

In another preferred embodiment, as shown in FIGS. 1-8, an adaptable support bracket (6) securing a spinner (5) may be coupled with a variable position track (9). In some embodiments this coupling may be accomplished though a variable position track mount (39)—which further may be integral—and/or non-integral with an adaptable support bracket (6). Again referring to FIG. 1 as one example, a variable position driver (10), for example a motor, may output a rotational drive output (2) causing a variable position track (9) to rotate. In this embodiment, such a variable position track (9) may be coupled with a variable position track mount (39) through a threaded connection. In this embodiment, rotation of the variable position track (9) may cause the threaded movement of the variable position track mount (39) along the length of a corresponding rotatable cylinder (1) adjustably positioning the spinner (5) to a desired position along a variable drive ratio pathway (13). Naturally, in this embodiment, reversing the rotational drive input from the variable position driver (10) may cause the variable position track (9) to rotate in the opposite direction allowing for the multi-directional positioning control of the spinner (5) along a variable drive ratio pathway (13).

In another embodiment for example, a hydraulic variable position drive may be responsive to an adaptable support bracket (6) and adjust its position along a variable drive ratio pathway (13) where the variable position track (9) remains stationary acting, perhaps as a guide to position an adaptable support bracket (6) adjacent to a rotatable cylinder (1). Indeed, it should be noted that such exemplary embodiments are not limiting. By illustration, additional embodiments may include, but are but not limited to: a screw; a threaded rod; an all-thread rod; a rail; extendable track; a spring responsive track; a hydraulic responsive track; a pressure responsive track; and a pneumatic responsive track and the like. Moreover, in certain embodiments, the variable position track (9) may include one or more one mechanical stops perhaps positioned at the terminal ends of the track and/or brake(s). In addition, other embodiments may include a plurality of synchronized variable position drivers operating in a synchronized manner. While additional embodiments may include, perhaps, a plurality of opposing synchronized variable position drivers perhaps placed at opposite terminal ends of a variable position track (9).

In addition, as shown in FIG. 1, in some embodiments one or more variable position driver(s) may be secured to a base support through at least one detachable anchor support. Examples of such anchor supports may include, but are not limited to: a snap anchor support; a slide anchor support; a screw anchor support; a clamp anchor support; a ring anchor support; a hook anchor support; a quick release anchor support; a pressure anchor support and the like. Naturally, the ability to easily attach and/or remove a variable position driver (10) may have obvious benefits in repair, as well as replacement, of various parts of the system.

Additional embodiments of the inventive technology may include one or more a variable gear position coupler(s) (48). In some embodiments this coupler may join, and/or transmit, for example, a rotational drive input (2), or other input, such as hydraulic, pneumatic or mechanical power, from a variable position driver (10) to a variable position track (9) and/or an adaptable support bracket (6). In some instances, such a coupler may include a tractable coupler allowing, perhaps, movement or flexibility in the connection in a plurality of directions. In additional embodiments, as noted above, it may be desirous to increase and/or decrease the variable position driver (10) output. As such, in certain embodiments, such a variable gear position coupler(s) (48) may include an RPM/gear increaser linking a variable position driver (10) to a variable position track (9) and/or an adaptable support bracket (6).

Referring now to FIGS. 1-8 and 19, in one embodiment the inventive technology may controllably rotate a drive table (7), perhaps in response to the rotational action of a spinner (5), to accept, store and transmit, in this case rotational energy, to accomplish perhaps mechanical work. As noted above, in some embodiments, it may be desired to increase the frictional force of the connection between the drive table (7) and spinner (5) elements. As such, in certain embodiments a drive table frictional membrane (40) may be positioned on the surface of a drive table (7). It should be noted that a frictional membrane may generally be any material or application that may increase and/or generate a frictional force that is greater, and/or transmit a force more efficiently than that generated through contact of a spinner and drive table without such a membrane or other application. In certain embodiments, a drive table frictional membrane (40) may include, but not be limited to: a composite membrane; a plastic membrane; a resin membrane; a carbon-coated membrane; a rubber membrane; a vulcanized rubber membrane; an epoxy membrane; an oil membrane; and a petroleum-based membrane. Additional embodiments may include a continuous frictional membrane applicator which, for example, may supply a continuous frictional membrane material, such as oil to the surface of a drive table (7), as well as, perhaps, a sealed catch enclosure. Moreover, such frictional membrane (40) may be replaceable, detachable, as well as an integral frictional composite, such that the frictional membrane may be integral to, or may actually form the drive table (7).

As previously discussed, in some embodiments a spinner (5) may be positioned along a variable drive ratio pathway (13). As noted, the drive-ratio may be altered by positioning the spinner (5) closer to, or away from the central rotational axis of the drive table (7). Whether the spinner is initially in contact with, or brought into contact with the drive table—or vice versa, it may be advantageous to move the spinner to a de-coupled position. It may further be beneficial to de-couple the spinner (5) from the drive table (7) without having to move the spinner to a position away from the drive table (7). As such, referring to the drive table (7) in FIG. 3, certain embodiments of the inventive technology may include one or more neutral positions—or a position where the spinner (5) and drive table (7) are de-coupled and no drive ratio is generated or rotational movement/energy is transmitted. In one embodiment a spinner (5), perhaps moving laterally across the face of a drive table (7), is positioned over and integral neutral position (41), in this case a hollow channel where it is no longer in contact with, or has become de-coupled from the drive table (7). In additional embodiments, such an integral neutral position (41) may also include at least one integral gradient surface (42). In certain embodiments, this integral gradient surface (42) may provide a gradient or sloping surface such that, for example, a spinner (5) moving laterally from a neutral position may be increasingly loaded onto the surface of the drive table (7). Such neutral positions may be centrally positioned, or perhaps placed at intermittent positions away from the drive table's rotational axis. Finally, there may exist in some embodiments a spaced position outside of, or external to the drive table circumference.

Figure 8:
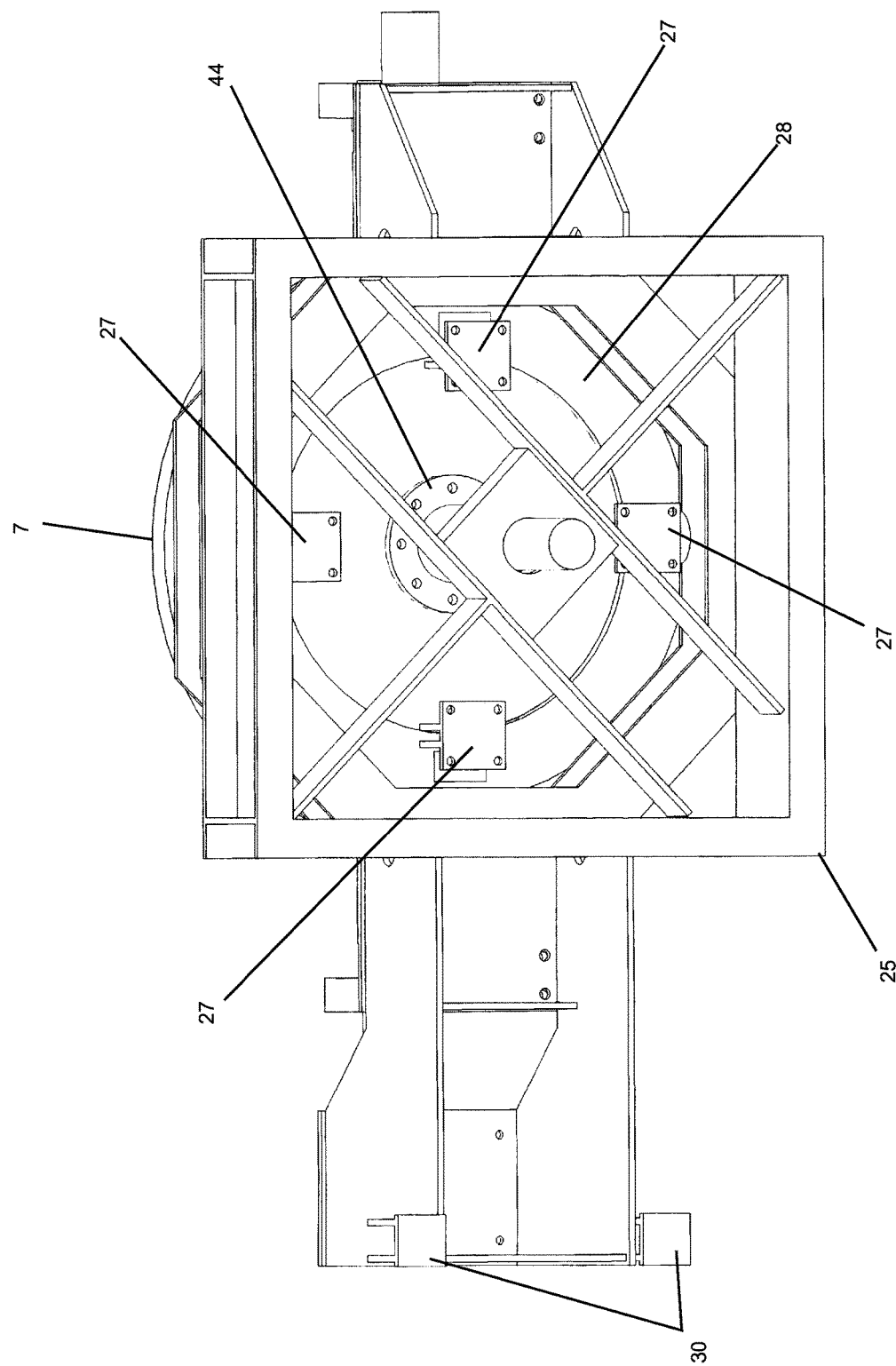
FIG. 8: is a bottom perspective view of a variable coupler drive in one embodiment thereof.
Figure 9:
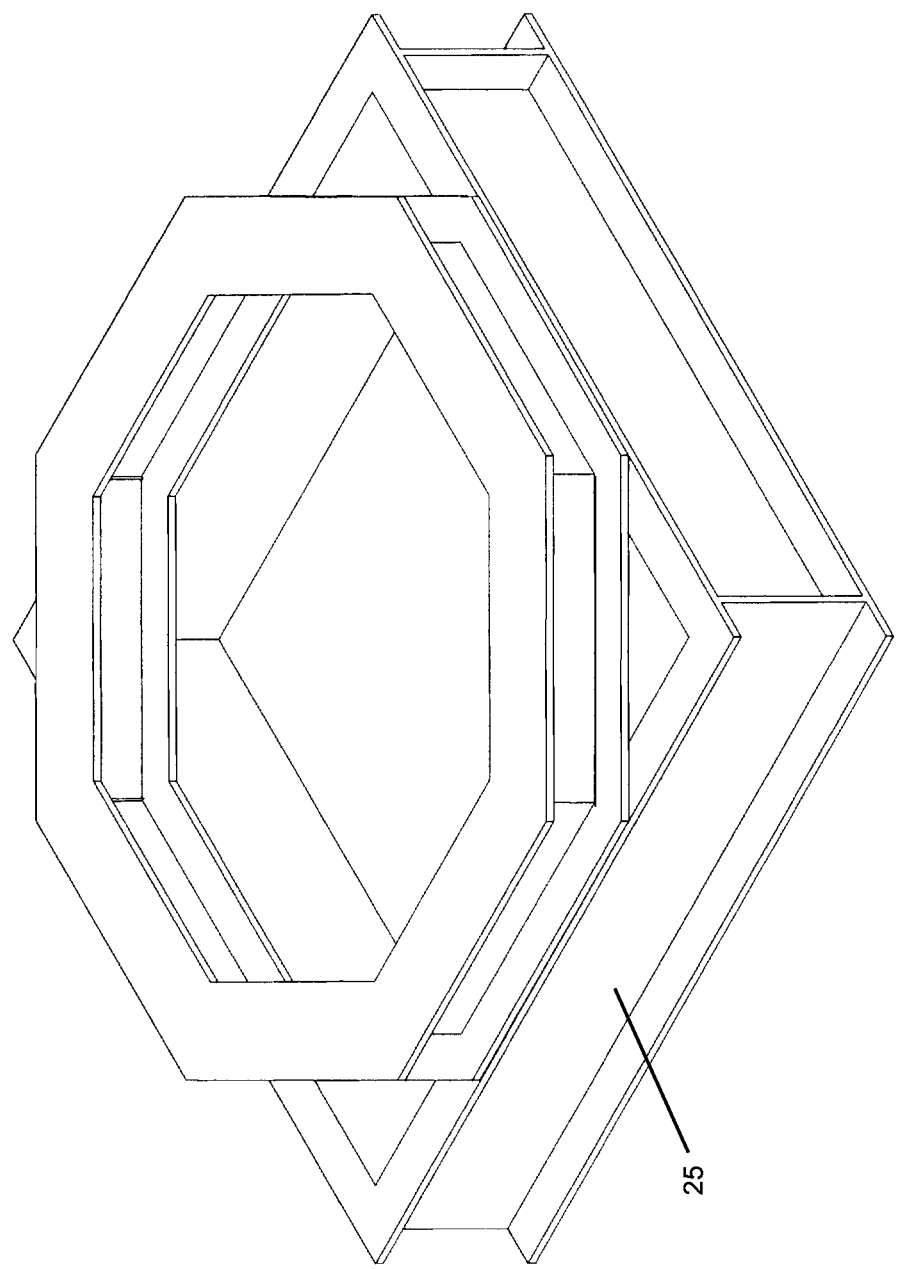
FIG. 9: is a translatable drive table support mount in one embodiment thereof.
Figure 10:
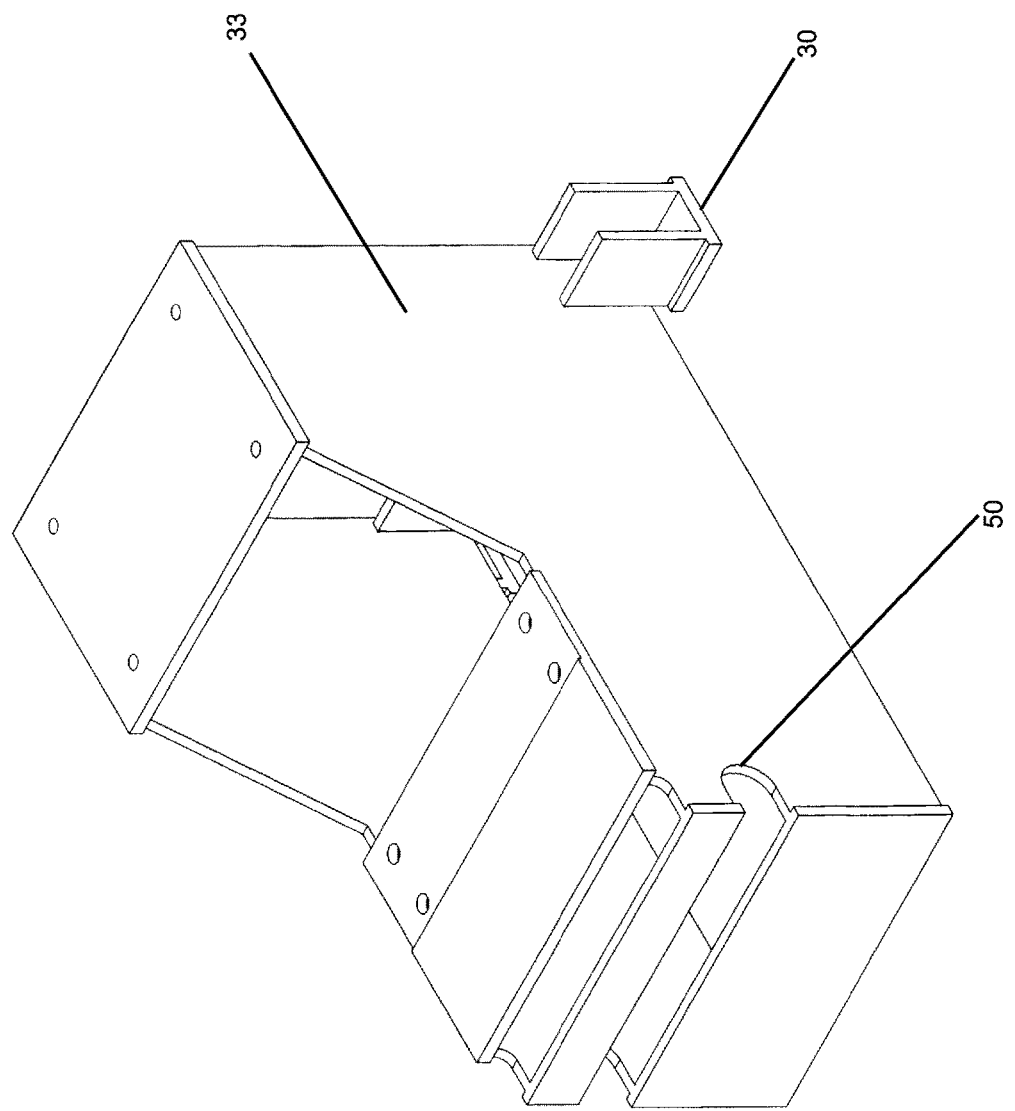
FIG. 10: is a drive base support in one embodiment thereof.
Figure 11:
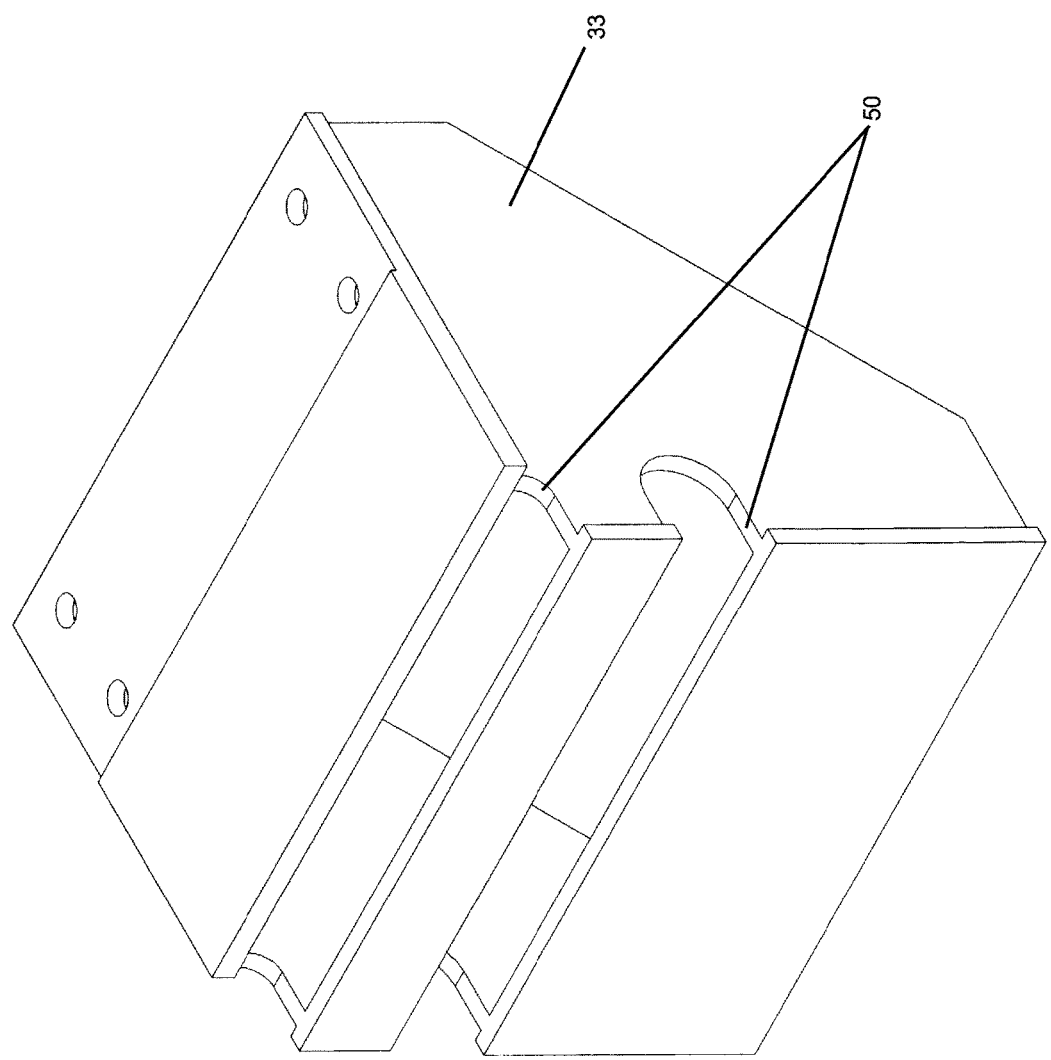
FIG. 11: is an alternative drive base support in one embodiment thereof.
Figure 16:
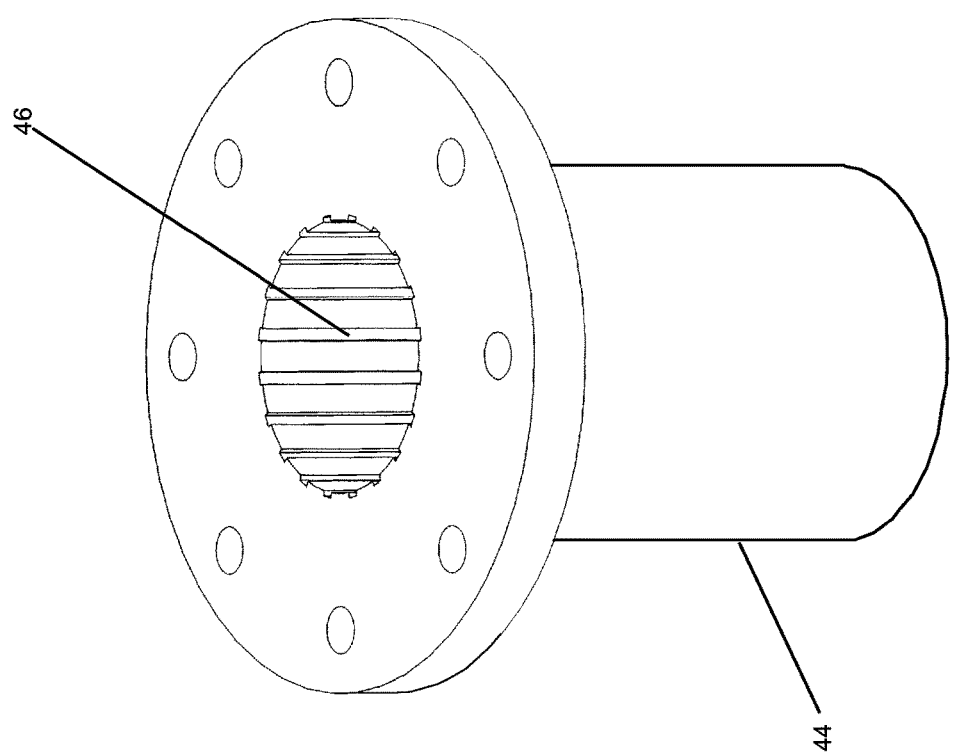
FIG. 16: is a drive shaft support coupler having a drive shaft coupler support interface in one embodiment thereof.
Figure 17:
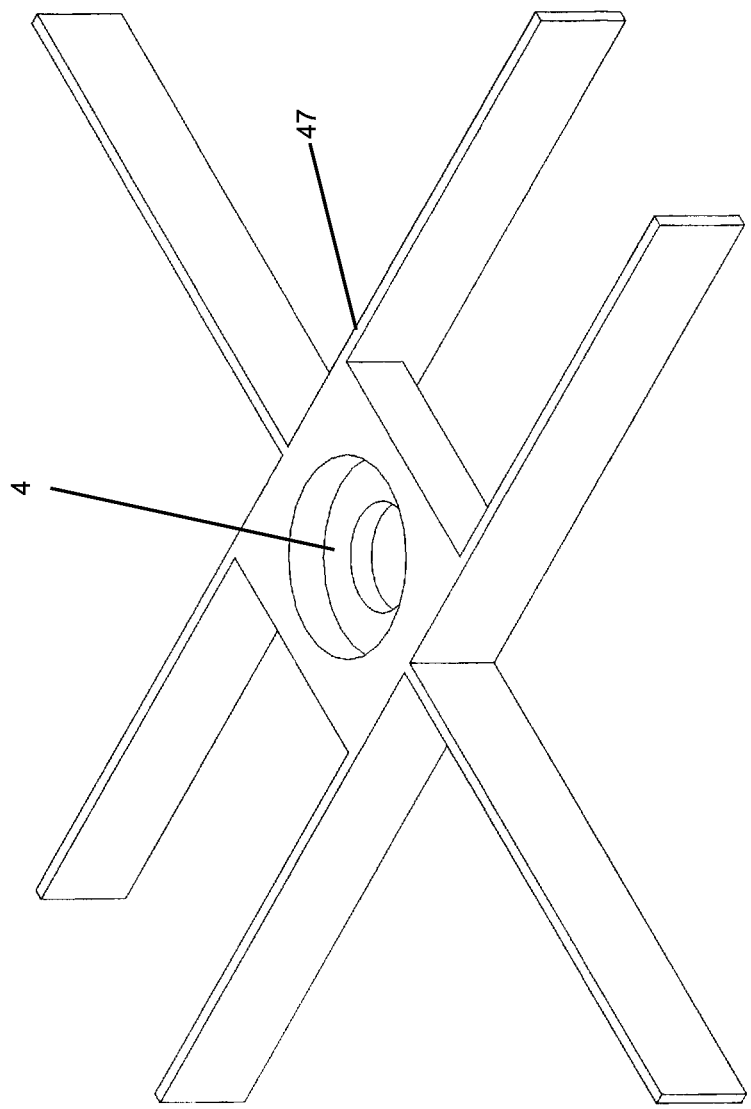
FIG. 17: is a drive shaft support in one embodiment thereof.

Referring generally to FIG. 8, certain embodiments of the inventive technology may include a rotatable drive shaft (8) coupled with a drive table (7). Specifically, as shown in FIGS. 8 and 16, in some embodiments a rotatable drive shaft (8) may be coupled with a drive table (7) through a drive shaft support coupler (44) which may be anchored to the drive table (7) perhaps through one or more anchor points and/or attachments. Again, as shown in FIGS. 8 and 16, the drive shaft (8) may be coupled with the drive shaft support coupler (44) through an interlocking interface. Specifically, in some embodiments a drive shaft coupler interface (45) may be fitted within a drive shaft coupler support interface (46) forming a slidable spline connection. As will be shown below, such a slidable interface may allow movement of the drive table and/or drive shaft which may disengage the connection or in some instances act as a buffered coupling between the two elements while continuing to allow transmission of rotational energy.

In still further embodiments not specifically shown, the inventive technology may include an additional manner of RPM control. In such an embodiment a drive shaft (8) may be separated into disparate or individual sections which are linked together through, perhaps, a drive shaft RPM/gear adjustor (not shown). In such a configuration the anterior (or input) drive shaft section may rotate at a desired RPM, and through action of a linking drive shaft RPM/gear adjustor, the posterior (or output) drive shaft section may rotate at an adjusted (faster or slower) RPM. In such a configuration, multiple drive shaft RPM/gear adjustors may be intermittently place at desired intervals of a drive shaft (8) allowing for additional drive shaft RPM control which, as can naturally be deduced, may adjust the RPM input and subsequent output of the system. Such a drive shaft responsive RPM/gear adjustor(s) may in some embodiments include a planetary or compound gear system, or perhaps any suitable RPM adjusting connection known in the industry. This drive shaft RPM control may further be responsive to a drive table (7) and may allow for an additional layer of RPM control of the system ultimately providing another avenue to control and/or optimize the system's output.

Figure 7:
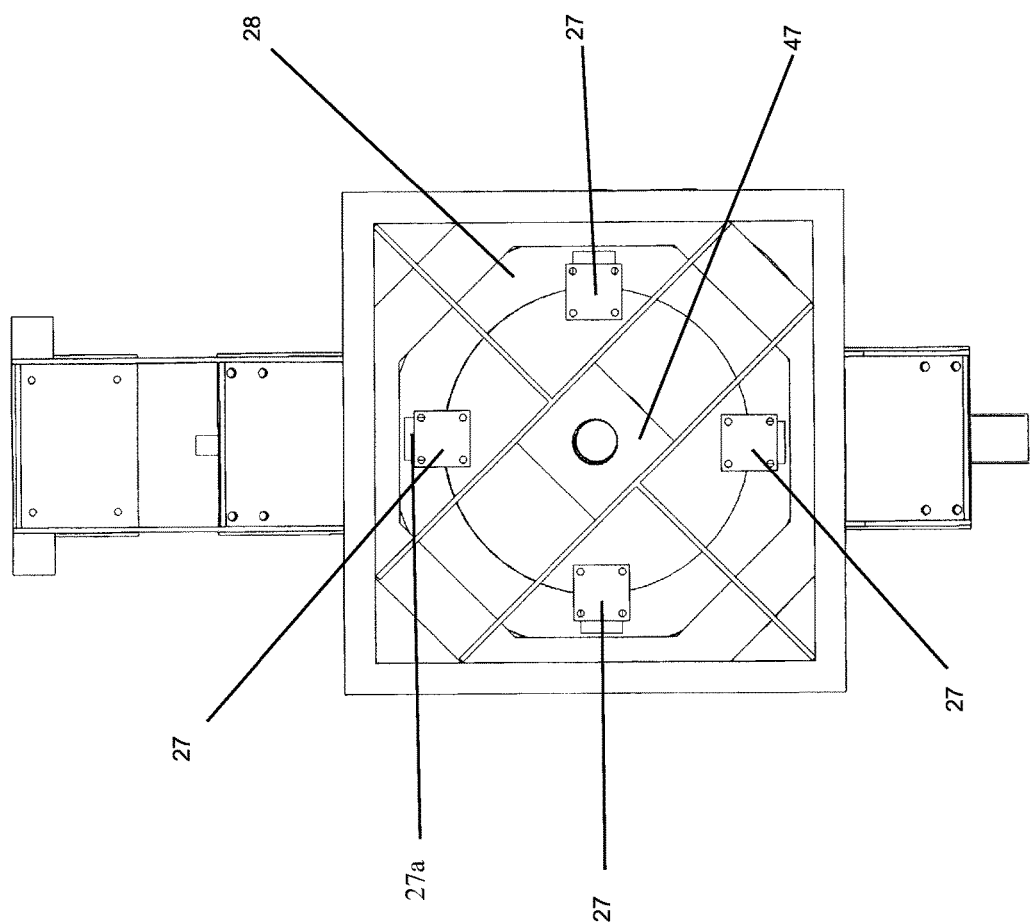
FIG. 7: is a bottom view of a variable coupler drive in one embodiment thereof.

Generally referring to FIGS. 7-8, certain embodiments of the invention may include a rotational support base (27). In this embodiment, such a rotational support base (27) may include rotational support elements coupled with a drive table (7) such that the drive table (7) may rotate freely in response to the action of a rotating spinner (5) element. This rotational support base (27) may include any appropriate support capable of supporting and/or allowing rotation of a supported drive table (7). In a preferred embodiment, a rotational support base (27) may include at least one roller element secured to a roller support mount through a rotational joint. In this embodiment, for example a plurality of roller elements, such as a cam may be secured to a roller support mount which may further be joined with a translatable drive table support mount (25). As shown in FIG. 7, a drive table may be rotatable and supported on a roller element(s) which may allow the drive table (7) to freely rotate in response to the action of a rotating spinner (5) element. In alternative embodiments such a rotational support base (27) may include a plurality of buffered roller support mounts. Examples of such buffers may include, but are not limited to: shock absorbers, hydraulic buffers, mechanical buffers, spring buffers, slide buffers and the like. Such roller supports mounts may be independently buffered, such that each individual roller mount may be supported by an individual buffer element. In still further embodiments, such roller mounts may be supported by a single buffer, perhaps coordinated with each support mount, or perhaps a buffer coupled to a secondary element which may be secured to, and/or coordinate individual roller mounts, such as a transverse plate (49).

Additional embodiments not shown may include a rotational joint (4) coupled to a drive table (7). In this embodiment, a drive table (7) may be rotationally supported by a rotational joint (4) such that it may allow a drive table (7) to freely rotate in response to the action of a rotating spinner (5) element. Such a rotational joint (4), in this embodiment, may include but may not be limited to a gear plate coupled to a drive table (7). Examples of such a gear plate may include, but may not be limited to: a thrust bearing; a thrust joint; a thrust ball bearing; a cylindrical thrust roller bearing; a tapered roller thrust bearing; a spherical roller thrust bearing; a magnetic bearing, a fluid bearing, a fluid-film thrust bearing; a roller; a cam roller; a rotational joint; a rotational plate and the like. In addition, in certain embodiments this gear plate may also be buffered. Examples of such buffers may include shock absorbers, hydraulic buffers, mechanical buffers, spring buffers, slide buffers and the like.

As discussed above, in certain embodiments it may be desirous to modify the rotational velocity of, perhaps a drive table (7) or another element of the invention, such as the spinner (5). In addition, it may be desirous to provide resistance to the system to modify the output transmitted by the rotating drive table (7), as well as perhaps stop the drive table all together. As such, in certain embodiments, the inventive technology may include at least one rotational support base (27) brake (not shown). Such a brake may be selected from the group consisting of: a disc brake; a pressure brake; a hydraulic brake; a mechanical stop; and a friction brake. In addition, such a brake mechanism may be applied to, for example, a roller element supporting a drive table (7), or perhaps even the drive table (7) itself. In some embodiments, such a brake (not shown) may be independent of a rotational support base (27) and maybe applied to a drive table (7), a spinner (5), a drive shaft (8), a rotatable cylinder (1) and/or any combination therein to adjust the rotation or movement of any element. Such brake elements may further be responsive to a controller (12a), a control signal (12b), a sensor (12c) or may be manually applied.

In addition, in an embodiment not shown, it may be desired to maintain the drive table in a planar and/or substantially planar position—whether in a horizontal, vertical or even angled position—to perhaps provide a constant and/or significant coupling. As such, certain embodiments may include at least one rotational support base stabilizer. Such a stabilizer may include, for example a hydraulic stabilizer or other mechanical stabilizer, such a spring that maintains the drive table (7) in a substantially planar position. In additional embodiments, a stabilizer may provide a pressure force to push the drive table (7) into a spinner (5)—or vice versa—to the desired drive table/spinner pressure coupling interface.

Referring again to FIGS. 7-8, and 20-21, in one embodiment the inventive technology may include a rotational interface surface (28). In a preferred embodiment, such a rotational interface surface (28) may be positioned on the drive table (7) and, as detailed in FIG. 8, may provide a coupling surface for a corresponding rotational support base (27), for example a roller element (27a). In certain embodiments, such a rotational interface surface (28) may provide a reinforced surface to prevent wear on the drive table (7), while additional embodiments, such rotational interface surface (28) may include a surface that provides a desired frictional resistance that may, for example, allow such a drive table (7) to more easily rotate, and/or overcome its natural inertia in response to the action of a spinner element (5), or alternatively provide a desired braking surface to slow or stop the rotation of the drive table, perhaps in response to a braking element discussed above. In still further embodiments, such a rotational interface surface (28) may provide an attachment position for a rotational joint (4) such as a gear plate. This rotational interface surface (28) may include, but are not limited to: a plastic a rotational interface surface; a composite a rotational interface surface; metal a rotational interface surface; a rubber a rotational interface surface; a synthetic rotational interface surface; a frictional rotational interface surface; a hybrid a rotational interface surface and the like.

In still further embodiments, such a rotational interface surface (28) may include a rotational track. In this embodiment, such a rotational track may provide an interface position whereby an associated drive table (7) may be supported, again perhaps by a rotational support base (27), again, in this embodiment, a roller element (27a). This rotational track may include, for example one or even a plurality of extended and/or channeled surfaces such that, for example, a rotational support base (27) may be coupled within the extensions and/or channels providing a rotational guide track. Such a guide track may, in some embodiments comprise an internally secured rotational track. In this embodiment, a rotational interface surface (28) may be positioned within and/or secured within a drive table (7) and may provide a flush surface. Such a guide track may be formed from a separate element as described above, or may be integral in nature, for example an integral channel in a drive table (7) that may be coupled with a rotational base support (27).

A rotational interface surface (28), in other embodiments may include an internal rotational track guide. In such an embodiment, for example a rotational support base (27), such as a roller (27a), or even an gear plate (not shown) may be internally secured within an internally positioned guide channel. Such an internal rotational track may help support as well secure a rotatable drive table (7), as well as assist in maintaining an approximately planar position and, as will be shown below, perhaps assist in physically lifting and/or retracting the drive table (7).

As noted in FIGS. 1 and 6, various elements of the current system may include but are not limited to, a rotational drive output (2), or variable position driver (1) that may be responsive to a control signal (12b). Such a control signal (12b) may be derived, for example, from a controller (12a) or even a sensor (12c). In a preferred embodiment, such a controller and/or sensor may be a novel computerized, software, or hardware based solution or combination thereof that may have the ability to control, sense, compile, compute, alert, calculate and optimize the operating parameters, configurations, engagement, disengagement, operation and/or output parameters of the various elements of the current inventive technology. In a general sense, a controller in some instances may be able to coordinate the operation of the various elements so as to optimize, according to a desired target, the systems output which may be expressed in some instances as an input, output, mechanical load or work, resistance or other such parameter. In a preferred embodiment, a controller may be able to detect an output or input and/or a change in output or input and adjust the function of any of the operational configurations of the described elements in response to that output or input. In addition, an output parameter may be any operational variable that may affect the systems input, operation and/or output. Such output parameters and changes over time may be sensed, tracked, calculated and presented as a sensible indication, perhaps through a computer interface by a controller. In certain other embodiments, such a control signal may include, but is not limited to: a wired control signal; a wireless control signal; a mechanical control signal; an electronic control signal; an output signal; input signal; an RPM output signal; rotational drive input; a resistance control signal; a directional control signal and the like.

One of the objectives of the current invention may be to provide a mechanism to couple and/or decouple a spinner (5) element and a drive table (7). As such, in a preferred embodiment, the inventive technology may include a variable coupler drive switch (25a) which may be comprised of a translatable drive table support mount (25) positioned such that a spinner (5) may be rotationally responsive to a drive table (7) and a drive table actuator (26) secured to a translatable drive table support mount (25) such that the drive table (7) may be de-coupled from the spinner (5) through operation of an actuator such that the spinner (5) is not rotationally responsive to a drive table (27).

Again referring to FIG. 3, in a preferred embodiment a translatable drive table support mount (5) may be tractably coupled with its corresponding drive base support(s) (33), perhaps by a translatable attachment, such as: a slide attachment; a stack attachment; a transient attachment; a spring loaded attachment; a detachable attachment; a bearing joint attachment and the like. Such a tractable connection may include a tractable interface wherein the coupling between individual elements may be adjustable. In a preferred embodiment, the action of a drive table actuator (26), for example a hydraulic actuator, may retract the translatable drive table support mount (25) de-coupling the drive table (7) and a spinner (5). Naturally, in other embodiments, the reverse action of that same drive table actuator (26), for example a hydraulic actuator, may extend moving the translatable drive table support mount (25) upward bringing the drive table (7) into contact with the spinner (5). As previously noted, this variable coupler drive switch (25a) may be assisted in some embodiments through the drive shaft coupler interface (45) which may be fitted within a drive shaft coupler support interface (46) forming a slidable spline connection. As such, in some embodiments, as a result of the action of a drive table actuator (26), such a slidable interface may allow movement of the drive table and/or drive shaft without requiring a disengagement step, and may also continue to transmit stored rotational energy from the drive table (7).

In alternative embodiments, a translatable drive table support mount (25) may be initially positioned such that the spinner (5) may be rotationally de-coupled from the drive table (7) and brought into contact with the spinner (5) through operation of a drive table actuator (26). In still further embodiments, for example as shown in FIG. 6, a drive table (7) may be, for example, coupled with a transverse plate (49), which may further be responsive to drive table actuator (26). In a preferred embodiment, a transverse plate (49) may be secured to a rotational support base (20) and be responsive to a drive table actuator (29) such that the drive table (7) may be coupled with the spinner (5). However, it should be noted that in this embodiment the drive table (7) may be initially coupled and/or de-coupled with the drive table (7), and subsequently de-coupled and/or coupled with a spinner (5) through action of the drive table actuator (29) respectively.

Additional examples of such a translatable drive table support mount may include, but are not limited to: a spring loaded translatable drive table support mount; and a cam responsive translatable drive table support mount. Additional examples of such a drive table movement actuator may include but are not limited to: a hydraulic movement actuator; an electrical movement actuator; an automatic movement actuator; a manual movement actuator; a lever movement actuator; a motor movement actuator; a gravity movement actuator; a magnetic movement actuator; a screw-drive movement actuator; and a spring movement actuator. Additional examples of such a transverse plate may include, but are not limited to: a spring loaded transverse plate; and a cam responsive transverse plate. It should be noted that in some embodiments, for example, a drive table (7) may be retained in a coupled position relative to a spinner (5) through action of one or more springs. In this embodiment, a drive table actuator (29) may overcome, for example, the spring force de-coupling the drive table, and/or transverse plate (49), and/or translatable drive table support mount (25).

As previously discussed, one of the objectives of the current inventive technology may be to provide a variable coupler drive that may be modular, as well as easily accessible for repairs and replacement of parts. In one embodiment the invention may include at least one slide bearing (29) that may be coupled with a translatable drive table support mount (25). In this embodiment, for example, the translatable drive table support mount (25), which may be securing a drive table (7) may be de-coupled from the drive shaft (8) and other drive base supports (33), and may slide laterally outward. In this manner, the access to the drive table and other elements for repairs or replacement may be enhanced. In some embodiments, for example, a translatable drive table support mount (25) or even drive base supports (33) may be secured to a slide bearing through a slide anchor (30). Additional elements may include a slide table removal system, which may include an adjustable slide table hoist (not shown) positioned adjacent to a variable coupler drive (1*a*). Such an adjustable slide table hoist (not shown), in some embodiments may be secured to an adjustable slide table hoist rail (not shown) allowing various elements, such as a slide table (7), variable drive motor (10), a spinner (5) or even a rotatable cylinder (1) to be secured, hoisted and/or removed along a rail system for maintenance, repairs and/or replacement.

As noted previously, the inventive technology may be particularly suited for use with rotational as well as propeller drives, among other mechanical work. As such, in one embodiment, a variable coupler drive (1*a*) may be used to power a rotational drive system as well as a rotational propeller drive housing. Generally referring to FIGS. 21-30, in one preferred embodiment, such a rotational drive system may include a directional drive shaft (14) responsive to a generated drive input (15) and joined with rotational drive gear (16). This drive gear (16) may be coupled with and innervate a rotational drive band (17), which may in turn be coupled with a drive band rotational mount (18) perhaps causing it to rotate. This drive band rotational mount (18) may be joined with a rotary bearing (19) and rotationally supported by a rotational support base (20). In some embodiments, rotation of a drive band rotational mount (18) may be transmitted to a rotational propeller drive housing (21) coupled with the drive band rotational mount (18). Moreover, this rotational propeller drive housing (21) may be sealed, through a seal component (22)—which of course may not be necessary in applications that do not include the presence of water such as with a submerged propeller application. Regardless, in a preferred embodiment a drive shaft (8), coupled or perhaps continuous with the drive shaft of a variable coupler drive (1*a*) may pass through a drive band rotational mount (18) and/or a rotational propeller drive housing (21), and be independently rotated transmitting a rotational drive input (2) through a rotating drive table (7). In some embodiment, this drive shaft (8) may be coupled with a propeller shaft (24), through a fixed, or in a preferred embodiment a directional gear transmission (23*a*) and (23*b*) generating a propeller propulsion force.

In a preferred embodiment, a propeller shaft (24) may be innervated through the action of a drive shaft (8), perhaps supported by a bearing cover (68), and also may be independently rotatable 360° through the action of a rotational propeller drive housing (21) and associated elements all while maintaining its power output. As will be detailed below, in this embodiment the current invention may be adapted to new or existing ships to provide a fully rotational variably coupled propulsion drive system. Additional embodiments and elements will be taken up in turn.

Figure 31:
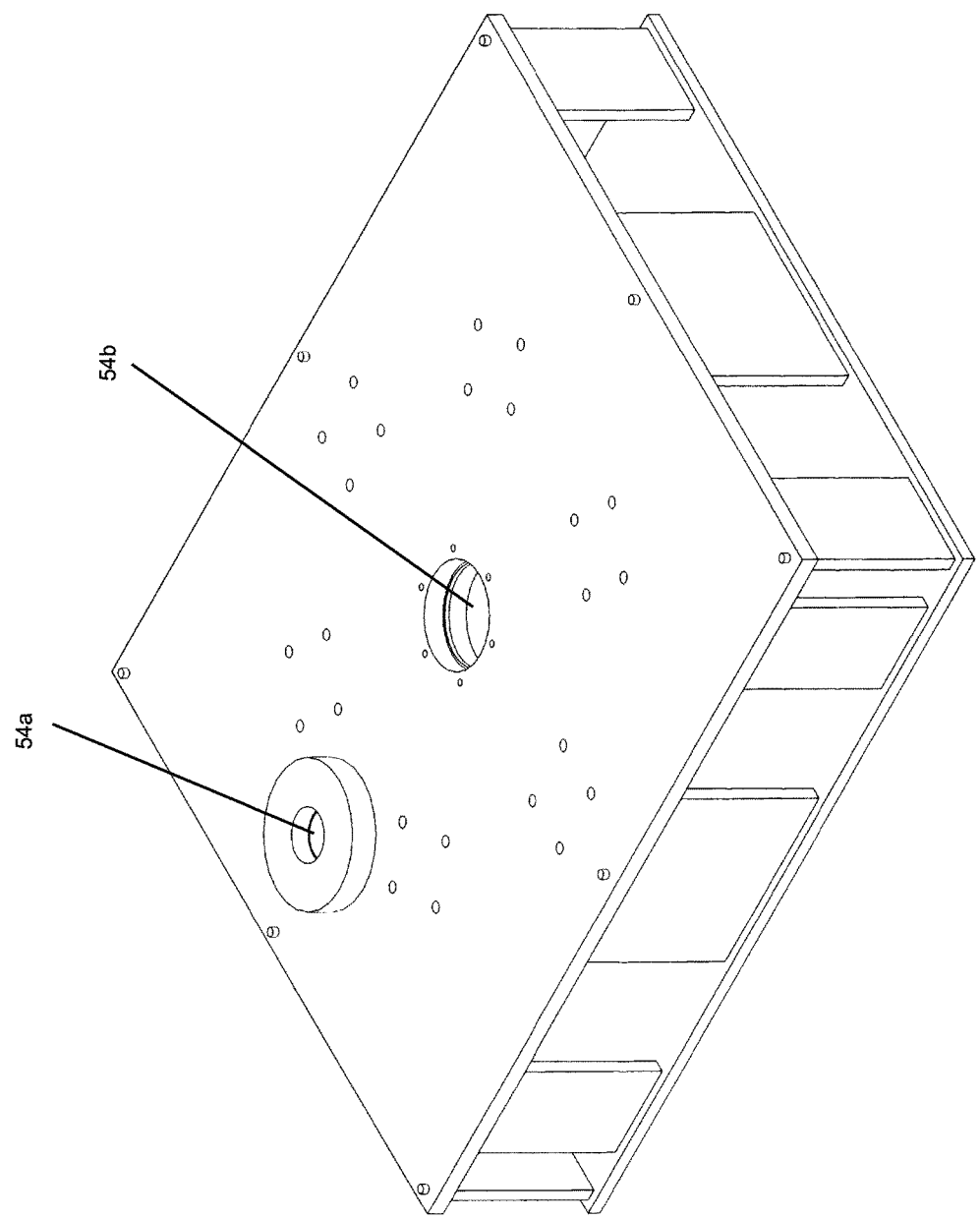
FIG. 31: is an internal housing in one embodiment thereof.
Figure 32:
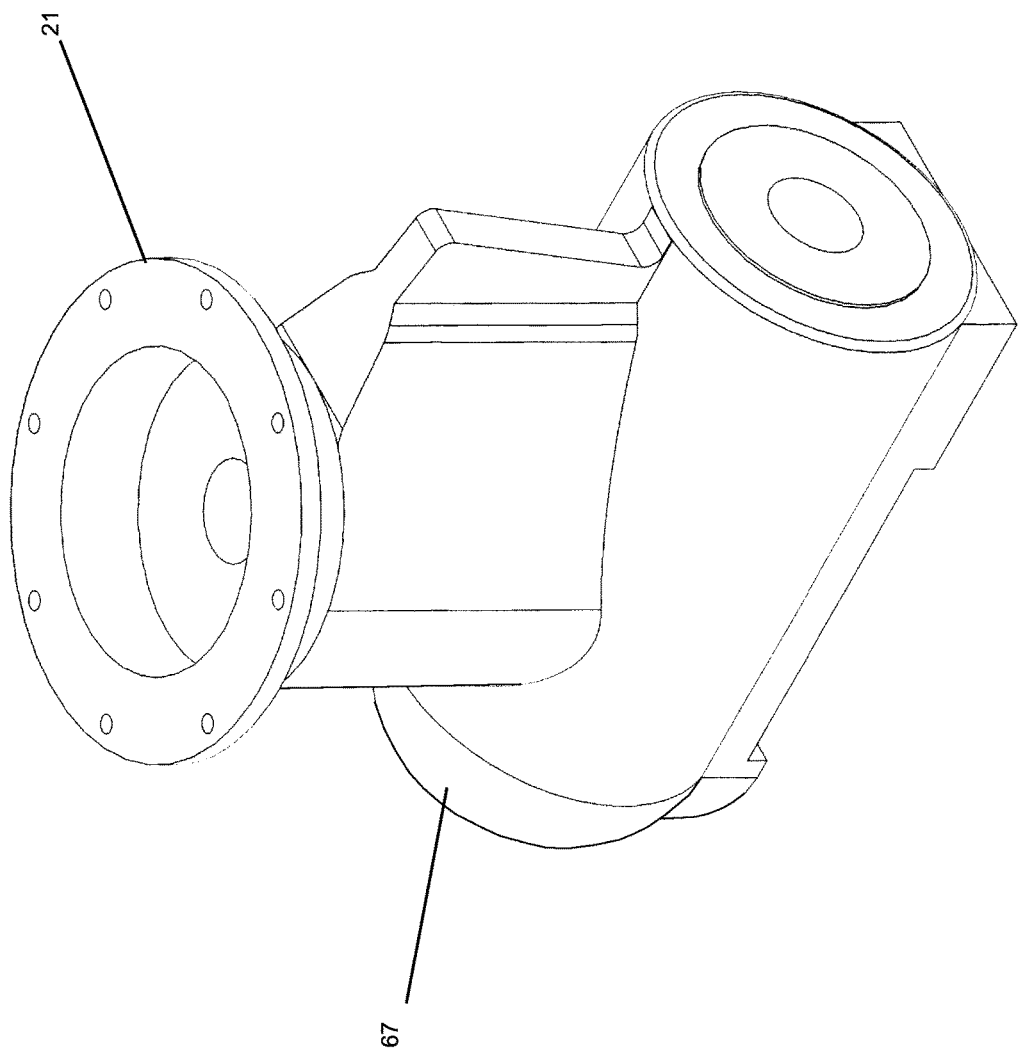
FIG. 32: is a rotational propeller drive housing in one embodiment thereof.
Figure 33:
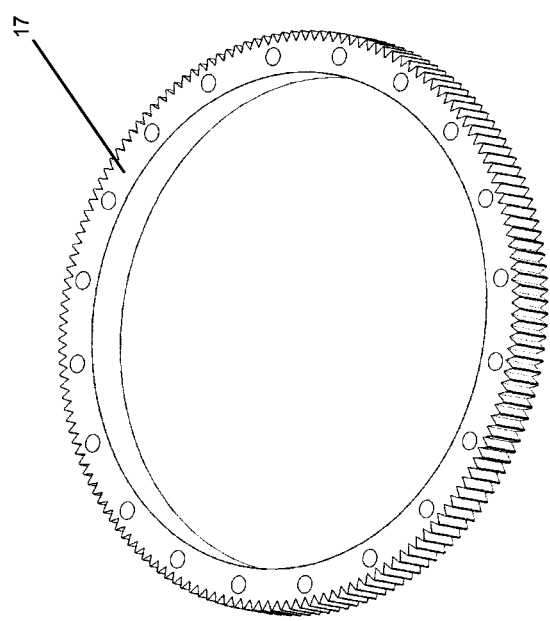
FIG. 33: is a rotational drive band in one embodiment thereof.

Generally referring to FIGS. 21-23 and 31, one embodiment of the inventive technology may include at least one internal housing (52). In a preferred embodiment, such an internal housing may, for example be coupled internally along the hull of a ship or other surface to provide perhaps protection, but perhaps even a support structure for placement of a variable coupler drive (1*a*). Additionally, as shown in FIG. 31, in one embodiment such an internal housing may have a plurality of access slots (53). Additionally, any of the various panels, including a top panel may be detachable and may be secured through detachable anchor positions. In addition, such slotted positions may allow easier access for replacement, repair, and maintenance such as lubrication and inspection. In an additional embodiment the internal housing (52) may include at least one directional drive shaft aperture (54*a*) and/or at least one drive shaft aperture (54*b*).

Figure 24:
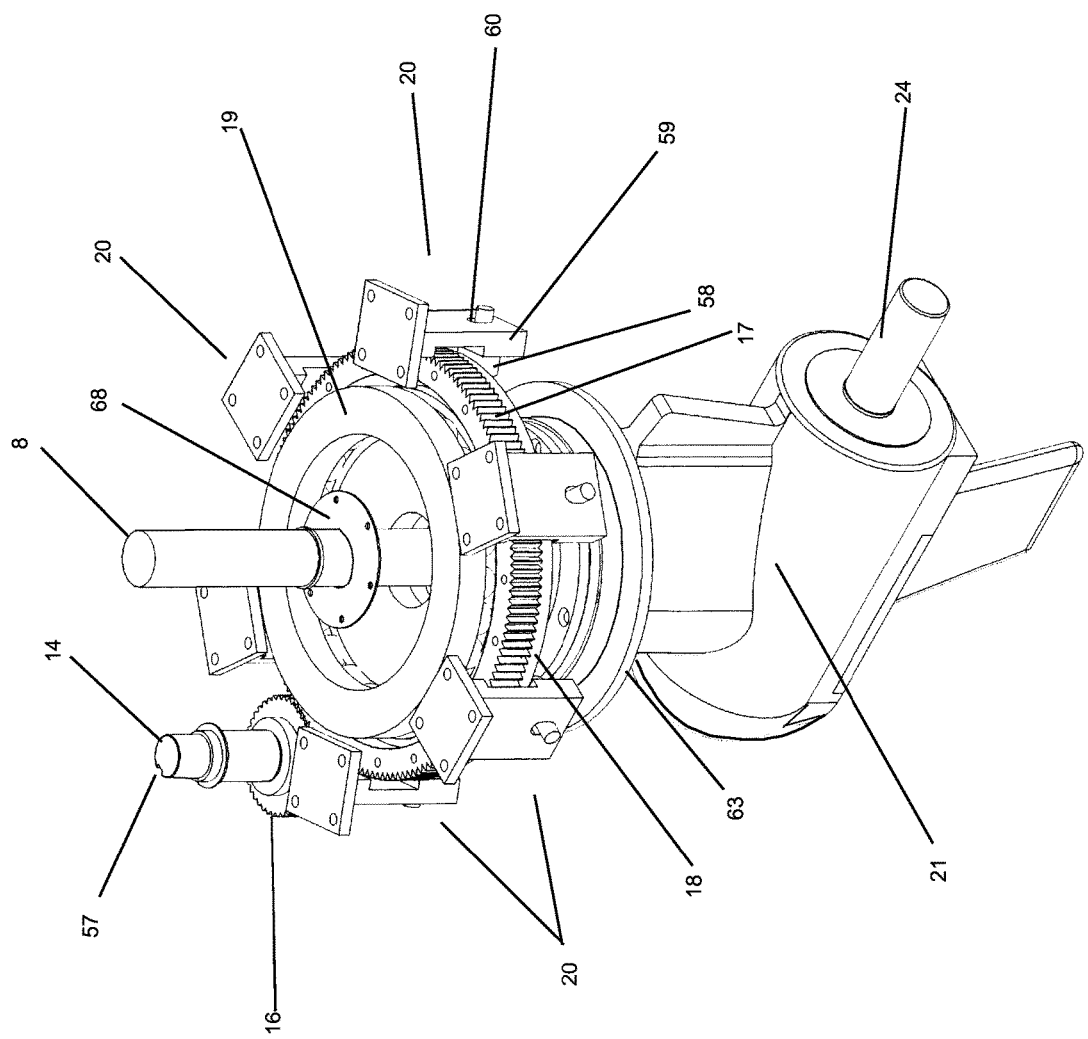
FIG. 24: is a perspective view of a rotational propeller drive system with an internal housing element removed in one embodiment thereof.
Figure 34:
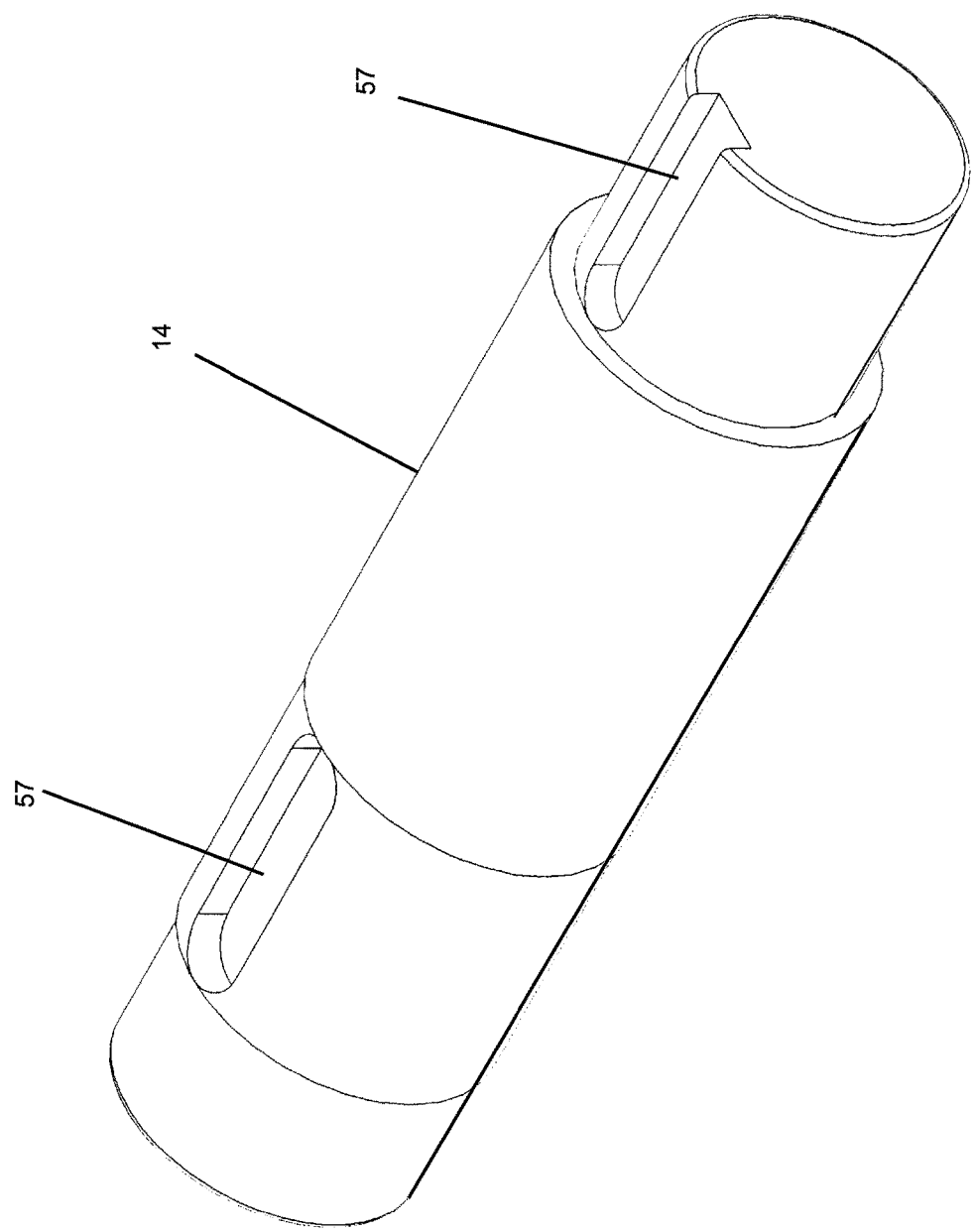
FIG. 34: is a directional drive shaft with a plurality of slide engagements in one embodiment thereof.
Figure 35:
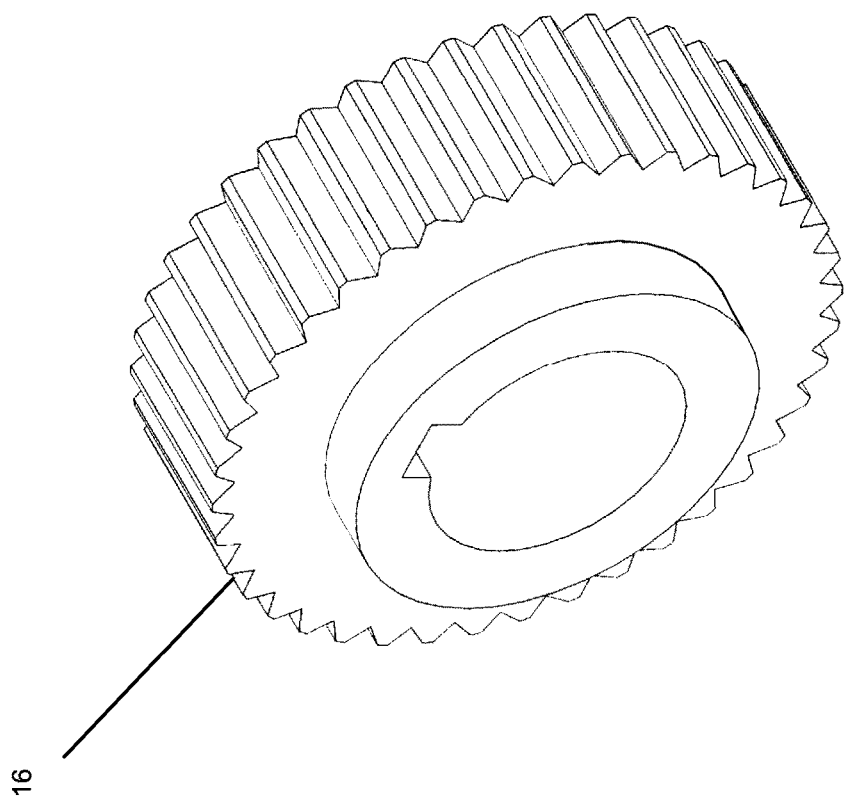
FIG. 35: is a rotational drive gear in one embodiment thereof.

As shown in FIGS. 21-30, the inventive technology in one embodiment may include at least one directional drive shaft (14) responsive to a drive input (15) which, in this embodiment, may ultimately be transmitted through various elements discussed below to initiate rotation of a rotational propeller drive housing (21). Such a drive input may include but not be limited to: a motorized power input; a steam power input; a hydro-power input; a kinetic power input; a magnetic power input; an electrical power input; a wind power input; a thermal power input; a belt-driven power input; a rotational power input; and/or a hybrid power input or the like. In a preferred embodiment, a drive input (15) may be generated and/or responsive to a control signal (12b). Additional embodiments may include a directional drive shaft (14) coupled with at least one retaining ring (55) and/or a drive shaft hub (56). As shown in FIGS. 24 and 34, in additional embodiments this directional drive shaft (14) may be coupled with rotational drive gear (16) through a slide engagement, or in an alternative embodiment a spline connection. In such an embodiment, perhaps in response to a control signal (12b), the directional drive shaft (14) may be coupled and/or de-coupled from the rotational drive gear (16).

As noted above, in certain embodiments a rotational drive band may be coupled (17) with a rotational drive gear (16). It should be noted that a variety of drive gears are contemplated as being responsive to a rotational drive band (17), including, but not limited to: a pinion; a worm gear; a bevel gear; a belt drive; or even a drive table configured to be rotationally responsive with rotational drive band (17) and the like. In addition, a rotational drive gear (16) element may include any element capable or rotation and may include, but may not be limited to: a circular gear; a gear band; a worm gear; or even a drive table configured to be rotationally responsive a to a rotational drive gear (16).

Figure 25:
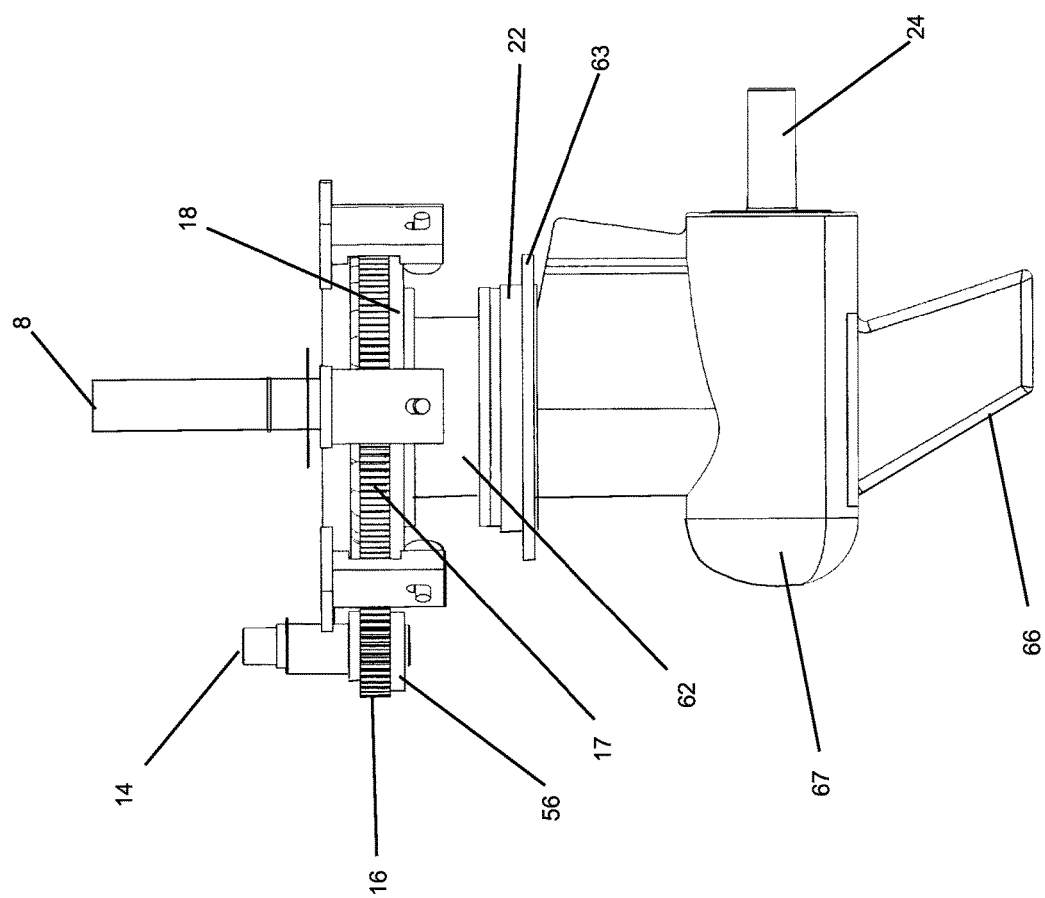
FIG. 25: is a side view of a rotational propeller drive system with an internal housing element removed in one embodiment thereof.
Figure 26:
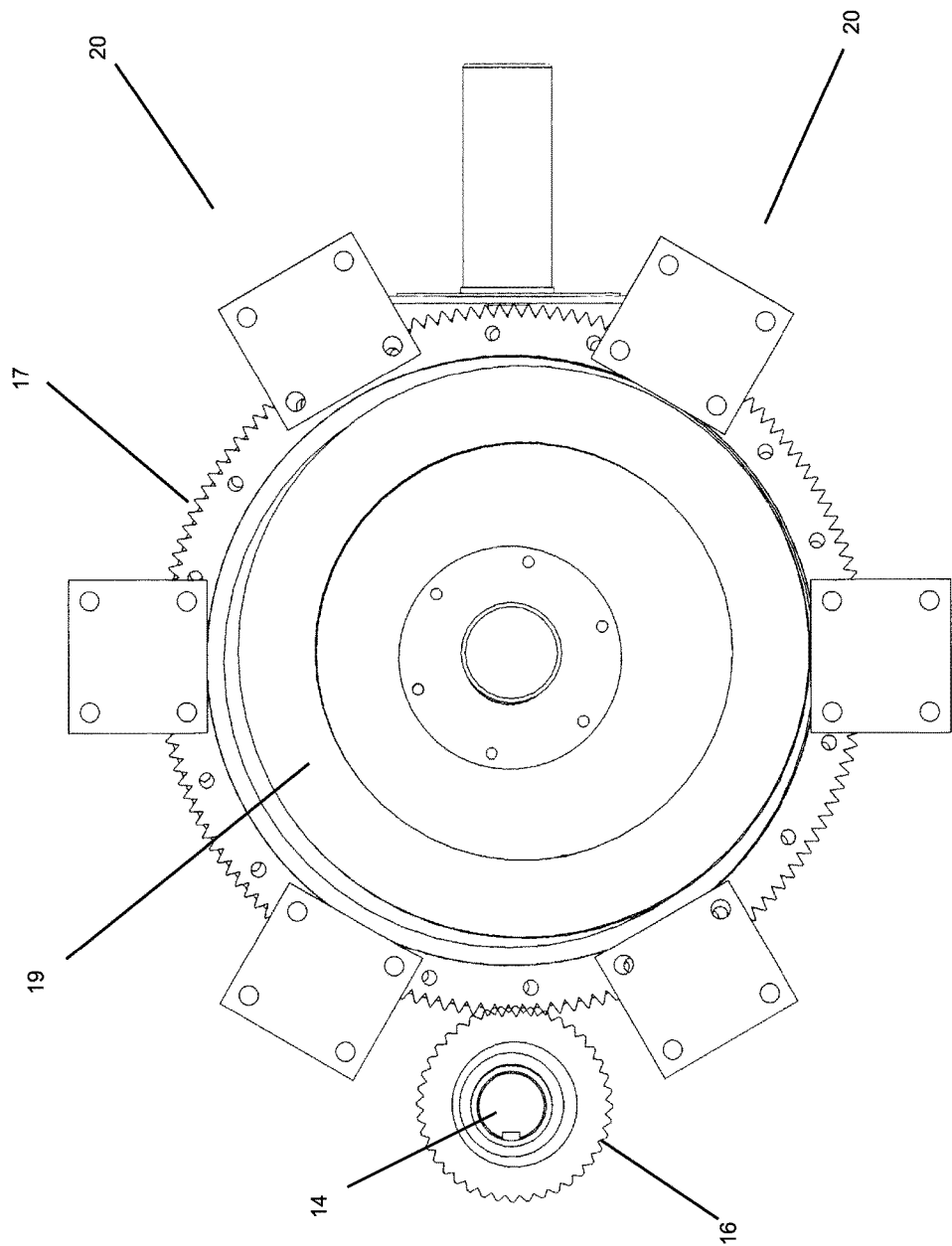
FIG. 26: is a top view of a rotational propeller drive system with an internal housing element removed in one embodiment thereof.
Figure 27:
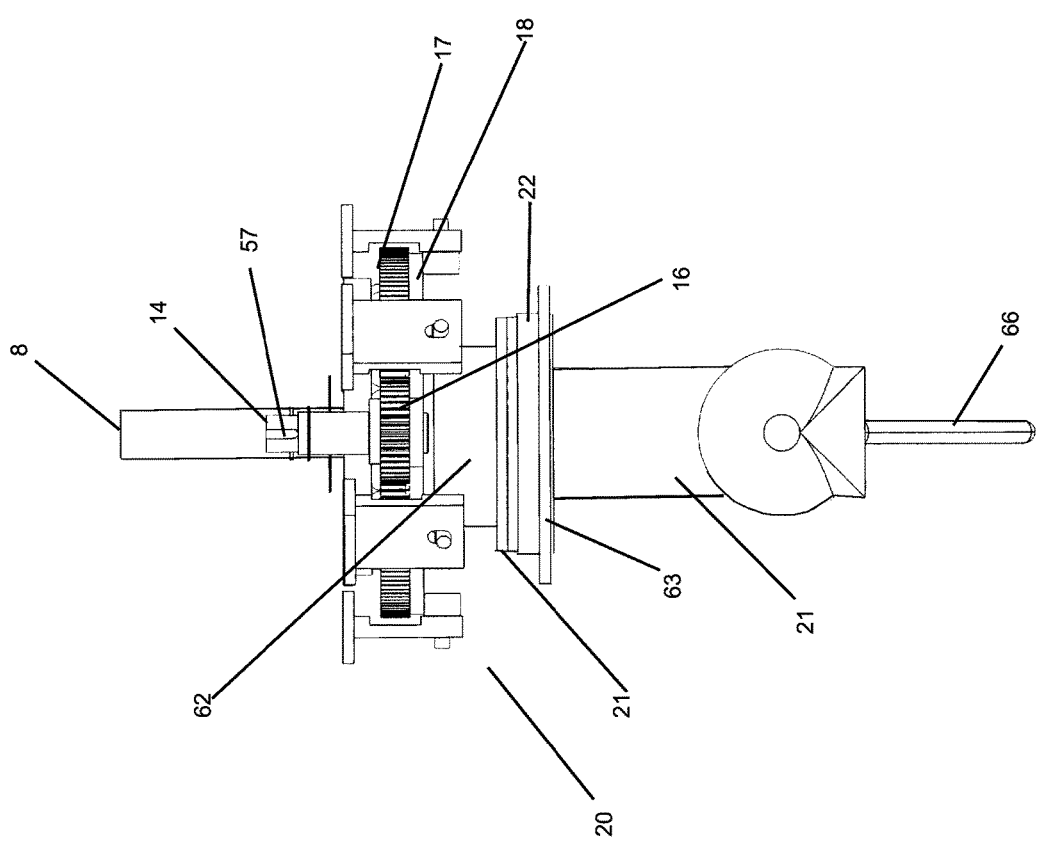
FIG. 27: is a front view of a rotational propeller drive system with an internal housing element removed in one embodiment thereof.
Figure 28:
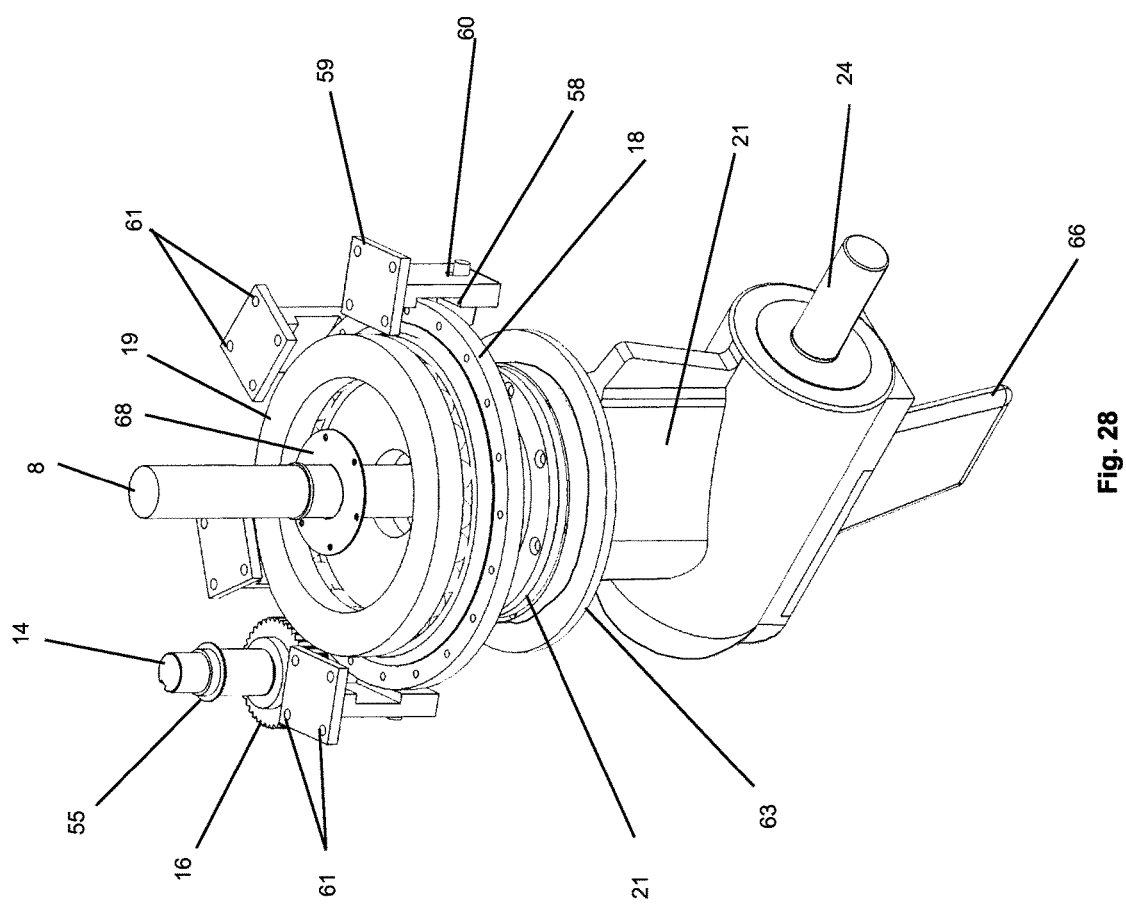
FIG. 28: is a perspective view of a rotational propeller drive system with an internal housing and rotational drive band elements removed to show a drive band rotational mount in one embodiment thereof.
Figure 29:
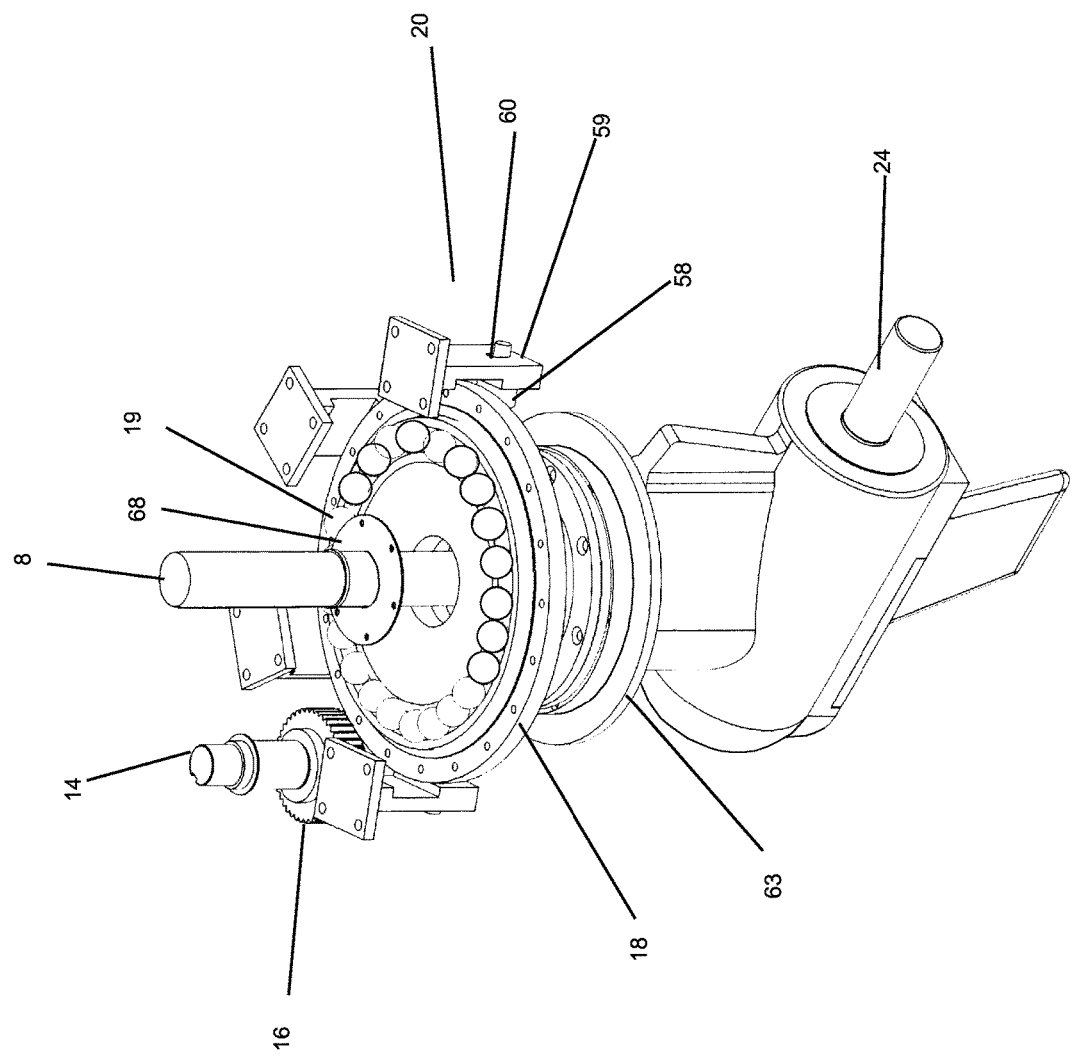
FIG. 29: is a perspective view of a rotational propeller drive system with various additional elements removed to view a rotary bearing in one embodiment thereof.

As demonstrated in FIGS. 25 and 28, in some embodiments a drive band rotational mount (18) may be joined with a rotational drive band (17) and a rotary bearing (19) such that it may be rotationally as well as directionally responsive to the action of a drive output (15) transmitted through a directional drive shaft (14) and rotational drive gear (16). In a preferred embodiment, a rotary bearing (19) may be secured to an internal housing (52) supporting a rotational mount (18) and associated and/or coupled/responsive elements, while facilitating independent rotation. As shown in FIGS. 28-29, another preferred embodiment may include a rotary bearing (20) which may further include, but not be limited to: a thrust bearing; a thrust joint; a thrust ball bearing; a cylindrical thrust roller bearing; a tapered roller thrust bearing; a spherical roller thrust bearing; a magnetic bearing; a fluid bearing; a fluid-film thrust bearing; a roller; a cam roller; a rotational joint; a rotational plate and the like.

Figure 22:
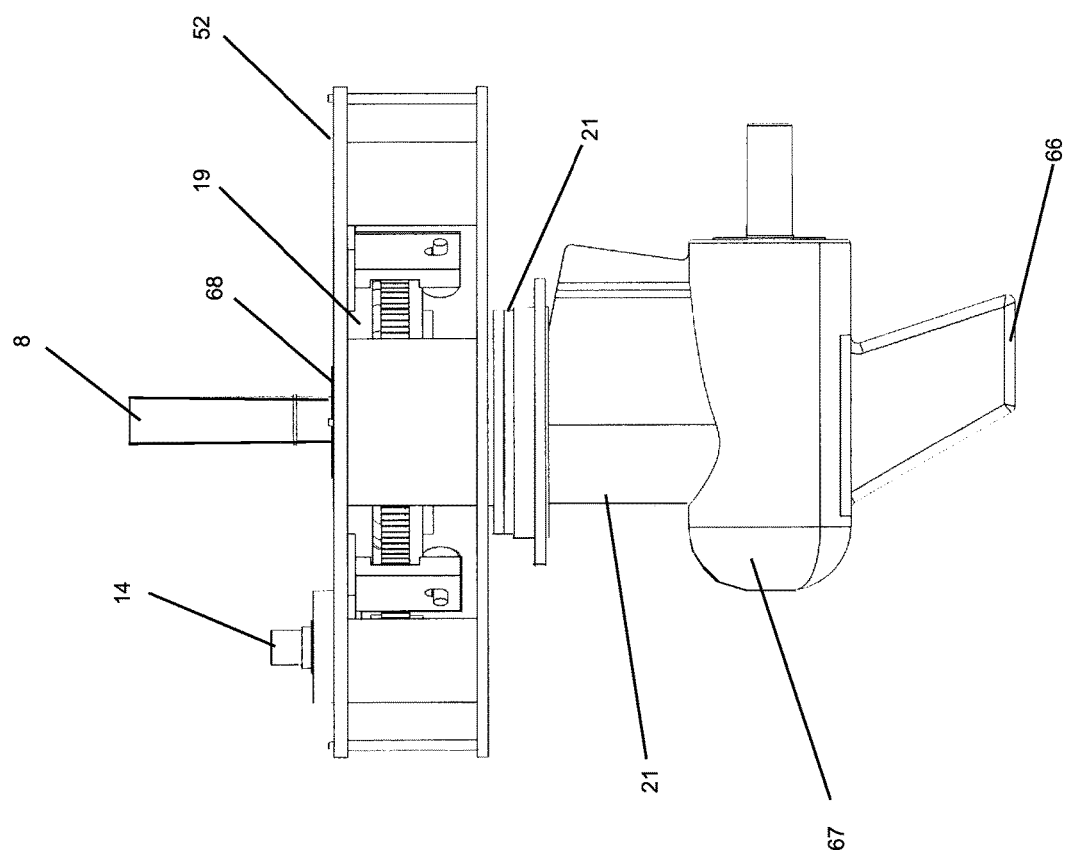
FIG. 22: is a side view of a rotational propeller drive system in one embodiment thereof.
Figure 23:
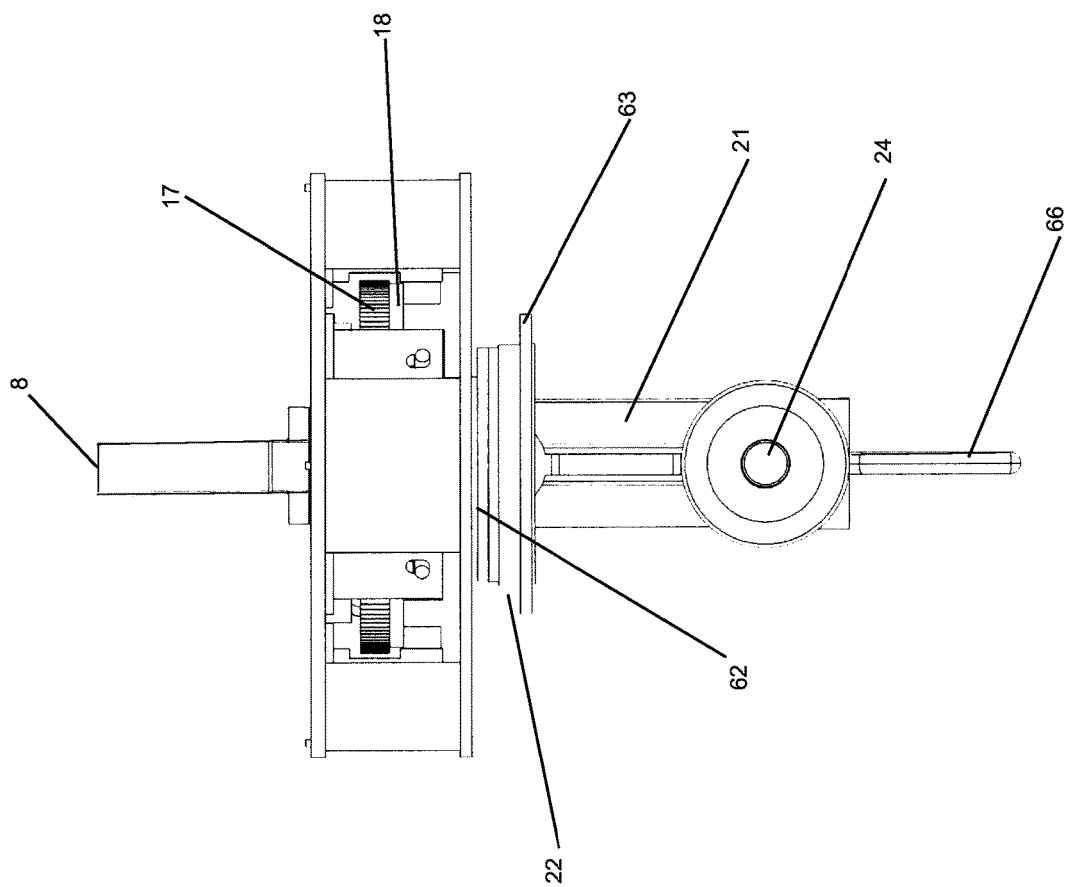
FIG. 23: is a back view of a rotational propeller drive system in one embodiment thereof.

In an additional embodiment, the drive band rotational mount (18) and associated elements may be supported by a rotational support base (20). In one embodiment, this rotational support base (20) may include a rotational plate and/or a bearing track. In a preferred embodiment shown in FIG. 24, this rotational support base (20) may comprise a roller (58) or cam, which may further be coupled with a roller support bracket (59) perhaps through a flex joint (60). In addition, as generally shown in FIG. 22, in one embodiment the roller support bracket(s) (59) may be coupled to an internal housing, perhaps through internal housing anchor(s) (61).

Figure 30:
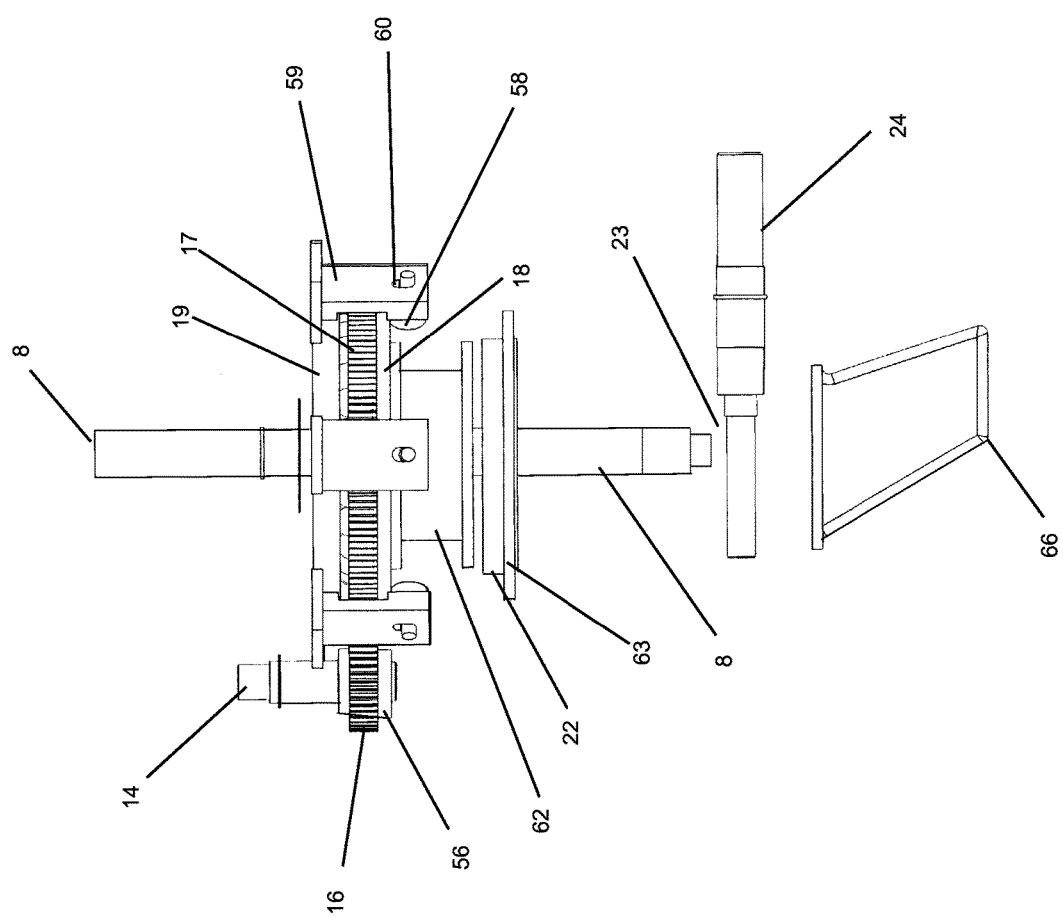
FIG. 30: is a side view of a rotational propeller drive system with a rotational propeller drive housing removed in one embodiment thereof.
Figure 36:
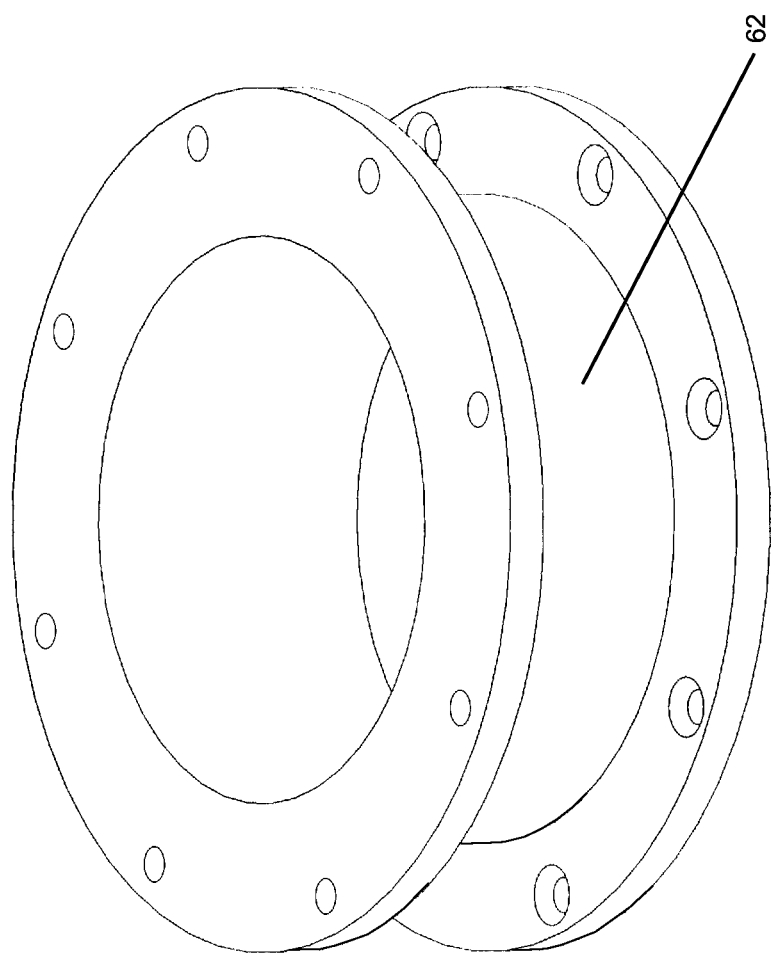
FIG. 36: is a rotational mount spacer in one embodiment thereof.
Figure 37:
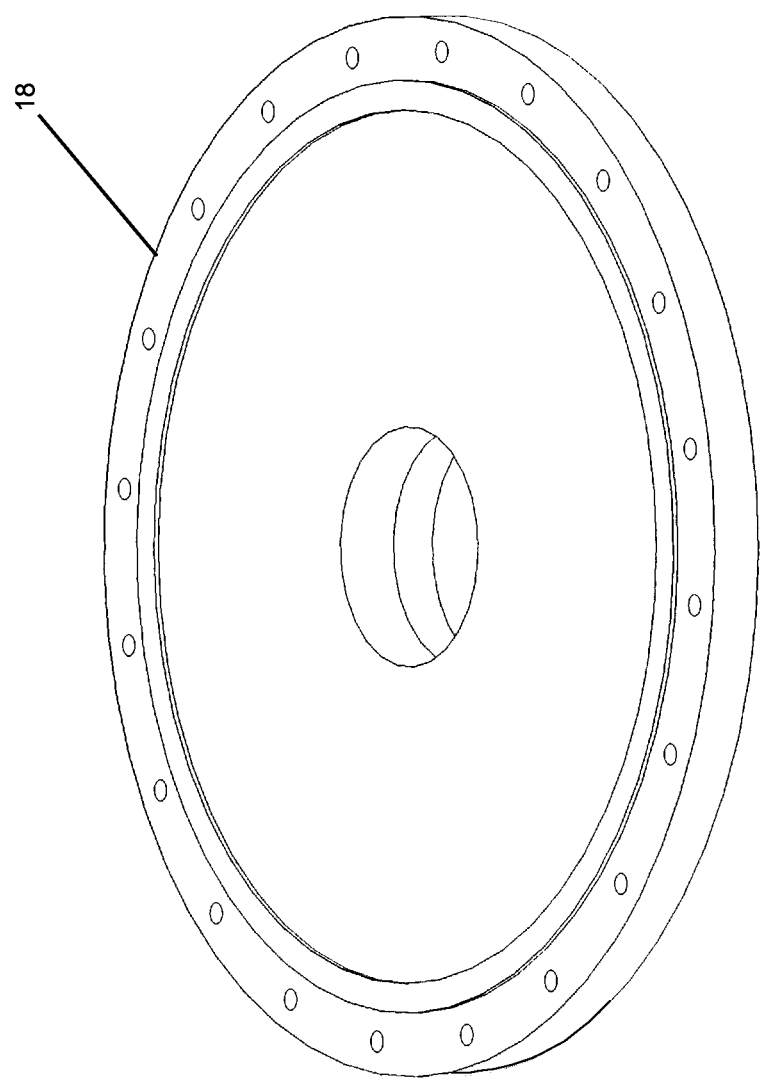
FIG. 37: is a top perspective view of a drive band rotational mount in one embodiment thereof.
Figure 38:
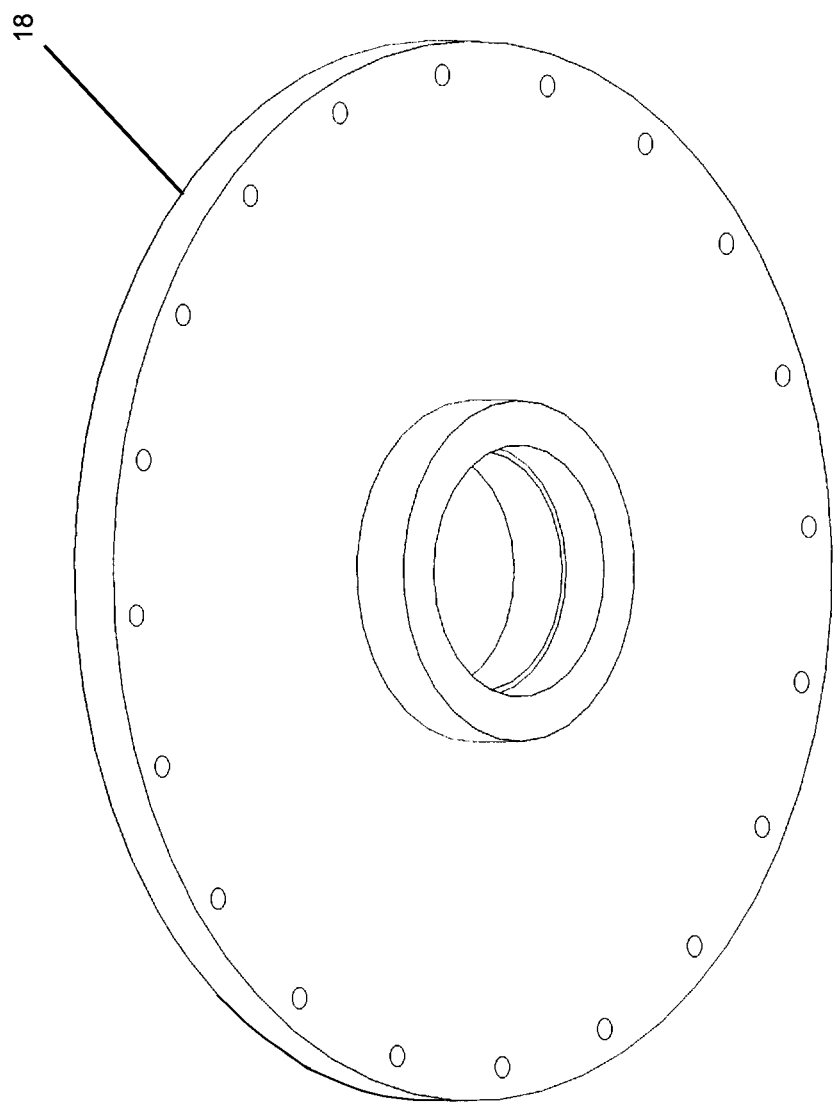
FIG. 38: is a bottom view of a drive band rotational mount in one embodiment thereof.

As shown in FIGS. 30 and 36, in a preferred embodiment a drive band rotational mount (18) may be coupled with one or more rotational mount spacer(s) (62). In some embodiments, this spacer element may be of variable lengths and sizes based on the need to extend and/or transmit rotational energy through the system, for example to a rotational propeller drive housing (21) as will be shown below. In additional embodiments, this rotational mount spacer (62) may include a retractable joint such that, for example, the rotational propeller drive housing (21), drive shaft (8) and/or propeller shaft (24) may be retracted, for example, into the body of a ship. In some embodiments, such a retractable joint may include, but not be limited to: a spline joint; a screw joint; a compression joint; an interlaced joint; a hydraulic joint; an extendable joint; a universal joint; a spider joint; a revolute joint; a pivot joint; a ball and socket joint; a pin bearing joint; a cylinder joint and the like. In addition, in some embodiments this rotational mount spacer(s) (62) may be a buffer element, such as a hydraulic shock absorber and/or stabilizer.

Moreover, as it may be advantageous to increase and/or decrease the rotation of the rotational propeller drive housing (21) coupled with the rotational mount spacer (62), in one embodiment not shown, such a rotational mount spacer (62) may include a RPM gear adjustor, such as a planetary, or compound gear system. In this embodiment, it may be possible to decrease the initial drive input (15) as well as perhaps utilizing smaller rotational drive band (17) and/or gears (16) to achieve the desired force to rotate a propeller drive housing (21). Conversely, it may be desirous to stop or slow the rotation of a propeller drive housing (21), and thus the rotation of a propeller drive (24), as such, in some embodiments may include a brake. Such a braking element may include, but not be limited to: a disc brake; a pressure brake; a hydraulic brake; a friction brake and the like. In addition, such a braking element may be coupled with and/or responsive to a plurality of different elements including, but not limited to: a brake coupled to a drive band rotational mount; a brake coupled to a spacer; a brake coupled to a drive shaft; a brake coupled to a directional drive shaft; a brake coupled to a brake housing; a brake coupled to a rotational support base and the like.

Figure 39:
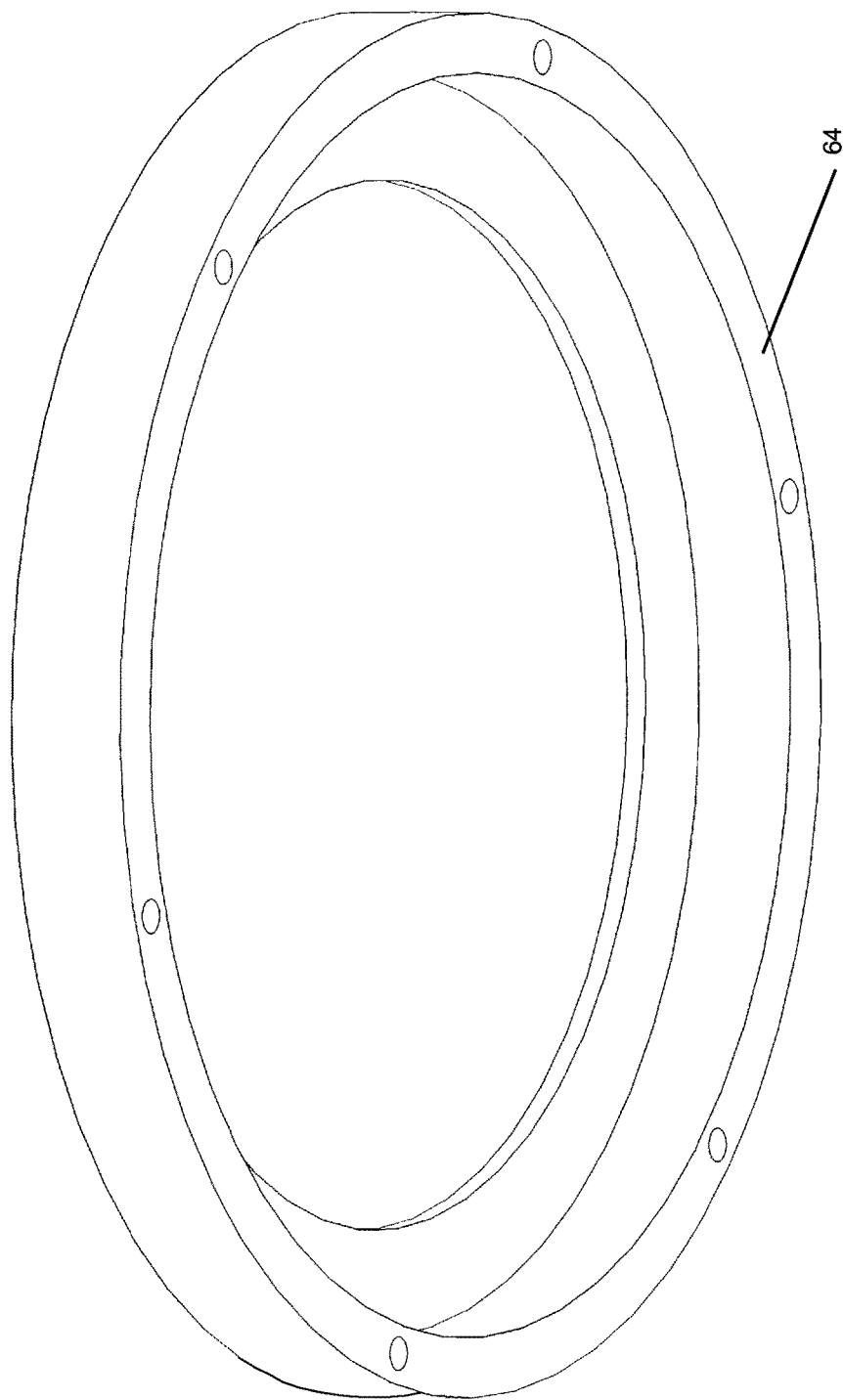
FIG. 39: is a seal housing in one embodiment thereof.
Figure 40:
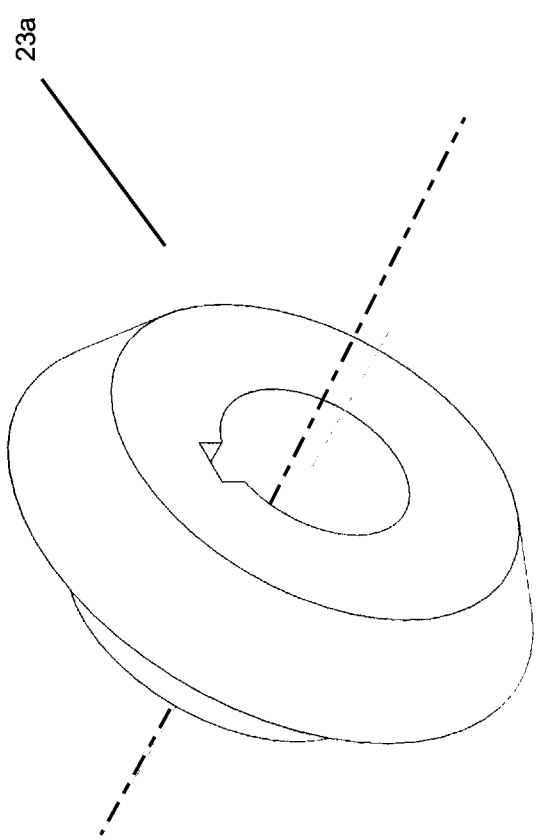
FIG. 40: is a directional gear transmission in one embodiment thereof.
Figure 41:
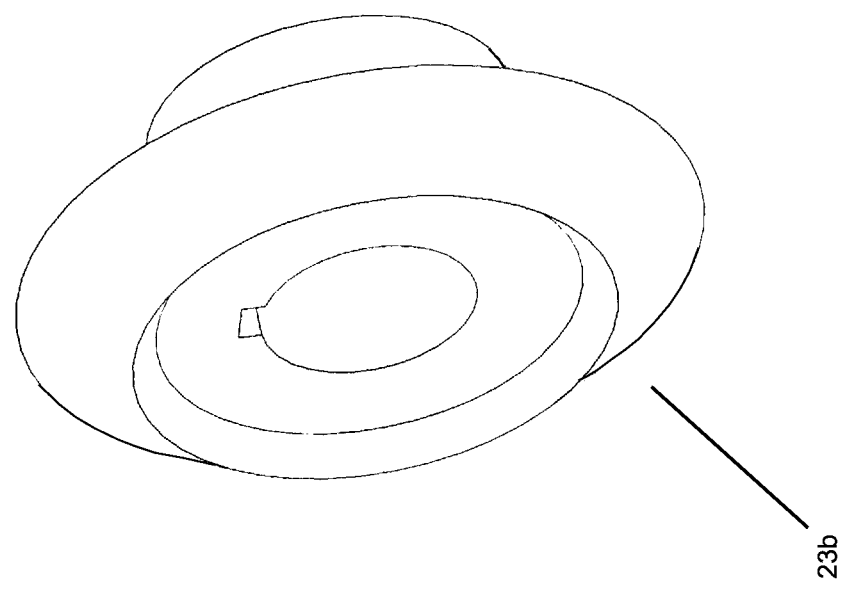
FIG. 41: is an alternative directional gear transmission in one embodiment thereof.
Figure 42:
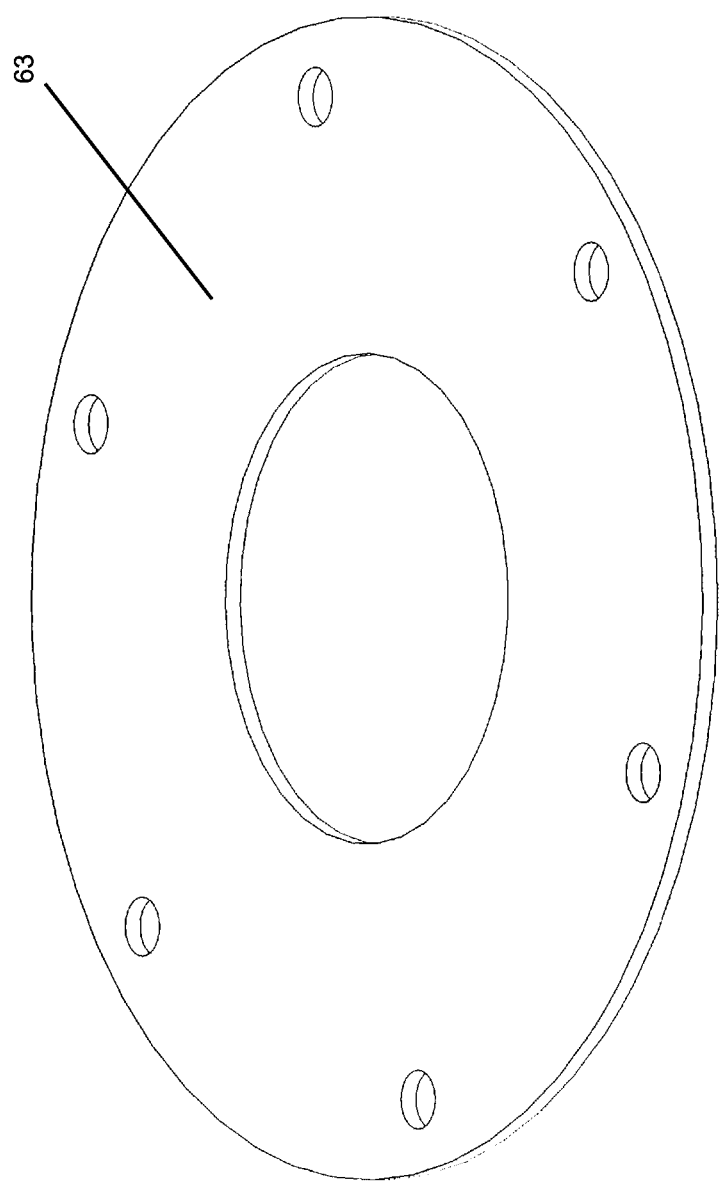
FIG. 42: is an external seal spacer in one embodiment thereof.
Figure 43:
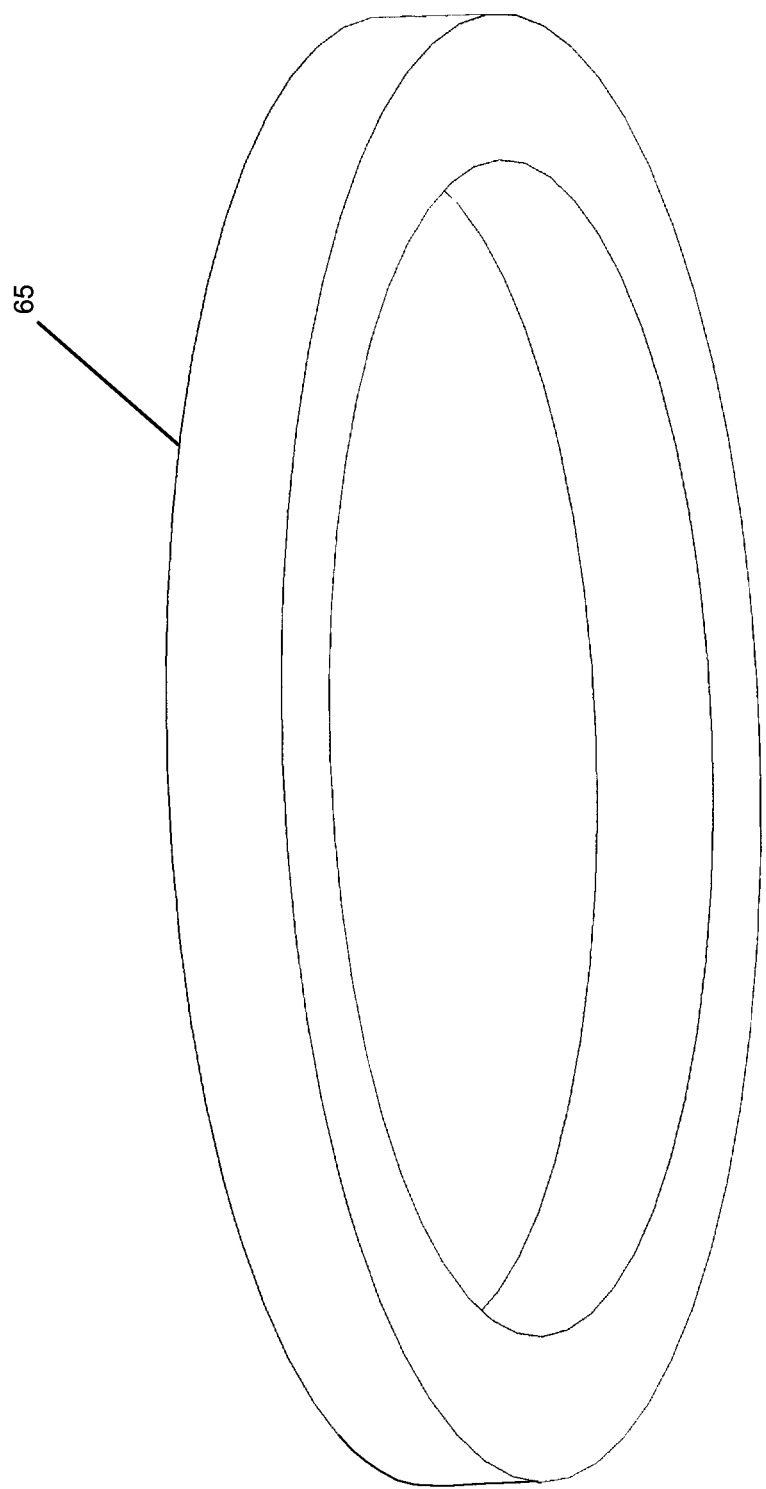
FIG. 43: is an external seal in one embodiment thereof.

In embodiments involving, for example a propeller drive that may be used, for example to propel water bound ships, an seal component (22), may be coupled with a propeller drive housing (21) and rotational mount spacer (62) to form a rotatable water-tight seal between the external and internal environments. As shown in FIGS. 25, 39 and 43, in one embodiment a rotational mount spacer (62) may include an external seal (65) having a seal housing (64), coupled with a seal element (64a). This external seal (65) may further be joined with an external seal spacer (63), and/or a rotational joint (4).

Generally referring now to FIGS. 21-30 and 32, a rotational propeller drive housing (21) may provide a drive shaft aperture wherein a drive shaft (8), perhaps responsive to a variable coupler drive (1a), may pass through and be internally coupled with a propeller shaft (24) and/or propeller (not shown). This internal coupling within the rotational propeller drive housing (21) may be accomplished through a directional gear transmission (43a) and (43) as generally shown in FIG. 30, as well as 40 and 41. Indeed, a directional gear transmission may include, but not be limited to: a yaw drive; a directional gearing; a gear band; a drive table; a rack and pinion system; a belt-drive; circular gearing and the like. Additional embodiments of this rotational propeller drive housing (21) may include, for example, a foil which may be detachable and/or retractable, as well as a component array position that may house various sensors, controllers and/or other equipment.

Figure 44:
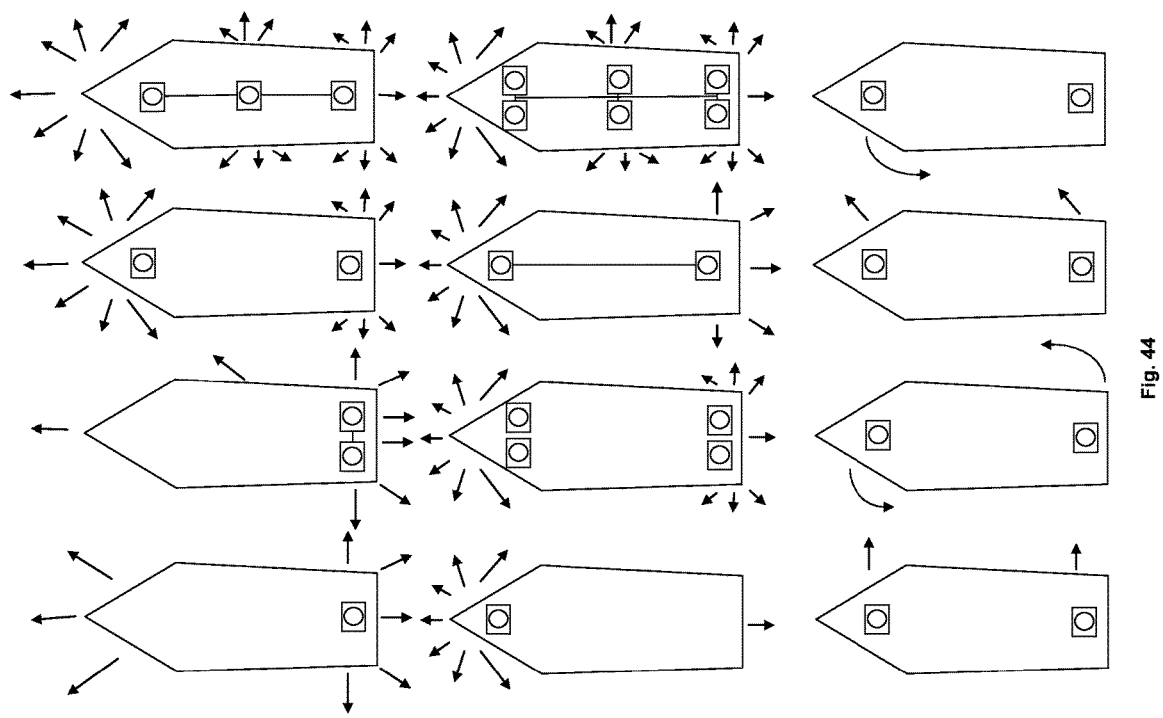
FIG. 44: is a diagrammatic representation of various ship movements that may be accomplished utilizing one or more of the claimed invention(s) in one embodiment thereof.

Now referring to FIG. 44, in certain embodiments involving ship propulsion, as well as other applications, a plurality of rotational propeller drive housings (21), perhaps coupled with one or more variable coupler drives (1a), may be positioned in series, or in parallel, or other combinations of the two. This plurality of rotational propeller drive housings (21) may operate in an independent or synchronized fashion. In such an embodiment, multiple rotational propeller drive housings (21) may include a plurality of gear synchronized rotational propeller drive housings; a plurality of belt synchronized rotational propeller drive housings; a plurality of rack and pinion synchronized rotational propeller drive housings; a plurality of wire synchronized rotational propeller drive housings; a plurality of communication signal rotational propeller drive housings. Again as shown in FIG. 44, in the exemplary embodiment of water-based propulsion, operation of a single, and/or plurality of rotational propeller drive housings (21), preferably powered by a variable drive coupler to form a variably coupled rotational propeller drive system, may allow a ship to execute a plurality of propeller powered movements, such as lateral and/or angled propulsion as well as rotational movement along a central and/or terminal axis.

Similarly, certain embodiments of the inventive technology may include a plurality of variable coupler drives coupled in series and/or in parallel and/or a hybrid of both. In certain embodiments such a plurality of variable coupler drives may be coupled by: a belt drive; at least one gear band; a drive table; a gear; a communication signal; a wire signal and the like. In addition, in certain embodiments, a plurality of variable coupler drives may be coupled in series through a single rotatable cylinder (1a).

In yet another additional embodiment, it may be possible to capture a power input, for example a steam power input, a hydro-power input, a kinetic power input; a magnetic power input; an electrical power input; a wind power input, and/or a thermal power input that may be used to rotate a turbine element, for example. This rotating turbine may be rotationally responsive to a drive shaft (8) and may further be coupled with a drive table (7), perhaps through a drive shaft support coupler, or perhaps a direct connection. This drive table (7) may be positioned on a rotational support base (20), and/or adjacent to a spinner (5). Again, this spinner may be slidably coupled with a rotatable cylinder (1), such that the power output transmitted through the drive shaft (8) to the drive table (7) may be transmitted to a spinner (5) and ultimately a coupled rotatable cylinder (1) in the form of rotational energy.

Finally, in one embodiment, a spinner (5) may be adaptably secured to adaptable support bracket (6) through at least one rotational joint (4) and may be adjustably positioned along a variable drive ratio pathway (13) through activation of at least one variable position driver (10) comprising the steps of: activating a variable position driver (10) to which a variable position track (9) may be responsive, perhaps in response to a control signal; and adjustably positioning a adaptable support bracket (6) to which the spinner (5) is adaptably coupled on the drive table (7) along a variable drive ratio pathway (13). An electrical output may be generated by coupling the rotatable cylinder (1) to a power generator (not shown), which may be innervated by the rotational movement of the cylinder (1). Additional embodiments may involve activation of variable coupler drive switch comprising the steps of: positioning at least one translatable drive table support mount (25) such that a spinner (5) may be rotationally responsive and/or non-responsive to a drive table (7); and activating at least one drive table actuator (26) secured to a translatable drive table support mount (25) such that the drive table (7) may be de-coupled and/or coupled from the spinner (5) through operation of an actuator element.

All claims are hereby preserved as clauses and are incorporated into the specification in their entirety:

1. A variably coupled rotational propeller drive system comprising:
   at least one rotatable cylinder responsive to a rotational drive input wherein said rotatable cylinder is supported by at least one coupler support mount through at least one rotational joint;
   at least one spinner slidably coupled to said rotatable cylinder so as to be rotationally responsive to said cylinder;
   at least one adaptable support bracket coupled to said spinner by at least one rotational joint;
   at least one drive table mechanically coupled with at least one drive shaft and rotationally responsive to said spinner;
   at least one variable position track adjustably coupled to at least one variable position driver and said adaptable support bracket, wherein said variable position driver, in response to a control signal, adjustably positions said spinner along a variable drive ratio pathway;
   at least one directional drive shaft responsive to a drive input and joined with at least one rotational drive gear;
   at least one rotational drive band coupled with said rotational drive gear;
   at least one drive band rotational mount joined to said rotational drive band and a rotary bearing and supported by a rotational support base;
   at least one rotational propeller drive housing responsive to said drive band rotational mount;
   at least one seal component joined with said rotational propeller drive housing;
   at least one directional gear transmission responsive to said drive shaft; and
   at least one propeller shaft responsive to said directional gear transmission.

2. A variably coupled rotational propeller drive system as described in clause 1 or any other clause and further comprising at least one variable coupler drive switch comprising:
   at least one translatable drive table support mount positioned such that said spinner is rotationally responsive to said drive table.
   at least one drive table actuator secured to said translatable drive table support mount such that said drive table may be de-coupled from said spinner through operation of said actuator such that said spinner is not rotationally responsive to said drive table.

3. A variable coupler drive comprising:
   at least one rotatable cylinder responsive to a rotational drive input wherein said rotatable cylinder is supported by at least one coupler support mount through at least one rotational joint;
   at least one spinner slidably coupled to said rotatable cylinder so as to be rotationally responsive to said cylinder;
   at least one adaptable support bracket coupled to said spinner by at least one rotational joint;
   at least one drive table mechanically coupled with at least one drive shaft and rotationally responsive to said spinner; and
   at least one variable position track adjustably coupled to at least one variable position driver and said adaptable support bracket, wherein said variable position driver, in response to a control signal, adjustably positions said spinner along a variable drive ratio pathway.

4. The system as described in clauses 1, 3, 97 or any other clause and further comprising a rotational support base.
5. The system as described in clause 4 or any other clause wherein said rotational support base comprises at least one roller element secured to a roller support mount through a rotational joint.
6. The system as described in clause 5 or any other clause wherein said roller support mount comprises a plurality of buffered roller support mounts.
7. The system as described in clause 5 or any other clause wherein said roller support mount comprises a plurality of independently buffered roller support mounts.
8. The system as described in clause 4 or any other clause wherein said rotational support base comprises at least one rotational joint coupled to said drive table.
9. The system as described in clause 8 or any other clause wherein said rotational joint coupled to said drive table comprises a gear plate coupled to said drive table.
10. The system as described in clause 9 or any other clause wherein said gear plate coupled to said drive table comprises a buffered gear plate coupled to said drive table.
11. The system as described in clause 4 or any other clause wherein said rotational support base comprises at least one rotational support base brake.
12. The system as described in clause 11 or any other clause wherein said rotational support base brake comprises at least one brake selected from the group consisting of: a disc brake; a pressure brake; a hydraulic brake; a mechanical stop; and a friction brake.
13. The system as described in clauses 1, 3 and 97 or any other clause wherein said rotational support base comprises at least one rotational support base stabilizer.
14. The system as described in clause 4 or any other clause and further comprising a rotational interface surface.
15. The system as described in clause 14 or any other clause wherein said rotational interface surface comprises a rotational interface surface selected from the group consisting of: a plastic a rotational interface surface; a composite a rotational interface surface; metal a rotational interface surface; a rubber a rotational interface surface; a synthetic rotational interface surface; a frictional rotational interface surface; and a hybrid a rotational interface surface.
16. The system as described in clause 14 or any other clause wherein said rotational interface surface comprises at least one rotational track.
17. The system as described in clause 16 or any other clause wherein said rotational track comprises at least one rotational track guide.
18. The system as described in clause 17 or any other clause wherein said rotational track guide comprises at least one integral rotational track guide.
19. The system as described in clause 17 or any other clause wherein said rotational track guide comprises at least one internally secured rotational track.
20. The system as described in clause 17 or any other clause wherein said rotational track comprises at least one internal rotational track guide.
21. The system as described in clauses 1, 3 and 97 or any other clause and further comprising at least one slide bearing attached to said translatable drive table support mount.
22. The system as described in clause 21 or any other clause wherein said slide bearing comprises at least one slide anchor.
23. The system as described in clauses 1, 3 and 97 or any other clause and further comprising a slide table removal system.
24. The system as described in clause 23 or any other clause wherein said slide table removal system comprises at least one adjustable slide table hoist.
25. The system as described in clause 24 or any other clause wherein said adjustable slide table removal hoist comprises at lease adjustable slide table hoist rail.
26. The system as described in clauses 1, 97, 113 and 114 or any other clause wherein said rotational drive input comprises at least one rotational drive input selected from the group consisting of: a motorized power input; a steam power input, a hydro-power input, a kinetic power input; a magnetic power input; an electrical power input; a wind power input, a thermal power input; a levered drive input; a pulley-belted drive input.
27. The system as described in clauses 1, 3, and 97 or any other clause wherein said drive input comprises at least one rotational drive input selected from the group consisting of: a motorized power input; a steam power input, a hydro-power input, a kinetic power input; a magnetic power input; an electrical power input; a wind power input, a thermal power input; a levered drive input; a rotational drive input and a pulley-belted drive input.
28. The system as described in clause 26 or any other clause wherein said motorized power input comprises a diesel motor input.
29. The system as described in clauses 1, 3 and 97 or any other clause wherein said rotatable cylinder comprises a rotational cylinder having at least one spline.
30. The system as described in clauses 1, 3 and 97 or any other clause wherein said rotatable cylinder comprises at least one rotational drive input coupler.
31. The system as described in clauses 1, 3 and 97 or any other clause wherein said rotatable cylinder comprises at least one mechanical stop.
32. The system as described in clauses 1, 3 and 97 or any other clause wherein said rotatable cylinder comprises at least one rotational cylinder coupler.
33. The system as described in clause 32 or any other clause wherein said rotational cylinder coupler comprises an RPM/gear adjustor.
34. The system as described in clause 33 or any other clause wherein said RPM/gear adjustor comprises a planetary gear system coupler.
35. The system as described in clauses 1, 3 and 97 or any other clause wherein said coupler support mount comprises a plurality of coupler support mounts supported by at least one drive base support.
36. The system as described in clause 36 or any other clause wherein said plurality of coupler support mounts comprises a plurality of coupler support mounts having a plurality of anchor support positions.
37. The system as described in clause 36 or any other clause wherein said plurality of coupler support mounts comprises a plurality of coupler support mounts having at least detachable anchor support.
38. The system as described in clause 37 or any other clause wherein said detachable anchor support comprises a detachable anchor support selected from the group consisting of: a snap anchor support; a slide anchor support; a screw anchor support; a clamp anchor support; a ring anchor support; a hook anchor support; a quick release anchor support; and a pressure anchor support.
39. The system as described in clauses 1, 3 and 97 or any other clause wherein said rotational joint comprises a rotational joint selected from the group consisting of: a bearing joint; a ball-bearing joint; a geared joint, a planetary geared joint; a pivot joint; a ball and socket joint; a pin bearing joint; a synthetic bearing joint; a babbit bearing joint; a universal bearing joint; and a bushing.

40. The system as described in clauses 1, 3 and 97 or any other clause wherein said spinner comprises a spinner frictional membrane.

41. The system as described in clause 40 or any other clause wherein said spinner frictional membrane comprises a spinner frictional membrane selected from the group consisting of: a composite membrane, a plastic membrane; a resin membrane; a carbon-coated membrane; a rubber membrane; a vulcanized rubber membrane; an epoxy membrane; an oil membrane; a petroleum-based membrane.

42. The system as described in clause 41 or any other clause and further comprising a continuous frictional membrane applicator.

43. The system as described in clause 42 or any other clause and further comprising a continuous frictional membrane applicator catch.

44. The system as described in clause 40 or any other clause wherein said spinner frictional membrane comprises a replaceable spinner frictional membrane.

45. The system as described in clause 40 or any other clause wherein said spinner frictional membrane comprises detachable spinner frictional surface.

46. The system as described in clauses 1, 3 and 97 or any other clause wherein said spinner comprises an integral frictional composite spinner.

47. The system as described in clauses 1, 3 and 97 or any other clause wherein said adaptable support bracket comprises at least one upper bracket member secured to at least one lower bracket member.

48. The system as described in clause 47 or any other clause wherein said upper and lower bracket members form an internal rotational joint aperture.

49. The system as described in clause 47 or any other clause wherein said upper and lower bracket members are secured by at least one lock selected from the group consisting of: snap lock; fitted lock; pressure lock; quick release lock; and slide lock.

50. The system as described in clauses 1, 3 and 97 or any other clause wherein said adaptable support bracket comprises at least one variable position track mount.

51. The system as described in clauses 1, 3 and 97 or any other clause wherein said adaptable support bracket comprises at least one integral variable position track mount.

52. The system as described in clause 51 or any other clause wherein said variable position track mount comprises at least one non-integral variable position track mount secured to said adaptable support bracket.

53. The system as described in clause 50 or any other clause wherein said variable position track mount comprises a variable position track mount selected from the group consisting of: a rail variable position track mount; a threaded variable position track mount; and a hydraulic responsive variable position track mount.

54. The system as described in clauses 1, 3 and 97 or any other clause wherein said adaptable support bracket comprises an adaptable support bracket buffer.

55. The system as described in clauses 1, 3 and 97 or any other clause wherein said drive table comprises a drive table frictional membrane.

56. The system as described in clause 55 or any other clause wherein said drive table frictional membrane comprises a drive table frictional membrane selected from the group consisting of: a composite membrane; a plastic membrane; a resin membrane; a carbon-coated membrane; a rubber membrane; a vulcanized rubber membrane; an epoxy membrane; an oil membrane; and a petroleum-based membrane.

57. The system as described in clause 56 or any other clause wherein said drive table frictional membrane comprises a continuous frictional membrane applicator.

58. The system as described in clause 55 or any other clause wherein said drive table frictional membrane comprises a drive table replaceable frictional membrane.

59. The system as described in clause 55 or any other clause wherein said drive table frictional membrane comprises a drive table detachable frictional surface.

60. The system as described in clauses 1, 3 and 97 or any other clause wherein said drive table comprises an integral frictional composite drive table.

61. The system as described in clauses 1, 3 and 97 or any other clause wherein said drive table comprises at least one integral neutral position.

62. The system as described in clause 61 or any other clause wherein said integral neutral position comprises at least one integral gradient surface.

63. The system as described in clause 61 or any other clause wherein said integral neutral position comprises a central neutral position.

64. The system as described in clause 61 or any other clause wherein said integral neutral position comprises at least one intermittent neutral position.

65. The system as described in clause 61 or any other clause wherein said integral neutral position comprises external neutral position.

66. The system as described in clauses 1, 3 and 97 or any other clause wherein said drive table comprises a variable drive ratio directional region.

67. The system as described in clauses 1, 3 and 97 or any other clause wherein said drive table comprises at least one drive shaft support coupler secured to said drive table.

68. The system as described in clause 67 or any other clause wherein said drive shaft support coupler comprises at least one RPM/gear adjustor responsive to said drive table.

69. The system as described in clause 68 or any other clause wherein said RPM/gear adjustor comprises at least one planetary gear system.

70. The system as described in clauses 1, 3 and 97 or any other clause wherein said drive shaft comprises a drive shaft coupler interface.

71. The system as described in clauses 1, 3 and 97 or any other clause wherein said drive shaft comprises at least one RPM/gear adjustor responsive to said drive shaft.

72. The system as described in clause 71 or any other clause wherein said RPM/gear adjustor responsive to said drive shaft comprises a plurality of RPM/gear adjustors linking multiple sections of said drive shaft.

73. The system as described in clause 71 or any other clause wherein said RPM/gear adjustor responsive to said drive shaft comprises a planetary gear system.

74. The system as described in clauses 1, 3, 97 and 76 or any other clause wherein said drive shaft support coupler comprises at least one drive shaft coupler support interface.

75. The system as described in clauses 1, 3 and 97 or any other clause and further comprising at least one drive shaft support.

76. The system as described in clauses 1, 3, 97 and 75 or any other clause and further comprising at least one rotational joint.
77. The system as described in clauses 1, 3 and 97 or any other clause wherein said variable position driver comprises a variable position driver selected from the group consisting of: a variable position slide driver, a variable position rail driver, a variable position magnet driver, a variable position motor driver, a variable position electrodriver; a variable position spring driver, a variable position servo-motor driver; a variable position pressure driver; a variable position pneumatic driver; a variable position manual driver; an automatic variable position driver; and a variable position hydraulic driver.
78. The system as described in clauses 1, 3, 77, and 97 or any other clause wherein said variable position motor driver comprises a variable position motor driver selected from the group consisting of: a 1700-1900 rpm variable position motor driver; 1500-2000 rpm variable position motor driver; 1300-2200 variable position motor driver; 1100-2400 variable position motor driver; 900-2600 variable position motor driver; 700-2800 variable position motor driver; 500-3000 variable position motor driver.
79. The system as described in clauses 1, 3 and 97 or any other clause wherein said variable position driver comprises a plurality of synchronized variable position drivers.
80. The system as described in clauses 1, 3 and 97 or any other clause wherein said variable position driver comprises a plurality of opposing synchronized variable position drivers.
81. The system as described in clauses 1, 3 and 97 or any other clause wherein said variable position driver comprises at least one variable position driver responsive to a controller.
82. The system as described in clauses 1, 3 and 97 or any other clause wherein said variable position driver comprises variable position driver secured to a base support through at least one detachable anchor support.
83. The system as described in clause 82 or any other clause wherein said detachable anchor support comprises at least one detachable anchor support selected from the group consisting of: a snap anchor support; a slide anchor support; a screw anchor support; a clamp anchor support; a ring anchor support; a hook anchor support; a quick release anchor support; and a pressure anchor support.
84. The system as described in clauses 1, 3 and 97 or any other clause wherein said variable position track comprises at least one variable position track selected from the group consisting of: a screw; a threaded rod; an all-thread rod; a rail; and extendable track; a spring responsive track; a hydraulic responsive track; a pressure responsive track; and a pneumatic responsive track.
85. The system as described in clauses 1, 3 and 97 or any other clause wherein said variable position track comprises at least one variable gear position coupler.
86. The system as described in clause 85 or any other clause wherein said variable gear position coupler comprises a tractable coupler.
87. The system as described in clause 85 or any other clause wherein said variable gear position coupler comprises an RPM/gear increaser.
88. The system as described in clauses 1, 3 and 97 or any other clause wherein said variable position track comprises at least one mechanical stop.
89. The system as described in clauses 1, 3 and 97 or any other clause wherein said control signal comprises a control signal selected from the group consisting of a: wired control signal; a wireless control signal; a mechanical control signal; an electronic control signal; an output signal; and input signal; an RPM output signal; rotational drive input; a resistance control signal; and directional control signal.
90. The system as described in clauses 1, 3 and 97 or any other clause and further comprising a sensor.
91. The system as described in clauses 1, 3 and 97 or any other clause wherein said variable coupler drive comprises a plurality of variable coupler drives coupled in series.
92. The system as described in clauses 91 or any other clause wherein said plurality of variable coupler drives coupled in series comprises a plurality of variable coupler drives coupled in series through a coupler selected from the group consisting of: a belt drive; at least one gear band; a drive table; a gear; a communication signal; and a wire signal.
93. The system as described in clause 91 or any other clause wherein said a plurality of variable coupler drives coupled in series comprises a plurality of variable coupler drives coupled in series through a single rotatable cylinder responsive to a rotational drive input or any other clause wherein said rotatable cylinder is supported by at least one coupler support mount through at least one rotational joint.
94. The system as described in clauses 1, 3 and 97 or any other clause wherein said variable coupler drive comprises a plurality of variable coupler drives coupled in parallel.
95. The system as described in clauses 1, 3 and 97 or any other clause wherein said plurality of variable coupler drives coupled in parallel comprises a plurality of variable coupler drives coupled in parallel through: at least one belt drive; at least one gear band; at least one drive table; at least one gear; at least one communication signal; and at least one wire signal.
96. The system as described in clauses 1, 3 and 97 or any other clause wherein said a plurality of variable coupler drives coupled in parallel comprises a plurality of rotationally independent variable coupler drives coupled in parallel.
97. A variable coupler lift drive comprising:
   at least one rotatable cylinder responsive to a rotational drive input wherein said rotatable cylinder is supported by at least one coupler support mount through at least one rotational joint;
   at least one spinner slidably coupled to said rotatable cylinder so as to be rotationally responsive to said cylinder;
   at least one adaptable support bracket coupled to said spinner by at least one rotational joint;
   at least one drive table mechanically coupled with at least one drive shaft and rotationally responsive to said spinner; and
   at least one variable position track adjustably coupled to at least one variable position driver and said adaptable support bracket, wherein said variable position driver, in response to a control signal, adjustably positions said spinner along a variable drive ratio pathway; and
   at least one variable coupler drive switch comprising:
      at least one translatable drive table support mount positioned such that said spinner is rotationally responsive to said drive table.
      at least one drive table actuator secured to said translatable drive table support mount such that said drive table may be de-coupled from said spinner through operation of said actuator such that said spinner is not rotationally responsive to said drive table.
98. The system as described in clauses 2 and 97 or any other clause wherein said translatable drive table comprises a translatable drive table support mount positioned such that said spinner is rotationally non-responsive with said drive table.
99. The system as described in clause 98 or any other clause and further comprising at least one drive table actuator secured to said translatable drive table support mount such that said drive table may be coupled to said spinner through operation said actuator such that said spinner is rotationally responsive to said drive table.
100. The system as described in clauses 2 and 97 or any other clause wherein said translatable drive table support mount comprises a transverse plate.
101. The system as described in clause 99 or any other clause wherein said transverse plate is secured to a rotational support base and responsive to said drive table actuator such that said drive table may coupled with said spinner such that said spinner is rotationally responsive to said drive table and/or said drive table may be de-coupled from said spinner such that said spinner is not rotationally responsive to said drive table.
102. The system as described in clauses 2 and 97 or any other clause wherein said translatable drive table support mount comprises a translatable drive table support mount selected from the group costing of: a spring loaded translatable drive table support mount; and a cam responsive translatable drive table support mount.
103. The system as described in clauses 2 and 97 or any other clause wherein said drive table movement actuator comprises a drive table movement actuator selected from the group consisting of: a hydraulic movement actuator; an electrical movement actuator; an automatic movement actuator; a manual movement actuator; a lever movement actuator; a motor movement actuator; a gravity movement actuator; a magnetic movement actuator; a screw-drive movement actuator; and a spring movement actuator.
104. A variable coupler drive lift as described in clause 101 or any other clause wherein said transverse plate comprises a transverse plate selected from the group costing of: a spring loaded transverse plate; and a cam responsive transverse plate.
105. The system as described in clauses 2 and 97 translatable drive table support mount comprises a translatable drive table support mount tractably coupled with at least one drive base support.
106. The system as described in clause 105 or any other clause wherein said translatable drive table support mount tractably coupled with at least one drive base support comprises at least one tractable interface.
107. The system as described in clause 105 or any other clause wherein said translatable drive table support mount tractably coupled with at least one drive base support comprises at least one translatable attachment.
108. The system as described in clause 107 or any other clause wherein said translatable attachment comprises at least one translatable attachment selected from the group consisting of: a slide attachment; a stack attachment; a transient attachment; a spring loaded attachment; a detachable attachment; a bearing joint attachment.
109. The system as described in clauses 2 and 97 or any other clause and further comprising a rotational support base.
110. The system as described in clause 98 or any other clause wherein said rotational support base comprises at least one roller element secured to a roller support mount through a rotational joint.
111. The system as described in clauses 2 and 97 or any other clause and further comprising at least one slide bearing attached to said translatable drive table support mount.
112. The system as described in clause 111 or any other clause wherein said slide bearing comprises at least one slide anchor.
113. A rotational drive system comprising:
a directional drive shaft responsive to a drive input and joined with at least one rotational drive gear;
a rotational drive band coupled with said rotational drive gear;
a drive band rotational mount joined to said rotational drive band and a rotary bearing and supported by a rotational support base;
a rotational propeller drive housing responsive to said drive band rotational mount; and
a seal component joined with said rotational propeller drive housing.
a directional gear transmission responsive to a drive shaft; and
a propeller shaft responsive to said directional gear transmission.
114. A rotational propeller drive housing system comprising:
a directional drive shaft responsive to a drive input and joined with at least one rotational drive gear;
a rotational drive band coupled with said rotational drive gear;
a drive band rotational mount joined to said rotational drive band and a rotary bearing and supported by a rotational support base;
a rotational propeller drive housing responsive to said drive band rotational mount; and
a seal component joined with said rotational propeller drive housing.
115. The system as described in clauses 1, 113 and 114 or any other clause and further comprising at least one internal housing.
116. The system as described in clause 115 or any other clause wherein said internal housing comprises an internal housing having a plurality of access slots.
117. The system as described in clause 115 or any other clause wherein said internal housing comprises a housing having at least one directional drive shaft aperture and/or at least one drive shaft aperture.
118. The system as described in clauses 115 or any other clause wherein said internal housing comprises at least one internal housing secured to at least one rotary bearing.
119. The system as described in clauses 1, 113 and 114 and 1 or any other clause wherein said directional drive shaft comprises at least one directional drive shaft coupled with at least one retaining ring.
120. The system as described in clauses 1, 113 and 114 wherein said directional drive shaft comprises at least one directional drive shaft coupled with at least one drive shaft hub.
121. The system as described in clauses 1, 113 and 114 and 120 or any other clause wherein said directional drive shaft comprises at least one directional drive shaft having at least one slide engagement.
122. The system as described in clauses 121 or any other clause wherein said slide engagement comprises a spline connection.

123. The system as described in clauses 1, 113 and 114 or any other clause wherein said drive input comprises a drive input selected from the group consisting of: a motorized power input; a steam power input; a hydropower input; a kinetic power input; a magnetic power input; an electrical power input; a wind power input; a thermal power input; belt-driven power input; a rotational power input; and/or a hybrid power input.
124. The system as described in clauses 1, 113, 114 and 123 or any other clause wherein said drive input comprises a drive input responsive to a control signal.
125. The system as described in clauses 124 or any other clause wherein said control signal comprises a control signal selected from the group consisting of: a wire control signal; a wireless control signal; a mechanical control signal; a digital control signal; an electronic control signal; an RPM output signal; a resistance control signal; an electrical output signal; a cylinder RPM output signal; a rotational drive input; and directional control signal.
126. The system as described in clauses 1, 113 and 114 or any other clause and further comprising at least one sensor.
127. The system as described in clauses 1, 113 and 114 wherein said drive gear comprises a drive gear selected from the group consisting of: at least one pinion, at least one worm gear; and at least one bevel gear.
128. The system as described in clauses 1, 113 and 114 wherein said drive gear comprises at least one belt drive.
129. The system as described in clauses 114, 113, 1 or any other clause wherein said drive gear comprises at least one drive table.
130. The system as described in clause 129 or any other clause wherein said drive table comprises at least one frictional membrane.
131. The system as described in clauses 1, 113 and 114 wherein said drive band comprises at least one circular gear.
132. The system as described in clauses 1, 113 and 114 wherein said drive band comprises at least one gear band.
133. The system as described in clauses 1, 113 and 114 wherein said drive band comprises at least one worm gear.
134. The system as described in clauses 1, 113 and 114 wherein said drive gear comprises at least one drive table.
135. The system as described in clause 133 or any other clause wherein said drive table comprises at least one frictional membrane
136. The system as described in clauses 1, 113 and 114 or any other clause wherein said rotational support base comprises at least one roller.
137. The system as described in clause 136 or any other clause wherein said roller comprises at least one roller coupled with at least one roller support bracket.
138. The system as described in clause 137 or any other clause wherein said roller coupled with at least one roller support bracket comprises at least one roller coupled with at least one roller support bracket through at least one flex joint.
139. The system as described in clause 137 or any other clause wherein said roller coupled with at least one roller support bracket comprises at least one roller support bracket coupled to an internal housing with at least one internal housing anchor.
140. The system as described in clauses 1, 113 and 114 wherein said rotational support base comprises at least one rotational plate.
141. The system as described in clauses 1, 113 and 114 wherein said rotational support base comprises bearing track.
142. The system as described in clauses 1, 113 and 114 wherein said rotational mount comprises at least one rotational mount spacer.
143. The system as described in clause 142 or any other clause wherein said rotational mount spacer comprises at least one retractable joint.
144. The system as described in clause 143 or any other clause wherein said retractable joint comprises a retractable joint selected from the group consisting of: a spline joint; a screw joint; a compression joint; an interlaced joint; a hydraulic joint; an extendable joint; a universal joint; a spider joint; a revolute joint; a pivot joint; a ball and socket joint; a pin bearing joint; and a cylinder joint.
145. The system as described in clause 142 or any other clause wherein said rotational mount spacer comprises at least one buffer.
146. The system as described in clauses 1, 113 and 114 wherein said rotational mount comprises at least one RPM gear adjustor.
147. The system as described in clause 146 or any other clause wherein said RPM gear adjustor comprises at least one planetary gear.
148. The system as described in clauses 1, 113 and 114 wherein said rotary bearing comprises at least one thrust bearing.
149. The system as described in clause 148 or any other clause wherein said rotary bearing comprises at least one thrust bearing coupled to said drive band rotational mount and an internal housing.
150. The system as described in clauses 1, 113, 114 and 149 or any other clause wherein said rotary bearing comprises a rotary bearing selected from the group consisting of: a thrust joint; a thrust ball bearing; a cylindrical thrust roller bearing; a tapered roller thrust bearing; a spherical roller thrust bearing; a magnetic bearing, a fluid bearing, a fluid-film thrust bearing; a roller; a cam roller; a rotational joint; and a rotational plate.
151. The system as described in clauses 1, 113 and 114 or any other clause and further comprising at least one external seal.
152. The system as described in clauses 151 or any other clause wherein said external seal comprises at least one seal joined with at least one seal housing.
153. The system as described in clauses 151 or any other clause wherein said external seal comprises at least one external seal coupled with a rotational joint.
154. The system as described in clauses 1, 113 and 114 or any other clause and further comprising at least one external seal spacer.
155. The system as described in clause 154 or any other clause wherein said external seal spacer comprises external seal spacer coupled with a rotational joint.
156. The system as described in clauses 1, 113 and 114 or any other clause and further comprising at least one brake.
157. The system as described in clauses 1, 113 and 114 wherein said brake comprises a brake selected from the group consisting of: a brake coupled to said drive band rotational mount; a brake coupled to a spacer; a brake coupled to said drive shaft; a brake coupled to said directional drive shaft; brake coupled to a brake housing; and a brake coupled to a rotational support base.
158. The system as described in clauses 156 and 157 or any other clause wherein said brake comprises a brake selected from the group consisting of: a disc brake; a pressure brake; a hydraulic brake; and a friction brake.
159. The system as described in clauses 1, 113 and 114 wherein said rotational propeller drive housing comprises at least one foil.
160. The system as described in clauses 1, 113 and 114 wherein said rotational propeller drive housing comprises at least one component array position.
161. The system as described in clauses 1, 113 and 114 wherein said rotational propeller drive housing comprises a plurality of synchronized rotational propeller drive housings.
162. The system as described in clauses 1, 113 and 114 wherein said rotational propeller drive housing comprises a plurality of independent rotational propeller drive housings.
163. The system as described in clause 161 or any other clause wherein said plurality of synchronized rotational propeller drive housings comprises plurality of synchronized rotational propeller drive housings selected from the group consisting of: plurality of gear synchronized rotational propeller drive housings; or plurality of belt synchronized rotational propeller drive housings; a plurality of rack and pinion synchronized rotational propeller drive housings; a plurality of wire synchronized rotational propeller drive housings; a plurality of communication signal rotational propeller drive housings.
164. The system as described in clauses 1 and 113 or any other clause wherein said directional gear transmission comprises a directional gear transmission selected from the group consisting of: a yaw drive; a directional gearing; a gear band; a drive table; a rack and pinion system; a belt-drive; and circular gearing.
165. The system as described in clauses 1 and 113 or any other clause and further comprising at least one propeller joined with said propeller shaft.
166. The system as described in clauses 1 and 113 or any other clause and further comprising a drive shaft bearing cover.
167. The system as described in clauses 1 and 113 or any other clause and further comprising a directional drive shaft retaining ring.
168. A method of variably coupling a rotational propeller drive system comprising the steps of:
slidably securing at least one spinner to a rotatable cylinder wherein said cylinder is supported by at least one coupler support mount through at least one rotational joint;
adaptably securing said spinner to at least one adaptable support bracket through at least one rotational joint;
adjustably coupling a variable position track to at least one variable position driver and said adaptable support bracket;
generating a rotational drive input;
transferring said rotational drive input causing rotation of said rotatable cylinder;
rotating said spinner slidably secured to said rotatable cylinder;
rotating at least one drive table rotationally responsive to said spinner;
rotating at least one drive shaft mechanically coupled with said drive table;
adjustably positioning said spinner along a variable drive ratio pathway through activation of at least one variable position driver comprising the steps of:

activating said variable position driver to which said variable position track is responsive in response to said control signal; and
adjustably positioning said adaptable support bracket to which said spinner is adaptably coupled on said drive table along a variable drive ratio pathway.
generating a drive input;
outputting said rotational drive input to a directional drive shaft;
innervating at least one rotational drive gear coupled with said directional drive shaft;
innervating a rotational drive band coupled with said rotational drive gear;
coupling at least one drive band rotational mount to said rotational drive band and a rotary bearing;
supporting said drive band rotational mount with at least one rotational support base;
coupling at least one rotational propeller drive housing and said drive band rotational mount;
coupling at least one seal component with said rotational propeller drive housing;
establishing a directional gear transmission responsive to a drive shaft;
establishing a propeller shaft responsive to said directional gear transmission;
rotating said drive shaft innervating said propeller shaft through said directional gear transmission; and
rotating said rotational propeller drive housing in response to a control signal.
169. A method of operating a rotational propeller drive system comprising the steps of:
generating a drive input;
outputting said rotational drive input to a directional drive shaft;
innervating at least one rotational drive gear coupled with said directional drive shaft;
innervating a rotational drive band coupled with said rotational drive gear;
coupling at least one drive band rotational mount to said rotational drive band and a rotary bearing;
supporting said drive band rotational mount with at least one rotational support base;
coupling at least one rotational propeller drive housing and said drive band rotational mount;
coupling at least one seal component with said rotational propeller drive housing;
establishing a directional gear transmission responsive to a drive shaft;
establishing a propeller shaft responsive to said directional gear transmission;
rotating said drive shaft innervating said propeller shaft through said directional gear transmission; and
rotating said rotational propeller drive housing in response to a control signal.
170. A method of rotating a propeller drive housing comprising the steps of:
generating a drive input;
outputting said drive input to a directional drive shaft;
innervating at least one rotational drive gear coupled with said directional drive shaft;
innervating a rotational drive band coupled with said rotational drive gear;
coupling at least one drive band rotational mount to said rotational drive band and a rotary bearing;
supporting said drive band rotational mount with at least one rotational support base;

coupling at least one rotational propeller drive housing and said drive band rotational mount;

coupling at least one seal component with said rotational propeller drive housing; and rotating said rotational propeller drive housing in response to a control signal.

171. A method of variable drive coupling comprising the steps of:

slidably securing at least one spinner to a rotatable cylinder wherein said cylinder is supported by at least one coupler support mount through at least one rotational joint;

adaptably securing said spinner to at least one adaptable support bracket through at least one rotational joint;

adjustably coupling a variable position track to at least one variable position driver and said adaptable support bracket;

generating a rotational drive input;

transferring said rotational drive input causing rotation of said rotatable cylinder;

rotating said spinner slidably secured to said rotatable cylinder;

rotating at least one drive table rotationally responsive to said spinner;

rotating at least one drive shaft mechanically coupled with said drive table; and adjustably positioning said spinner along a variable drive ratio pathway through activation of at least one variable position driver comprising the steps of:

activating said variable position driver to which said variable position track is responsive in response to said control signal;

adjustably positioning said adaptable support bracket to which said spinner is adaptably coupled on said drive table along a variable drive ratio pathway.

172. A method of variable drive coupling as described in clause 171 or any other clause and further comprising the steps of establishing a variable coupler drive switch comprising the steps of positioning at least one translatable drive table support mount such that said spinner is rotationally responsive to said drive table; and activating at least one drive table actuator secured to said translatable drive table support mount such that said drive table may be de-coupled from said spinner through operation of said actuator such that said spinner is not rotationally responsive to said drive table.

173. A variable coupler drive power generator comprising:

at least one rotatable turbine responsive to a power input;

at least one drive shaft responsive to said rotatable turbine and adaptively coupled with a drive shaft coupler;

at least one drive table secured to said drive shaft coupler and positioned on a rotational support base said drive table is positioned adjacent to at least one spinner;

a rotatable cylinder supported by at least one coupler support mount through at least one rotational joint and slidably coupled to said spinner;

at least one power generator coupled to said rotatable cylinder configured to generate an electrical output in response to operation of said rotatable cylinder;

at least one adaptable support bracket coupled to said spinner by at least one rotational joint; and at least one variable position track adjustably coupled to at least one variable position driver and said adaptable support bracket, wherein said variable position driver, in response to a control signal, adjustably positions said spinner along a variable drive ratio pathway.

174. A variable coupler drive power generator as described in 173 or any other clause and further comprising at least one variable coupler drive switch comprising:

at least one translatable drive table support mount positioned such that said spinner is rotationally responsive to said drive table.

at least one drive table actuator secured to said translatable drive table support mount such that said drive table may be de-coupled from said spinner through operation of said actuator such that said spinner is not rotationally responsive to said drive table.

175. A method of variable coupler drive power generation comprising the steps of:

rotating at turbine in response to a power input;

rotating at least one drive shaft responsive to said turbine and adaptively coupled with a drive shaft coupler;

rotating at least one drive table secured to said drive shaft coupler and positioned on a rotational support base wherein said drive table is positioned adjacent to at least one spinner;

rotating a rotatable cylinder supported by at least one coupler support mount through at least one rotational joint and slidably coupled to said spinner;

coupling at least one power generator to said rotatable cylinder;

generating an electrical output in response to operation of said rotatable cylinder;

adaptably securing said spinner to at least one adaptable support bracket through at least one rotational joint; and adjustably positioning said spinner along a variable drive ratio pathway through activation of at least one variable position driver comprising the steps of:

activating said variable position driver to which said variable position track is responsive in response to said control signal; and adjustably positioning said adaptable support bracket to which said spinner is adaptably coupled on said drive table along a variable drive ratio pathway.

176. A method of variable coupler drive power generation 175 or any other clause and further comprising the steps of establishing a variable coupler drive switch comprising the steps of positioning at least one translatable drive table support mount such that said spinner is rotationally responsive to said drive table; and activating at least one drive table actuator secured to said translatable drive table support mount such that said drive table may be de-coupled from said spinner through operation of said actuator such that said spinner is not rotationally responsive to said drive table.

As can be easily understood from the foregoing, the basic concepts of the present invention may be embodied in a variety of ways. It involves both techniques as well as devices to accomplish the appropriate the inventive technology in all of its embodiments. In this application, the various embodiments and techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims that will be included in any subsequent patent application.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon when drafting any claims. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "coupler" should be understood to encompass disclosure of the act of "coupling"—whether explicitly discussed or not—and, conversely, were there effectively disclosure of the act of "coupling", such a disclosure should be understood to encompass disclosure of a "coupler" and even a "means for coupling." Such changes and alternative terms are to be understood to be explicitly included in the description.

Any patents, publications, or other references mentioned in this application for patent are hereby incorporated by reference. Any priority case(s) claimed by this application is hereby appended and hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references in any reference list or information disclosure statement filed with the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

U.S. Patents

| Pat. No. | Kind Code | Issue Date | Name of Patentee or Applicant of cited Document |
| --- | --- | --- | --- |
| 7,425,776 | B2 | 2008 Sep. 16 | Ketcham |
| 7,215,039 | B2 | 2007 May 28 | Zambrano et al. |
| 7,098,553 | B2 | 2006 Aug. 29 | Wiegel et al. |
| 7,298,059 | B2 | 2007 Nov. 20 | Delmerico et al. |
| 7,095,129 | B2 | 2006 Aug. 22 | Moroz |
| 6,984,899 | B1 | 2006 Jan. 10 | Rice |
| 6,951,443 | B1 | 2005 Oct. 4 | Blakemore |
| 5,394,016 | | 1995 Feb. 28 | Hickey |
| 5,182,458 | | 1993 Jan. 26 | McConachy |
| 4,585,950 | | 1986 Apr. 29 | Land |
| 4,285,481 | | 1981 Aug. 25 | Biscomb |
| 4,220,870 | | 1980 Sep. 2 | Kelly |
| 6,191,496 | B1 | 2001 Feb. 20 | Elder |
| 3,944,840 | | 1976 Mar. 16 | Troll |
| 4,171,491 | | 1979 Oct. 16 | Theyse |
| 5,051,018 | | 1991 Sep. 24 | Appell et al. |
| 5,680,032 | | 1997 Oct. 21 | Pena |
| 6,585,553 | B1 | 2003 Jul. 1 | Fetridge et al. |
| 7,215,037 | B2 | 2007 May 8 | Scalzi |
| 7,423,608 | B2 | 2008 Oct. 7 | Okubo et al. |
| 5,876,181 | | 1999 Mar. 2 | Shin |
| 6,726,439 | B2 | 2004 Apr. 27 | Mikhail et al. |
| 5,798,632 | | 1998 Aug. 25 | Muljadi |
| 8,178,991 | B2 | 2012 May 15 | Smith |
| 8,247,918 | B2 | 2012 Aug. 21 | Smith |
| 8,253,268 | B2 | 2012 Aug. 28 | Smith |
| 7,375,436 | B1 | 2008 May 20 | Goldin |
| 7,804,186 | B2 | 2010 Sep. 28 | Freda |
| 4,457,666 | | 1984 Jul. 3 | Selman, Jr. |
| 4,303,835 | | 1981 Dec. 1 | Bair |
| 8,247,918 | B2 | 2012 Aug. 21 | Smith |
| 8,253,268 | B2 | 2012 Aug. 28 | Smith |

U.S. Patents Application Publications

| Publication Number | Kind Code | Issue Date | Name of Patentee or Applicant of cited Document |
| --- | --- | --- | --- |
| 20090146423 | A1 | 2009 Jun. 11 | Arinaga |
| 20060278445 | A1 | 2006 Dec. 14 | Chang |
| 20050280264 | A1 | 2005 Dec. 22 | Nagy |
| 20040086373 | A1 | 2004 May 6 | Page, Jr. |

-continued

| Publication Number | Kind Code | Issue Date | Name of Patentee or Applicant of cited Document |
|---|---|---|---|
| 20060055175 | A1 | 2006 Mar. 16 | Grinblat |
| 20050084373 | A1 | 2005 Apr. 21 | Suzuki |
| 20060108809 | A1 | 2006 May 25 | Scalzi |
| 20060188364 | A1 | 2006 Aug. 24 | Fritz |
| 20070245728 | A1 | 2007 Oct. 25 | Duong |
| 20080150294 | A1 | 2008 Jun. 26 | Jones |
| 20090167028 | A1 | 2009 Jul. 2 | Akamine |
| 20080263731 | A1 | 2008 Oct. 23 | Tabe |
| 20080257614 | A1 | 2008 Oct. 23 | Tabe |
| 20020070558 | A1 | 2002 Jun. 13 | Johann |
| 20110137586 | A1 | 2011 Jun. 9 | Jiang et al. |
| 20110135493 | A1 | 2011 Jun. 9 | Nies et al. |
| 20110135471 | A1 | 2011 Jun. 9 | Wangford |
| 20110135470 | A1 | 2011 Jun. 9 | Merkel |
| 20110133483 | A1 | 2011 Jun. 9 | Yoneda et al. |
| 20110223017 | A1 | 2011 Sep. 15 | Smith |
| 20120190497 | A1 | 2012 Jul. 26 | Smith |
| 20070096327 | A1 | 2004 May 20 | Appa et al. |

Foreign Patent Documents

| Foreign Document Number | Country Code | Kind Code | Publication Date | Name of Patentee or Applicant of cited Document |
|---|---|---|---|---|
| 2003134794 | JP | A2 | 2003 May 9 | Okuno Ichi |
| 2002155850 | JP | A2 | 2002 May 31 | Mitsubishi Heavy Ind. Ltd. |
| 2002130110 | JP | A2 | 2002 May 9 | Murai, Wasaburo |
| 2001339996 | JP | A2 | 2001 Dec. 7 | Rikogaku Shinkokai |
| 2001339995 | JP | A2 | 2001 Dec. 7 | Ishikawajima Harima Heavy Ind. Co. Ltd |
| 63289270 | JP | A2 | 1988 Nov. 25 | Ishikawajima Harima Heavy Ind. Co. Ltd. |
| 61240900 | JP | A2 | 1986 Oct. 27 | Oriental Kiden KK |
| 60259772 | JP | A2 | 1985 Dec. 21 | Mitsubishi Heavy Ind. Ltd. |
| 59138781 | JP | A2 | 1984 Aug. 9 | Mitsubishi Electric Corp. |
| 60002048 | JP | A2 | 1985 Jan. 8 | Mitsubishi Electric Corp. |
| 2004260929 | JP | A2 | 2004 Sep. 16 | Ishikawajima Harima Heavy Ind. Co. Ltd. |
| 9853544 | WO | | 1998 Nov. 26 | Compagne Internationale de Turbines Atomospherique |
| 2009142477 | WO | A1 | 2009 Nov. 26 | Roucar Gear Technologies BV. |
| 2009141148 | WO | A2 | 2009 Nov. 26 | Heigel |
| 2009134115 | WO | A2 | 2009 Nov. 5 | Green-Tech Holdings SDN. BHC. |
| 2008037004 | WO | A1 | 2009 Apr. 3 | Kwok |
| 03017449 | WO | A2 | 2003 Feb. 27 | Sitar |
| 2006073590 | WO | A2 | 2006 Jul. 13 | Scalzi |
| 2109210 | EP | A2 | 2009 Oct. 14 | Green-Tech Holdings SDN. BHC. |
| 2085650 | EP | A2 | 2009 Aug. 5 | Yang et al. |
| 1010891 | EP | A1 | 2000 Jun. 21 | Bernard et al. |
| 0602625 | EP | A1 | 1994 Jun. 2 | Burkhardt |
| 2011046632 | WO | A1 | 2011 Apr. 21 | Airgenesis, LLC |
| 2010307248 | AU | | 2012 Jul. 5 | Smith |
| 2012216636 | AU | | 2013 Feb. 14 | Smith |

Non-Patent Literature Documents

International Patent Number PCT/US2010/029077, International Search Report dated Jul. 30, 2010
International Patent Number PCT/US2010/029077, Written Opinion of the International Searching Authority dated Jul. 30, 2010
Nayef, N. et al. Friction Drive, Variable Speed, Multiple Generator, Utility-Scale Wind Turbine, CWind Inc. Paper for WWEC2008
International Patent Number PCT/US2012/052539, International Search Report dated Nov. 15, 2012

Thus, the applicant(s) should be understood to have support to clause and make a statement of invention to at least: i) each of the devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) the various combinations and permutations of each of the elements disclosed, xii) each potentially dependent clause or concept as a dependency on each and every one of the independent claims or concepts presented, and xiii) all inventions described herein.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, clause language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, clause language, or arguments presented in this or any subsequent application are considered as made to avoid such prior art, such reasons may be eliminated by later presented claims or the like.

Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in Hakim v. Cannon Avent Group, PLC, 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent clause or concept as dependencies or elements under any other independent clause or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any clause so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a clause that would have literally encompassed such alternative embodiments.

Further, if or when used, the use of the transitional phrase "comprising" is used to maintain the "open-end" claims herein, according to traditional clause interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. The use of the phrase, "or any other claim" is used to provide support for any clause to be dependent on any other claim, such as another dependent claim, another independent claim, a previously listed claim, a subsequently listed claim, and the like. As one clarifying example, if a clause were dependent "on clause 20 or any other claim" or the like, it could be re-drafted as dependent on clause 1, clause 15, or even clause 715 (if such were to exist) if desired and still fall with the disclosure. It should be understood that this phrase also provides support for any combination of elements in the claims and even incorporates any desired proper antecedent basis for certain clause combinations such as with combinations of method, apparatus, process, and the like claims. Furthermore, it should be noted that certain embodiments of the current invention may indicate a coupler, or the step of coupling. It should be noted that these may indicate a direct or in some cases an indirect connection and/or bring together of disparate or non-disparate elements in a functional, non-functional or desired configuration.

In addition and as to computer aspects and each aspect amenable to software, programming or other electronic automation, the applicant(s) should be understood to have support to clause and make a statement of invention to at least: xvi) processes performed with the aid of or on a computer as described throughout the above discussion, xv) a programmable apparatus as described throughout the above discussion, xvi) a computer readable memory encoded with data to direct a computer comprising means or elements which function as described throughout the above discussion, xvii) a computer configured as herein disclosed and described, xviii) individual or combined subroutines and programs as herein disclosed and described, xix) the related methods disclosed and described, xx) similar, equivalent, and even implicit variations of each of these systems and methods, xxi) those alternative designs which accomplish each of the functions shown as are disclosed and described, xxii) those alternative designs and methods which accomplish each of the functions shown as are implicit to accomplish that which is disclosed and described, xxiii) each feature, component, and step shown as separate and independent inventions, and xxiv) the various combinations and permutations of each of the above.

Finally, any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant or any other clause further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. A variable coupler lift drive comprising:
   at least one rotatable cylinder responsive to a rotational drive input wherein said rotatable cylinder is supported by at least one coupler support mount through at least one rotational joint;
   at least one spinner slidably coupled to said rotatable cylinder so as to be rotationally responsive to said cylinder;
   at least one adaptable support bracket coupled to said spinner by at least one rotational joint;
   at least one drive table mechanically coupled with at least one drive shaft and rotationally responsive to said spinner; and
   at least one variable position track adjustably coupled to at least one variable position driver and said adaptable support bracket, wherein said variable position driver, in response to a control signal, adjustably positions said spinner along a variable drive ratio pathway; and
   at least one variable coupler drive switch comprising:
   at least one translatable drive table support mount positioned such that said spinner is rotationally responsive to said drive table; and at least one drive table actuator secured to said translatable drive table support mount such that said drive table may be de-coupled from said spinner through operation of said actuator such that said spinner is not rotationally responsive to said drive table.

2. The system as described in claim 1 wherein said translatable drive table comprises a translatable drive table support mount positioned such that said spinner is rotationally non-responsive with said drive table.

3. The system as described in claim 2 and further comprising at least one drive table actuator secured to said translatable drive table support mount such that said drive table may be coupled to said spinner through operation of an actuator such that said spinner is rotationally responsive to said drive table.

4. The system as described in claim 1 wherein said translatable drive table support mount comprises a transverse plate.

5. The system as described in claim 3 wherein said transverse plate is secured to a rotational support base and responsive to said drive table actuator such that said drive table may couple with said spinner such that said spinner is rotationally responsive to said drive table and/or said drive table may be de-coupled from said spinner such that said spinner is not rotationally responsive to said drive table.

6. The system as described in claim 1 wherein said translatable drive table support mount comprises a translatable drive table support mount selected from the group consisting of: a spring loaded translatable drive table support mount; and a cam responsive translatable drive table support mount.

7. The system as described in claim 1 wherein said drive table movement actuator comprises a drive table movement actuator selected from the group consisting of: a hydraulic movement actuator; an electrical movement actuator; an automatic movement actuator; a manual movement actuator; a lever movement actuator; a motor movement actuator; a gravity movement actuator; a magnetic movement actuator; a screw-drive movement actuator; and a spring movement actuator.

8. A variable coupler drive lift as described in claim 5 wherein said transverse plate comprises a transverse plate selected from the group consisting of: a spring loaded transverse plate; and a cam responsive transverse plate.

9. The system as described in claim 1 translatable drive table support mount comprises a translatable drive table support mount tractably coupled with at least one drive base support.

10. The system as described in claim 9 wherein said translatable drive table support mount tractably coupled with at least one drive base support comprises at least one tractable interface.

11. The system as described in claim 9 wherein said translatable drive table support mount tractably coupled with at least one drive base support comprises at least one translatable attachment.

12. The system as described in claim 11 wherein said translatable attachment comprises at least one translatable attachment selected from the group consisting of: a slide attachment; a stack attachment; a transient attachment; a spring loaded attachment; a detachable attachment; a bearing joint attachment.

13. The system as described in claim 1 and further comprising a rotational support base.

14. The system as described in claim 2 wherein said rotational support base comprises at least one roller element secured to a roller support mount through a rotational joint.

15. The system as described in claim 1 and further comprising at least one slide bearing attached to said translatable drive table support mount.

16. The system as described in claim 15 wherein said slide bearing comprises at least one slide anchor.

17. A method of variable drive coupling comprising the steps of:
slidably securing at least one spinner to a rotatable cylinder wherein said cylinder is supported by at least one coupler support mount through at least one rotational joint;
adaptably securing said spinner to at least one adaptable support bracket through at least one rotational joint;
adjustably coupling a variable position track to at least one variable position driver and said adaptable support bracket;
generating a rotational drive input;
transferring said rotational drive input causing rotation of said rotatable cylinder;
rotating said spinner slidably secured to said rotatable cylinder;
rotating at least one drive table rotationally responsive to said spinner;
rotating at least one drive shaft mechanically coupled with said drive table; and
adjustably positioning said spinner along a variable drive ratio pathway through activation of at least one variable position driver comprising the steps of:
activating said variable position driver to which said variable position track is responsive in response to said control signal; and
adjustably positioning said adaptable support bracket to which said spinner is adaptably coupled on said drive table along a variable drive ratio pathway.

18. A method of variable drive coupling as described in claim 17 and further comprising the steps of establishing a variable coupler drive switch comprising the steps of
positioning at least one translatable drive table support mount such that said spinner is rotationally responsive to said drive table; and
activating at least one drive table actuator secured to said translatable drive table support mount such that said drive table may be de-coupled from said spinner through operation of said actuator such that said spinner is not rotationally responsive to said drive table.

19. A variable coupler drive power generator comprising:
at least one rotatable turbine responsive to a power input;
at least one drive shaft responsive to said rotatable turbine and adaptively coupled with a drive shaft support;
at least one drive table secured to said drive shaft support and positioned on a rotational support base wherein said drive table is positioned adjacent to at least one spinner;
a rotatable cylinder supported by at least one coupler support mount through at least one rotational joint and slidably coupled to said spinner;
at least one power generator coupled to said rotatable cylinder configured to generate an electrical output in response to operation of said rotatable cylinder;
at least one adaptable support bracket coupled to said spinner by at least one rotational joint;
at least one variable position track adjustably coupled to at least one variable position driver and said adaptable support bracket, wherein said variable position driver, in response to a control signal, adjustably positions said spinner along a variable drive ratio pathway;

at least one translatable drive table support mount positioned such that said spinner is rotationally responsive to said drive table, at least one drive table actuator secured to said translatable drive table support mount such that said drive table may be de-coupled from said spinner through operation of said actuator such that said spinner is not rotationally responsive to said drive table.

20. A method of variable coupler drive power generation comprising the steps of:

rotating at turbine in response to a power input;

rotating at least one drive shaft responsive to said turbine and adaptively coupled with a drive shaft support;

rotating at least one drive table secured to said drive shaft support and positioned on a rotational support base wherein said drive table is positioned adjacent to at least one spinner;

rotating a rotatable cylinder supported by at least one coupler support mount through at least one rotational joint and slidably coupled to said spinner;

coupling at least one power generator to said rotatable cylinder;

generating an electrical output in response to operation of said rotatable cylinder;

adaptably securing said spinner to at least one adaptable support bracket through at least one rotational joint; and adjustably positioning said spinner along a variable drive ratio pathway through activation of at least one variable position driver comprising the steps of:

activating said variable position driver to which said variable position track is responsive in response to said control signal; and adjustably positioning said adaptable support bracket to which said spinner is adaptably coupled on said drive table along a variable drive ratio pathway.

21. A method of variable coupler drive power generation as described in claim 20 and further comprising the steps of establishing a variable coupler drive switch comprising the steps of positioning at least one translatable drive table support mount such that said spinner is rotationally responsive to said drive table; and activating at least one drive table actuator secured to said translatable drive table support mount such that said drive table may be de-coupled from said spinner through operation of said actuator such that said spinner is not rotationally responsive to said drive table.

* * * * *